(12) United States Patent
Su et al.

(10) Patent No.: US 10,637,088 B2
(45) Date of Patent: Apr. 28, 2020

(54) ENERGY CONVERSION DEVICE AND METHOD OF FORMING THE SAME

(71) Applicant: Nanyang Technological University, Singapore (SG)

(72) Inventors: Pei-Chen Su, Singapore (SG); Yong Jin Yoon, Singapore (SG); Jong Dae Baek, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 150 days.

(21) Appl. No.: 15/575,614

(22) PCT Filed: May 20, 2016

(86) PCT No.: PCT/SG2016/050241
§ 371 (c)(1),
(2) Date: Nov. 20, 2017

(87) PCT Pub. No.: WO2016/190813
PCT Pub. Date: Dec. 1, 2016

(65) Prior Publication Data
US 2018/0159162 A1 Jun. 7, 2018

(30) Foreign Application Priority Data
May 22, 2015 (SG) .............. 10201504046S

(51) Int. Cl.
*H01M 8/1253* (2016.01)
*H01M 8/1286* (2016.01)
(Continued)

(52) U.S. Cl.
CPC .......... *H01M 8/1253* (2013.01); *C09K 13/02* (2013.01); *H01M 4/8871* (2013.01);
(Continued)

(58) Field of Classification Search
CPC ............. H01M 8/1253; H01M 8/2432; H01M 8/1286; H01M 4/8871; C09K 13/02
See application file for complete search history.

(56) References Cited

U.S. PATENT DOCUMENTS

2007/0184322 A1\* 8/2007 Huang ................ H01M 4/8642
429/483
2008/0242103 A1\* 10/2008 Ohmuro ............ H01L 21/02052
438/745
(Continued)

FOREIGN PATENT DOCUMENTS

WO 2007/084776 A2 7/2007
WO 2012/030874 A2 3/2012

OTHER PUBLICATIONS

An et al., "Three-Dimensional Nanostructured Bilayer Solid Oxide Fuel Cell with 1.3 W/cm² at 450° C.," *Nano Letters* 13(9):4551-4555, 2013.
(Continued)

*Primary Examiner* — Jonathan G Jelsma
(74) *Attorney, Agent, or Firm* — Seed Intellectual Property Law Group LLP

(57) ABSTRACT

Various embodiments may provide a method of forming an energy conversion device. The method may include forming an electrolyte layer on the first surface of the semiconductor substrate. The method may also include forming a cavity on the second surface of the semiconductor substrate using a deep reactive ion etch. The method may further include enlarging said cavity by carrying out one or more wet etches so that the enlarged cavity is at least partially defined by a vertical arrangement comprising a first lateral cavity surface of the semiconductor substrate extending substantially along a first direction, and a second lateral cavity surface of the semiconductor substrate adjoining the first lateral cavity surface. The method may include forming a first electrode
(Continued)

on a first surface of the electrolyte layer, and forming a second electrode on a second surface of the electrolyte layer.

18 Claims, 44 Drawing Sheets

(51) Int. Cl.
    H01M 8/2432    (2016.01)
    C09K 13/02    (2006.01)
    H01M 4/88    (2006.01)
    H01M 8/00    (2016.01)
    H01M 8/124    (2016.01)

(52) U.S. Cl.
    CPC ......... *H01M 8/006* (2013.01); *H01M 8/1286* (2013.01); *H01M 8/2432* (2016.02); *H01M 2008/1293* (2013.01); *Y02E 60/525* (2013.01); *Y02P 70/56* (2015.11)

(56) References Cited

U.S. PATENT DOCUMENTS

2009/0087712 A1    4/2009    Huang et al.
2009/0181278 A1    7/2009    Son et al.
2014/0093782 A1*    4/2014    Gardner .................... C25F 3/12
                                                            429/246

OTHER PUBLICATIONS

Beckel et al., "Thin films for micro solid oxide fuel cells," *Journal of Power Sources* 173:325-345, 2007.
Bernay et al., "Yttria-doped zirconia thin films deposited by atomic layer deposition ALD: a structural, morphological and electrical characterisation," *Journal of Physics and Chemistry of Solids* 64:1761-1770, 2003.
Chao et al., "Improved Solid Oxide Fuel Cell Performance with Nanostructured Electrolytes," *ACS Nano* 5(7):5692-5696, 2011.
Chiodelli et al., "Electrochemical open circuit voltage (OCV) characterization of SOFC materials," *Ionics* 19:1135-1144, 2013.
Cho et al., "Wet/dry etching combined microtextured structures for high-efficiency solar cells," *IET Micro & Nano Letters* 10(10):528-532, 2015. (6 pages).
Evans et al., "Residual Stress and Buckling Patterns of Free-standing Yttria-stabilized-zirconia Membranes Fabricated by Pulsed Laser Deposition," *Fuel Cells* 12(4):614-623, 2012.
Evans et al., "Review on microfabricated micro-solid oxide fuel cell membranes," *Journal of Power Sources* 194:119-129, 2009.
Fan et al., "Thickness effects of yttria-doped ceria interlayers on solid oxide fuel cells," *Journal of Power Sources* 218:187-191, 2012.
Garbayo et al., "Full ceramic micro solid oxide fuel cells: towards more reliable MEMS power generators operating at high temperatures," *Energy Environ. Sci.* 7(11):3617-3629, 2014. (14 pages).
Heiroth et al., "Yttria-stabilized zirconia thin films by pulsed laser deposition: Microstructural and compositional control," *Journal of the European Ceramic Society* 30:489-495, 2010.
Huang et al., "High-Performance Ultrathin Solid Oxide Fuel Cells for Low-Temperature Operation," *Journal of The Electrochemical Society* 154(1):B20-B24, 2007.
Kerman et al., "Elastic configurations of self-supported oxide membranes for fuel cells," *Journal of Power Sources* 222:359-366, 2013.
Kerman et al., "Free standing oxide alloy electrolytes for low temperature thin film solid oxide fuel cells," *Journal of Power Sources* 202:120-125, 2012.
Kerman et al., "Free standing yttria-doped zirconia membranes: Geometrical effects on stability," *J Electroceram* 34:91-99, 2015.
Kerman et al., "Nanoscale Compositionally Graded Thin-Film Electrolyte Membranes for Low-Temperature Solid Oxide Fuel Cells," *Adv. Energy Mater.* 2:656-661, 2012.
Kerman et al., "Pt/$Y_{0.16}Zr_{0.84}O_{1.92}$/Pt thin film solid oxide fuel cells: Electrode microstructure and stability considerations," *Journal of Power Sources* 196:2608-2614, 2011.
Ko et al., "Ultra-thin film solid oxide fuel cells utilizing un-doped nanostructured zirconia electrolytes," *Journal of Power Sources* 213:343-349, 2012.
Kwon et al., "High-Performance Micro-Solid Oxide Fuel Cells Fabricated on Nanoporous Anodic Aluminum Oxide Templates," *Adv. Funct. Mater.* 21:1154-1159, 2011.
Lai et al., "Microstructure and Microfabrication Considerations for Self-Supported On-Chip Ultra-Thin Micro-Solid Oxide Fuel Cell Membranes," *Fuel Cells* 09(5):699-710, 2009.
Lai et al., "On the role of ultra-thin oxide cathode synthesis on the functionality of micro-solid oxide fuel cells: Structure, stress engineering and in situ observation of fuel cell membranes during operation," *Journal of Power Sources* 195:5185-5196, 2010.
Lee et al., "Modification on surface roughness by combining dry and wet etching," *Proceedings of SPIE* 5116:627-635, 2003.
Li et al., "Chemical stability study of nanoscale thin film yttria-doped barium cerate electrolyte for micro solid oxide fuel cells," *Journal of Power Sources* 268:804-809, 2014.
Muecke et al., "Micro Solid Oxide Fuel Cells on Glass Ceramic Substrates," *Adv. Funct. Mater.* 18:3158-3168, 2008.
Nédélec et al., "Dense yttria-stabilised zirconia electrolyte layers for SOFC by reactive magnetron sputtering," *Journal of Power Sources* 205:157-163, 2012.
Pergolesi et al., "High proton conduction in grain-boundary-free yttrium-doped barium zirconate films grown by pulsed laser deposition," *Nature Materials* 9:846-852, 2010.
Quinn et al., "Residual stress and microstructure of as-deposited and annealed, sputtered yttria-stabilized zirconia thin films," *J. Mater. Res.* 23(3):609-618, 2008.
Rey-Mermet et al., "Solid oxide fuel cell membranes supported by nickel grid anode," *Solid State Ionics* 179:1497-1500, 2008.
Shim et al., "Atomic Layer Deposition of Yttria-Stabilized Zirconia for Solid Oxide Fuel Cells," *Chem. Mater.* 19:3850-3854, 2007.
Smeacetto et al., "Yttria-stabilized zirconia thin film electrolyte produced by RF sputtering for solid oxide fuel cell applications," *Materials Letters* 64:2450-2453, 2010.
Srikar et al., "Structural design considerations for micromachined solid-oxide fuel cells," *Journal of Power Sources* 125:62-69, 2004.
Su et al., "Cup-shaped yttria-doped barium zirconate membrane fuel cell array," *Microelectronic Engineering* 88:2405-2407, 2011.
Su et al., "Nanoscale membrane electrolyte array for solid oxide fuel cells," *Electrochemistry Communications* 16:77-79, 2012.
Su et al., "Solid Oxide Fuel Cell with Corrugated Thin Film Electrolyte," *Nano Letters* 8(8):2289-2292, 2008.
Takagi et al., "Low temperature thin film solid oxide fuel cells with nanoporous ruthenium anodes for direct methane operation," *Energy Environ. Sci.* 4:3473-3478, 2011.
Tang et al., "Design consideration of micro thin film solid-oxide fuel cells," *J. Micromech. Microeng.* 15:S185-S192, 2005.
Tölke et al., "Processing of Foturan® glass ceramic substrates for micro-solid oxide fuel cells," *Journal of the European Ceramic Society* 32:3229-3238, 2012.
Yan et al., "Experimental study of single triple-phase-boundary and platinum-yttria stabilized zirconia composite as cathodes for micro-solid oxide fuel cells," *Journal of Power Sources* 206:84-90, 2012.

* cited by examiner

- forming an electrolyte layer on the first surface of the semiconductor substrate —102
- forming a cavity on the second surface of the semiconductor substrate using a deep reactive ion etch —104
- enlarging said cavity by carrying out one or more wet etches —106
- forming a first electrode on a first surface of the electrolyte layer —108
- forming a second electrode on a second surface of the electrolyte layer —110

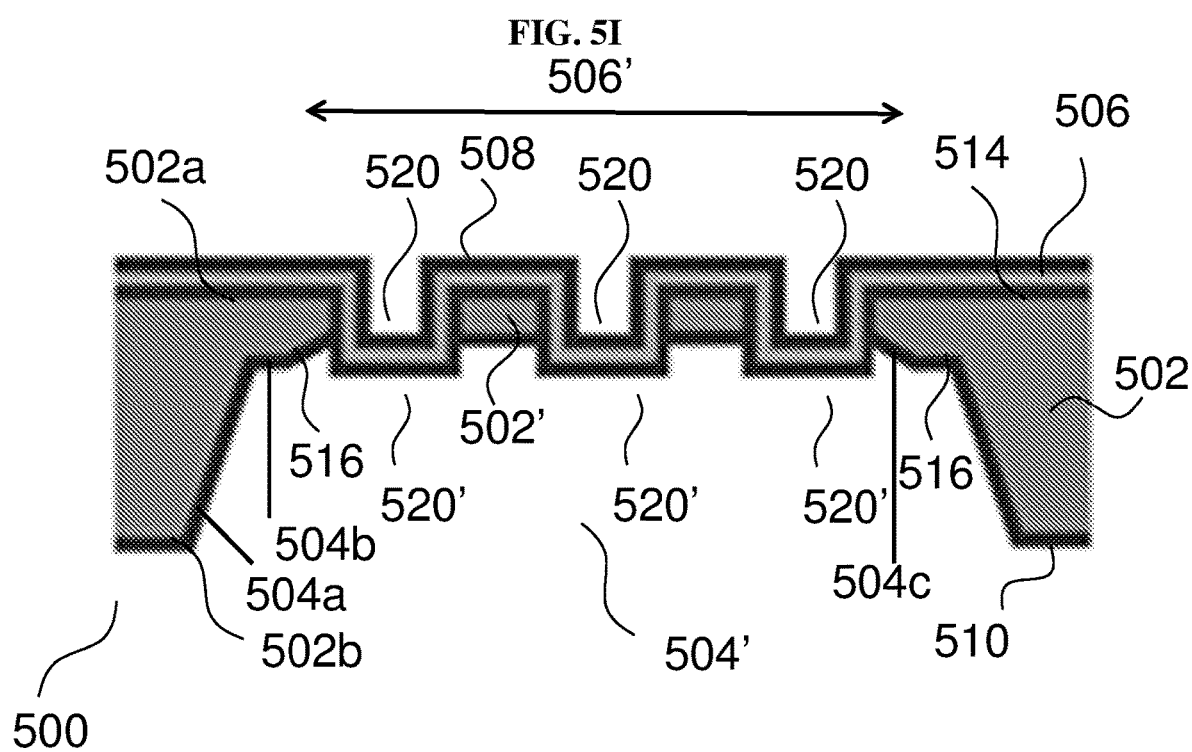

ENERGY CONVERSION DEVICE AND METHOD OF FORMING THE SAME

CROSS-REFERENCE TO RELATED APPLICATION

This application claims the benefit of priority of Singapore application No. 10201504046S filed May 22, 2015, the contents of it being hereby incorporated by reference in its entirety for all purposes.

TECHNICAL FIELD

Various aspects of this disclosure relate to energy conversion devices and methods of forming the same.

BACKGROUND

Solid oxide fuel cells (SOFCs) are efficient energy conversion devices with flexible selection of hydrocarbon fuels. Currently, downscaling of electrolyte thickness to reduce ohmic resistance has been an effective way for further improving the performance of SOFCs at low operating temperatures below 500° C. For drastic reduction of electrolyte thickness to nanometer-scale, silicon-based microfabrication process using chemical etching has been successfully utilized for SOFCs.

Thin film electrolytes with nanoscale thicknesses of between 50 to 150 nm were fabricated previously by MEMS-based microfabrication processes with atomic layer deposition (ALD), sputtering, or pulsed laser deposition (PLD). Further, fuel cell performances from the yttria-stabilized zirconia (YSZ) electrolytes with superior power densities above 1000 mW/cm$^2$ at 500° C. were also reported.

Nevertheless, successful low-temperature SOFCs with a nanoscale thin electrolyte are currently only feasible in miniature scale due to severe residual stress on the membrane. A 50 nm thick, free-standing YSZ membrane is typically confined within only a few hundred micrometers in lateral dimensions, which limits the available electrochemically active area. Although superior power densities at reduced temperature have been reported elsewhere, the tininess of such SOFCs leads to insignificant power output of only at micro-watts scale, thereby limiting their applications as practical power sources.

It is virtually impractical to simply enlarge the size of such a thin membrane to increase surface area. Therefore, an effective method to scale up the nano thin film YSZ membrane SOFCs with robust mechanical strength of membranes is prerequisite for higher total power output.

To maximize electrochemically active area within a confined dimension, free-standing array μ-SOFCs has been fabricated. By creating free-standing corrugated YSZ electrolyte films from the pre-patterned silicon substrate, surface utilization was significantly increased by 30% to 64% on the silicon wafer. The array, which is 600 μm×600 μm, delivered a higher total power output of 3.1 mW at temperatures below 500° C. However, as individual cells featured free-standing and cup-shaped structure, there are many geometrical discontinuities, which may be mechanically weak points. The cells, which are arrayed on a square template, may undergo non-uniform membrane stress distribution. In particular, cells in the vicinity of each corner, where stress concentration experience is the highest, may be damaged, leading to membrane failures during fuel cell operation.

Kerman et al. (K. Kerman, T. Tallinen, S. Ramanathan and L. Mahadevan, *Journal of Power Sources*, 2013, 222, 359-366) reported stress behavior around the boundaries of square thin film SOFCs by numerical simulation and confirmed that stress was highly concentrated at the corners of the square membrane.

Su et al. (P. C. Su and F. B. Prinz, *Electrochemistry Communications*, 2012, 16, 77-79) presented electrolyte membrane array μ-SOFCs with silicon supporting layer to improve mechanical stability of the array membrane. Individual cells were supported by surrounding single crystal silicon and 6 mm by 6 mm square YSZ membrane electrolyte array was successfully demonstrated. Nevertheless, this structure has still stress concentration points at each corner of square templates.

SUMMARY

Various aspects of this disclosure provide a method of forming an energy conversion device. The method may include forming an electrolyte layer on the first surface of the semiconductor substrate. The method may also include forming a cavity on the second surface of the semiconductor substrate using a deep reactive ion etch. The method may further include enlarging said cavity by carrying out one or more wet etches so that the enlarged cavity is at least partially defined by a vertical arrangement comprising a first lateral cavity surface of the semiconductor substrate extending substantially along a first direction, and a second lateral cavity surface of the semiconductor substrate adjoining the first lateral cavity surface. The second lateral cavity may extend substantially along a second direction different from the first direction. The method may additionally include forming a first electrode on a first surface of the electrolyte layer. The method may also include forming a second electrode on a second surface of the electrolyte layer.

In various embodiments, an energy conversion device may be provided. The energy conversion device may include a semiconductor substrate having a first surface and a second surface opposite the first surface. The semiconductor substrate may include an enlarged cavity on the second surface. The enlarged cavity may be at least partially defined by a vertical arrangement comprising a first lateral cavity surface extending substantially along a first direction, and a second lateral cavity surface adjoining the first lateral cavity surface. The second lateral cavity surface may extend substantially along a second direction different from the first direction. The energy conversion device may also include an electrolyte layer on the first surface of the semiconductor substrate. The energy conversion device may additionally include a first electrode on a first surface of the electrolyte layer. The energy conversion device may also include a second electrode on a second surface of the electrolyte layer.

BRIEF DESCRIPTION OF THE DRAWINGS

The invention will be better understood with reference to the detailed description when considered in conjunction with the non-limiting examples and the accompanying drawings, in which:

FIG. 1 is a diagram illustrating a method of forming an energy conversion device may be provided according to various embodiments.

FIG. 5I is a schematic illustrating side view of the wafer with electrodes formed according to various embodiments.

DETAILED DESCRIPTION

Figure 2:
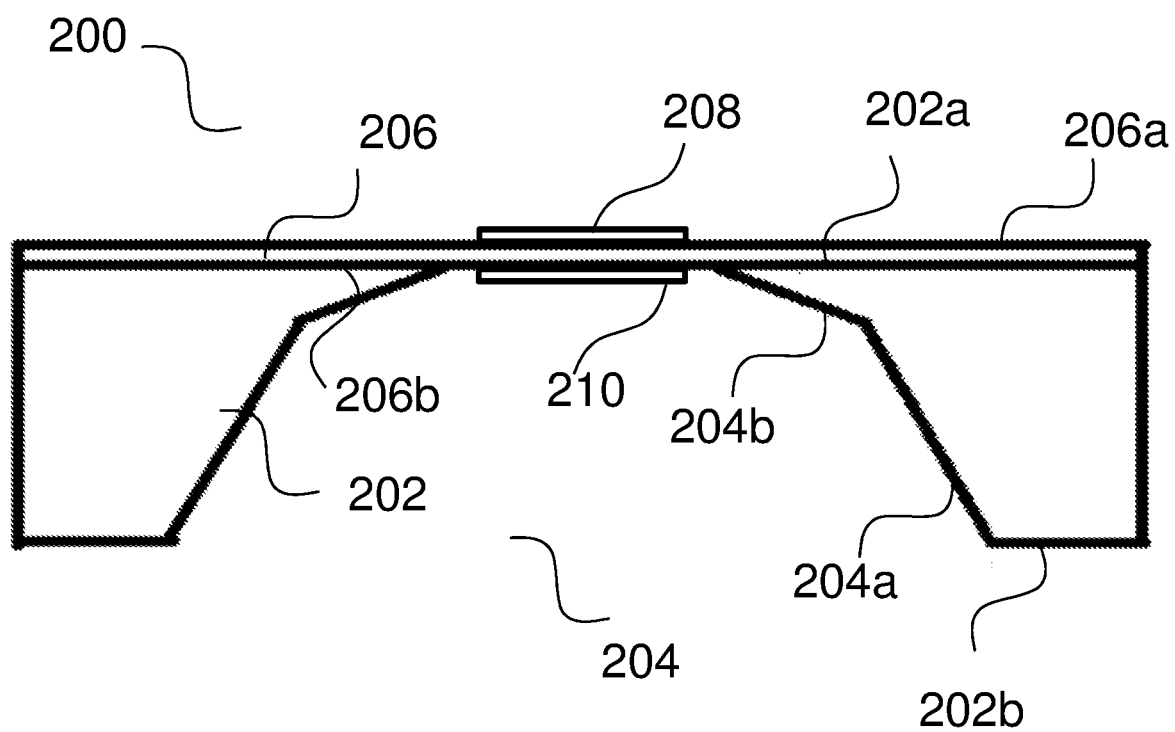
FIG. 2 is a schematic showing an energy conversion device according to various embodiments.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

In various embodiments, a method of forming an energy conversion device may be provided. FIG. 1 is a diagram 100 illustrating a method of forming an energy conversion device may be provided according to various embodiments. The method may include, in 102, forming an electrolyte layer on the first surface of the semiconductor substrate. The method may also include, in 104, forming a cavity on the second surface of the semiconductor substrate using a deep reactive ion etch. The method may further include, in 106, enlarging said cavity by carrying out one or more wet etches so that the enlarged cavity is at least partially defined by a vertical arrangement comprising a first lateral cavity surface of the semiconductor substrate extending substantially along a first direction, and a second lateral cavity surface of the semiconductor substrate adjoining the first lateral cavity surface. The second lateral cavity may extend substantially along a second direction different from the first direction. The method may additionally include, in 108, forming a first electrode on a first surface of the electrolyte layer. The method may also include, in 110, forming a second electrode on a second surface of the electrolyte layer.

In other words, the method may include using forming an electrolyte layer on the front of a semiconductor substrate and using deep reactive ion etching to etch the substrate from the back. The etched cavity may then be enlarged by using wet etching. Consequently, the enlarged cavity may be bound by two lateral surfaces which extend in different directions. Electrodes are then formed on both sides of the electrolyte layers.

Various embodiments may help to address or mitigate the problems as described herein. By using a combination of deep reactive ion etching and wet etching, a tapered structure is formed at the corners of the etched cavity, thus reducing the sharpness of the corners that induce stress concentration. Various embodiments may provide an energy conversion device with an electrolyte layer that may experience reduced stress during operation, leading to reduced failures during fuel cell.

In various embodiments, the energy conversion device may be a solid oxide fuel cell (SOFC) or a micro solid oxide fuel cell (μSOFC) or a solid oxide fuel cell (SOFC) array. In various embodiments, the electrolyte layer may also be referred to as a membrane or a membrane layer or a solid electrolyte layer or film.

In various embodiments, the semiconductor substrate may be a silicon substrate. In various other embodiments, the semiconductor substrate may be a germanium substrate or a gallium arsenide substrate. If a germanium substrate or a gallium arsenide substrate is used, etching parameters may need to be adjusted.

Deep reactive ion etching is a highly anisotropic etch process used to create deep penetration, steep-sided cavities and trenches in substrates, typically with high aspect ratios. The cavities and trenches formed may have nearly vertical side walls. In various embodiments, the angle between a side wall and the front surface of the substrate may be about 88° to about 92°.

Deep reactive ion etching may include a plasma etching and depositing a passivation layer. Deep reactive ion etching alternating between plasma etching and depositing a passivation layer. In other words, plasma etching may be carried out first to form an initial hole, followed by forming of a passivation layer on the base and side walls of the hole; followed by plasma etching which removes the passivation layer at the base and further increasing the depth of the hole, followed by alternate phases of passivation and plasma etching until a deep cavity is formed. The plasma used during plasma etching contains some ions, which attack the wafer from a nearly vertical direction. Sulfur hexafluoride ($SF_6$) may be used for silicon. The passivation layer may be chemically inert. The passivation layer may be formed by a gas such as octafluorocyclobutane ($C_4F_8$).

In plasma etching, etch species are generated in a glow discharge. The etch species may be charged (ions) or neutral (atoms and radicals). Etching of the substrate may be done by physical means (e.g. ions under influence of an electric field may accelerate and impinge onto the substrate to cause physical removal of material) and chemical means (chemical reactions between the elements of the material etched and the reactive species generated by the plasma form volatile etch products which may then be removed).

Wet etching is a material removal process that may use liquid chemicals or etchants to remove materials from a substrate. The specific patterns may be defined by masks on the wafer. Materials that are not protected by the masks may be etched away by liquid chemicals. Wet etching may be carried out using aqueous alkaline solutions such as potassium hydroxide (KOH), tetramethylammonium hydroxide (TMAH), ethylenediamine pyrocatechol water (EDP) or ammonium hydroxide ($NH_4OH$).

In various embodiments, the second lateral cavity surface may extend at an angle selected from a range of about 3° to about 30°, e.g. about 3° to about 4° from the first surface and/or the second surface of the semiconductor substrate. In various embodiments, the second lateral cavity surface may extend at an angle that is less than about 30°. A smaller angle may lead to greater stability.

In various embodiments, the second lateral cavity surface may be a shoulder region extending substantially parallel to the first surface of the semiconductor substrate. The enlarged cavity may be further defined by a third lateral cavity surface adjoining the second lateral cavity surface so that the second lateral cavity surface is between the first lateral cavity surface and the third lateral cavity surface.

In various embodiments, the method may include forming a plurality of trenches on the first surface of the semiconductor substrate before forming the electrolyte layer.

In various embodiments, the method may further include forming a first dielectric layer on the first surface of the semiconductor substrate and a second dielectric layer on the second surface of the semiconductor substrate before forming the electrolyte layer. The method may also include removing a portion of the second dielectric layer so that a portion of the second surface of the semiconductor substrate is exposed for forming the cavity. The portion of the second dielectric layer may be removed using reactive ion etching. The first and second dielectric layers may be protective layers for protecting the substrate during deep reactive ion etching and/or wet etching. By removing a portion of the second dielectric layer to form an opening, the underlying portion of the semiconductor substrate may be subsequently etching while the first dielectric layer and the remaining portion of the second dielectric layers act as protective layers for the underlying portions of the semiconductor substrate.

In various embodiments, the one or more wet etches may include a first wet etch carried out at a first temperature and a second wet etch carried out at a second temperature lower than the first temperature.

In various embodiments, the one or more wet etches may be carried out until the electrolyte layer is exposed.

In various embodiments, the first lateral cavity surface may be substantially along the (111) plane of the semiconductor substrate.

In various embodiments, the first lateral cavity surface may form a rounded junction with the second lateral cavity surface.

In various embodiments, the enlarged cavity may be at least partially defined by the electrolyte layer and forms a circular interface with the electrolyte layer.

In various embodiments, an energy conversion device formed by a method as described herein may be provided.

Various embodiments may provide a new fabrication method for a solid oxide fuel cell (SOFC), or a fuel cell array or a large scale, silicon-based micro solid oxide fuel cell (µ-SOFC).

In various embodiments, an energy conversion device may be provided. FIG. 2 is a schematic showing an energy conversion device 200 according to various embodiments. The energy conversion device 200 may include a semiconductor substrate 202 having a first surface 202a and a second surface 202b opposite the first surface 202a. The semiconductor substrate may include an enlarged cavity 204 on the second surface 202b. The enlarged cavity 204 may be at least partially defined by a vertical arrangement comprising a first lateral cavity surface 204a extending substantially along a first direction, and a second lateral cavity surface 204b adjoining the first lateral cavity surface 204a. The second lateral cavity surface 204b may extend substantially along a second direction different from the first direction. The energy conversion device 200 may also include an electrolyte layer 206 on the first surface 202a of the semiconductor substrate 202. The energy conversion device 200 may additionally include a first electrode 208 on a first surface 206a of the electrolyte layer 206. The energy conversion device may also include a second electrode 210 on a second surface 206b of the electrolyte layer 206.

In other words, the energy conversion device 200 may include an electrolyte layer 206 over a cavity 204 on a substrate 202. The cavity 204 may be defined by a first lateral surface 204a and a second lateral surface 204b. Electrodes 208, 210 are formed on both sides of the electrolyte layer 206. The first lateral surface 204a and a second lateral surface 204b are adjacent to each other and form the side wall of the cavity 204.

In various embodiments, the electrolyte layer 206 may be suspended over the enlarged cavity 204. In various embodiments, the electrolyte layer 206 may be corrugated.

In various embodiments, a portion of the electrolyte layer 206 may be suspended over the enlarged cavity. In other words, the electrolyte layer 206 is on or over the substrate 202 but a portion of the electrolyte layer 206 may be adjacent or adjoining the enlarged cavity. The portion of the electrolyte layer 206 may be held over the enlarged cavity 204 only by the remaining portion(s) of electrolyte layer 206.

In various embodiments, the enlarged cavity 204 may have a diameter nearly equal to the diameter of the substrate, which may be a wafer. In various embodiments, the portion of the electrolyte layer 206 suspended over the enlarged cavity 204 may have a diameter nearly equal to the diameter of the substrate. The substrate 202 may have a diameter of 2 inches ("), 3", 4", 6", 8", 12", or 18". For instance, the enlarged cavity 204 or the portion of the electrolyte layer 206 may be below about 2 μm to about 3 μm shorter than the diameter of the substrate 202.

In various embodiments, the second electrode 210 may extend from on the second surface 206b of the electrolyte layer 206 over the first lateral cavity surface 204a and the second lateral cavity surface 204b to on the second surface 202b of the semiconductor substrate 202.

In various embodiments, the electrolyte layer 206 may be solid state oxygen ion-conductors, such as yttria-stabilized zirconia (YSZ), or a proton conductor, such as yttrium-doped $BaZrO_3$ (BYZ).

In various embodiments, the enlarged cavity 204 may extend from the first surface 202a of the substrate 202 to the second surface 202b of the substrate 202. In various other embodiments, the enlarged cavity 204 may not fully extend from the second surface 202b to the first surface 202a. In various embodiments, the device 200 may include a layer of semiconductor material under the electrolyte layer 206.

In various embodiments, the enlarged cavity 204 may be defined by the first lateral cavity surface 204a, the second lateral cavity surface 204b and a base surface. The base surface may be or may include the electrode 210 or a portion of the electrode 210 or/and may be or may include a portion of the electrolyte layer 206 (e.g. surface 206b of the electrolyte layer 206). The base surface may be substantially parallel to the surface 202a and/or surface 202b of the substrate 202. The first lateral cavity surface 204a and the second lateral cavity surface 204b may be at different angles to the base surface. The first lateral cavity surface 204a and the second lateral cavity surface 204b may be lateral to the cavity 204 and/or the base surface. The first lateral cavity surface 204a and the second lateral cavity surface 204b may lie along different crystal planes of the semiconductor substrate 204.

In various embodiments, the second lateral cavity surface 204b may define a flat-top conical portion of the enlarged cavity 204. The first lateral cavity surface 204a may define a flat-top pyramidal portion of the enlarged cavity. The first lateral cavity surface 204a may form a circular interface with the electrolyte layer 206.

In various embodiments, the second lateral cavity surface 204b may be a shoulder region extending substantially parallel to the first surface 202a of the semiconductor substrate 202 and/or the second surface 202b of the semiconductor substrate 202. The enlarged cavity 204 may be further defined by a third lateral cavity surface (not shown in FIG. 2) adjoining the second lateral cavity surface 204b so that the second lateral cavity surface 204b is between the first lateral cavity surface 204a and the third lateral cavity surface. The vertical arrangement may include the first lateral cavity surface 204a, the third lateral cavity surface, and the second lateral cavity surface 204b between the first lateral cavity surface 204a and the third lateral cavity surface. The third lateral cavity surface may be between the electrolyte layer 206 and the second lateral cavity surface 204b. The third lateral cavity surface may define a flat-top conical portion of the enlarged cavity. The third lateral cavity surface may form a circular interface with the electrolyte layer 206. The first lateral cavity surface 204a and the second lateral cavity surface 204b, and the third lateral surface may be lateral to the cavity 204 and/or the base surface. The first lateral cavity surface 204a, the second lateral cavity surface 204b, and the third lateral surface may lie along different crystal planes of the semiconductor substrate 204. The first lateral cavity surface 204a and the second lateral cavity surface 204b (or the third lateral cavity surface) may form a vertical arrangement. One end of the first lateral surface 204a may adjoin one end of the second lateral surface 204b.

In various embodiments, the third lateral cavity surface may extend at an angle selected from a range of about 3° to about 30°, e.g. about 3° to about 4° from the first surface 202a and/or the second surface 202b of the semiconductor substrate 202.

In various embodiments, the first electrode 208 and/or the second electrode may include a suitable electrically conductive and catalytically active material such as gold, silver, nickel, copper, platinum, palladium, ruthenium or the like.

Various embodiments may provide a fuel cell structure such as a SOFC or a fuel cell array, or a large scale, silicon-based micro solid oxide fuel cell (μ-SOFC).

The micro solid oxide fuel cell may include a large-scale array of circular YSZ electrolyte membrane with thickness of about 80 nm and diameter of about 50 μm. Array size may be scaled up to 4 mm and each electrolyte membrane may be supported by surrounding single crystalline silicon with the thickness of about 3 to about 5 μm. The corners may be reinforced with a tapered silicon support creating by combination of plasma and wet silicon etching to effectively avoid sharp corners inducing stress concentrations.

The different effects of using potassium hydroxide (KOH) etching with or without (deep reactive ion etch) DRIE trench (formed before using KOH etching) are shown in FIGS. 3A-3D and FIGS. 4A-4D. FIGS. 3A-3D show the effect of KOH etching on a structure without using DRIE while FIGS. 4A-4D show the effect of KOH etching on a structure in which DRIE is carried out before KOH etching.

Experimental Data

Experiment 1

Figure 3A:
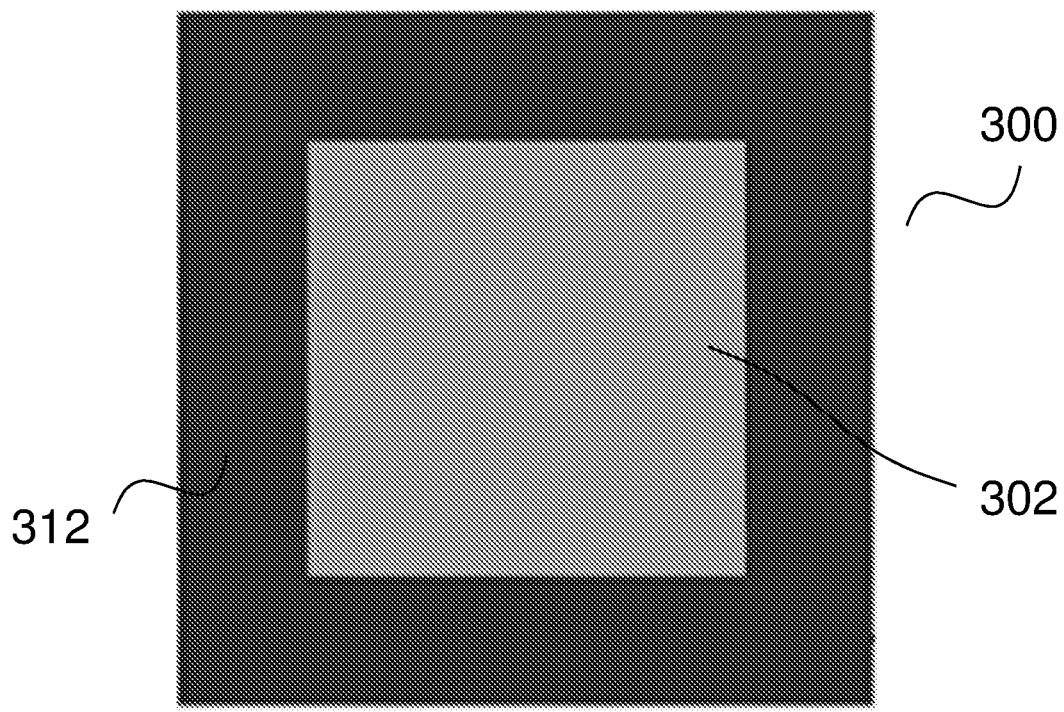
FIG. 3A is a schematic showing the planar bottom view of structure with a substrate covered by a dielectric layer such as silicon nitride ($Si_3N_4$) before etching using potassium hydroxide (KOH) etching.
Figure 3B:
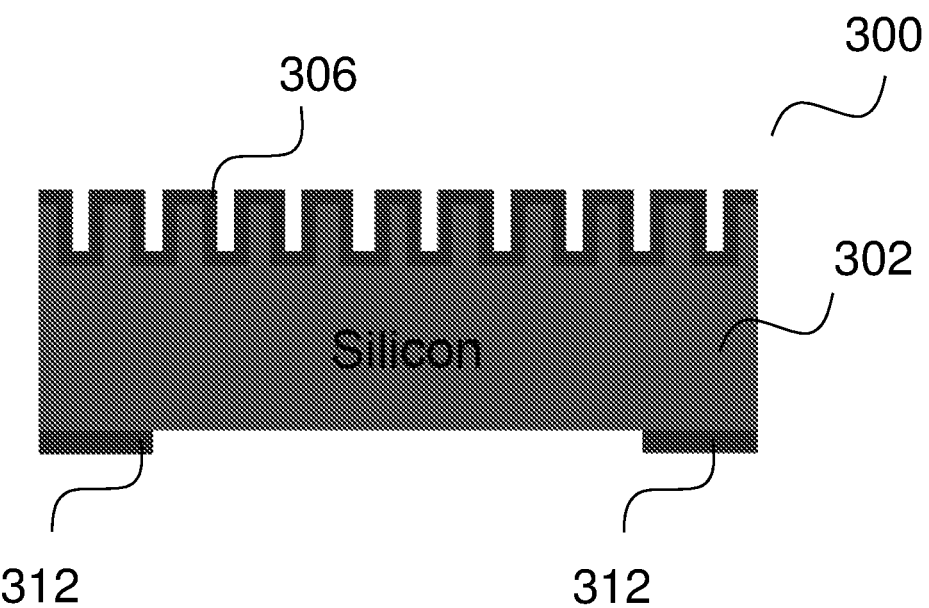
FIG. 3B is a schematic showing the side view of the structure shown in FIG. 3A.
Figure 3C:
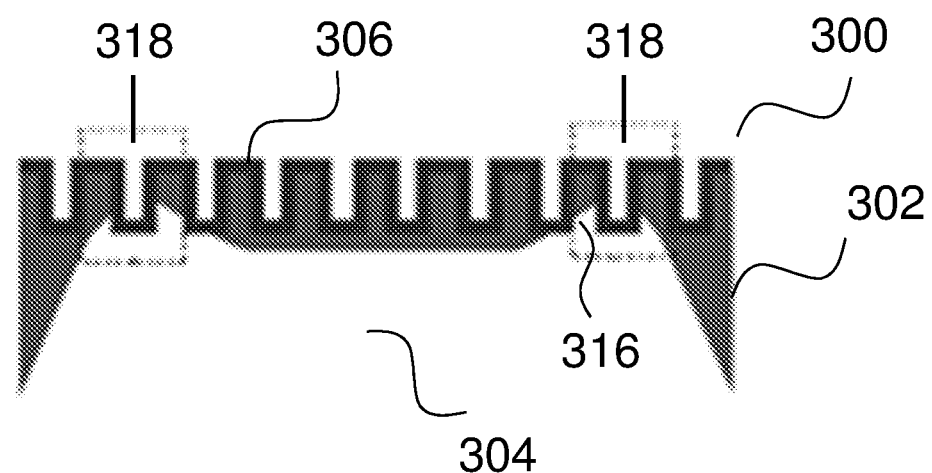
FIG. 3C is a schematic showing the side view of the structure after etching using potassium hydroxide (KOH) etching.
Figure 3D:
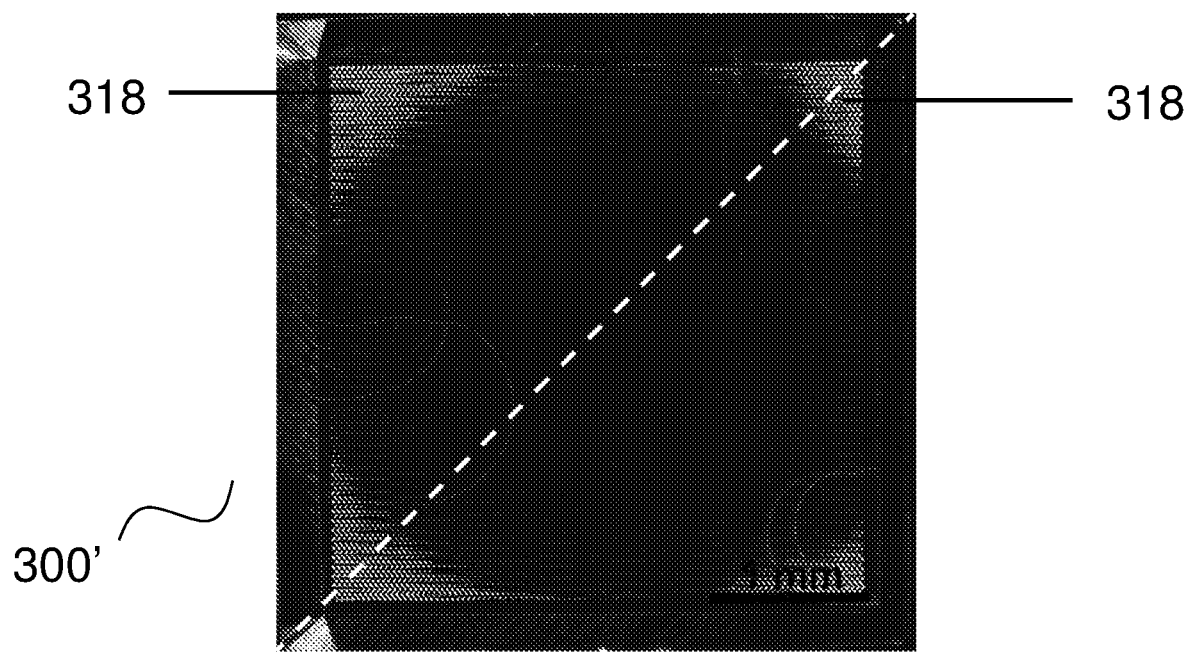
FIG. 3D is an optical image of the structure.

FIG. 3A is a schematic showing the planar bottom view of structure 300 with a substrate 302 covered by a dielectric layer 312 such as silicon nitride ($Si_3N_4$) before etching using potassium hydroxide (KOH) etching. FIG. 3B is a schematic showing the side view of the structure 300 shown in FIG. 3A. The substrate 302 may have a plurality of trenches and may have an electrolyte layer 306 on the top surface. FIG. 3C is a schematic showing the side view of the structure 300 after etching using potassium hydroxide (KOH) etching. The structure 300 has a cavity 304. FIG. 3D is an optical image 300' of the structure 300. 318 corresponds to the boxed region shown in FIG. 3C.

Figure 4A:
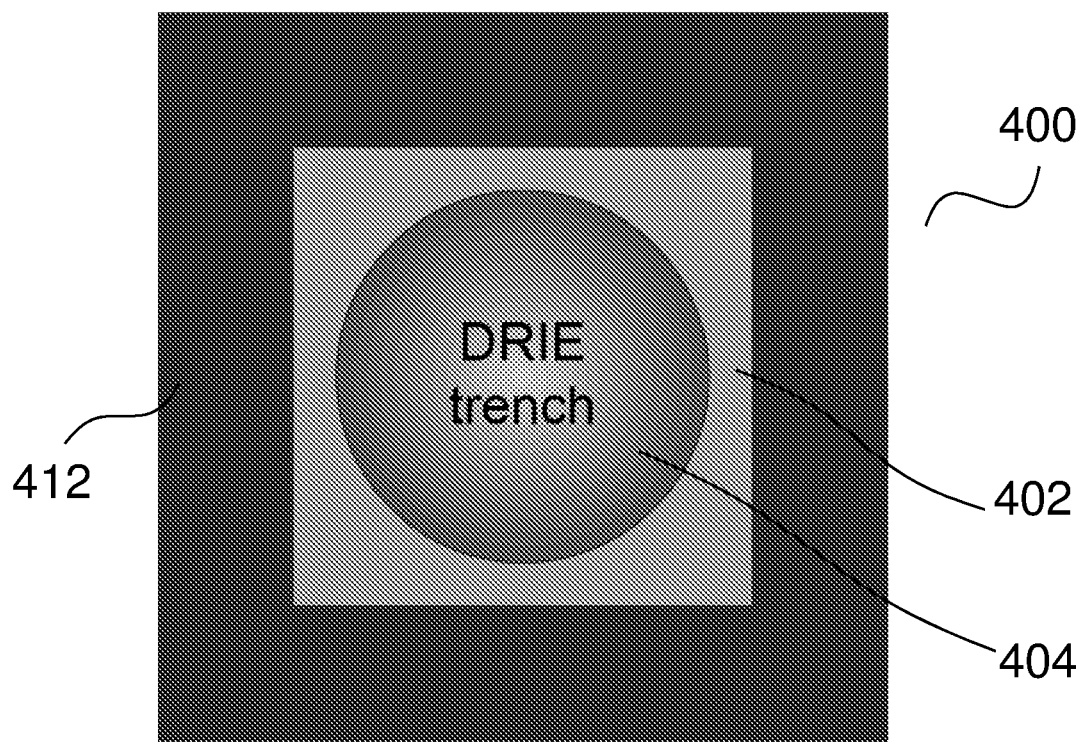
FIG. 4A is a schematic showing the planar bottom view of structure with a substrate covered by a dielectric layer such as silicon nitride ($Si_3N_4$) before etching using potassium hydroxide (KOH) etching according to various embodiments.
Figure 4B:
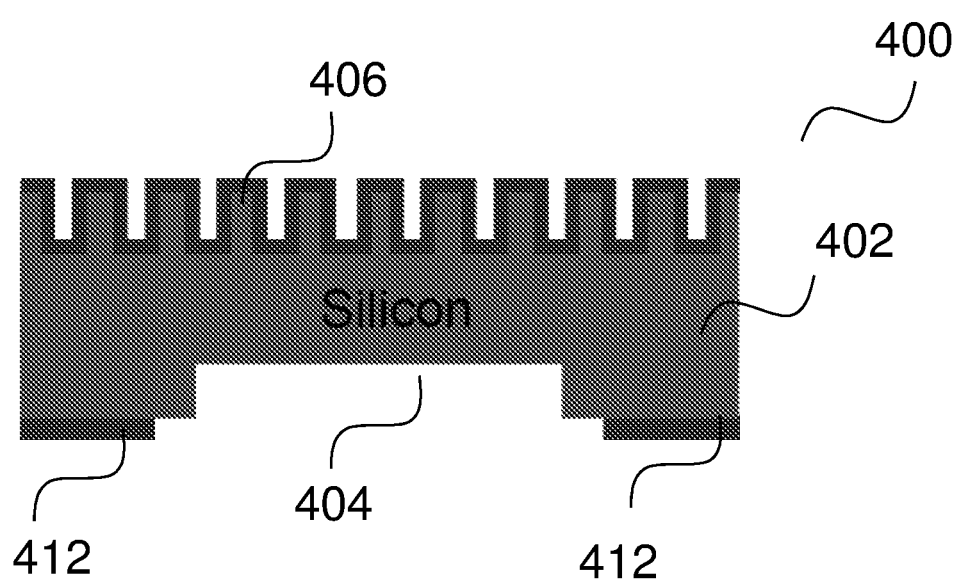
FIG. 4B is a schematic showing the side view of the structure shown in FIG. 4A.
Figure 4C:
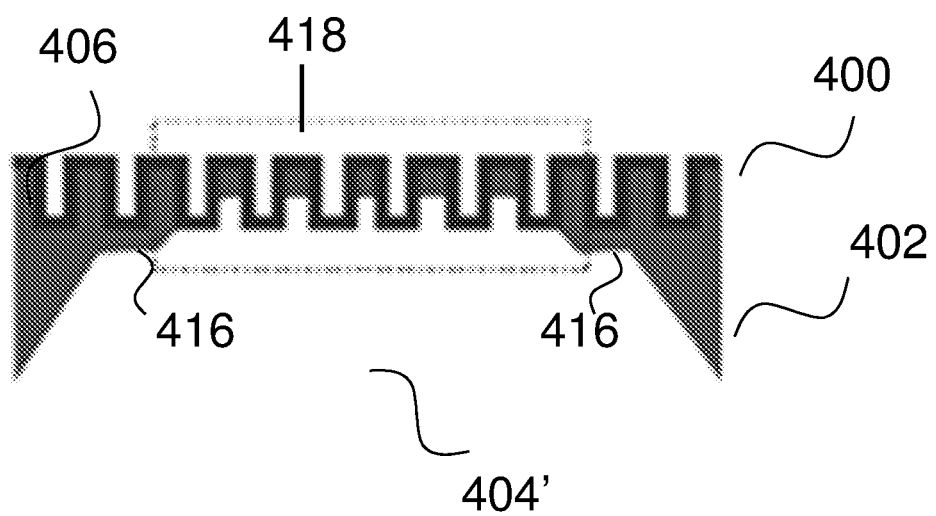
FIG. 4C is a schematic showing the side view of the structure after etching using potassium hydroxide (KOH) etching according to various embodiments.
Figure 4D:
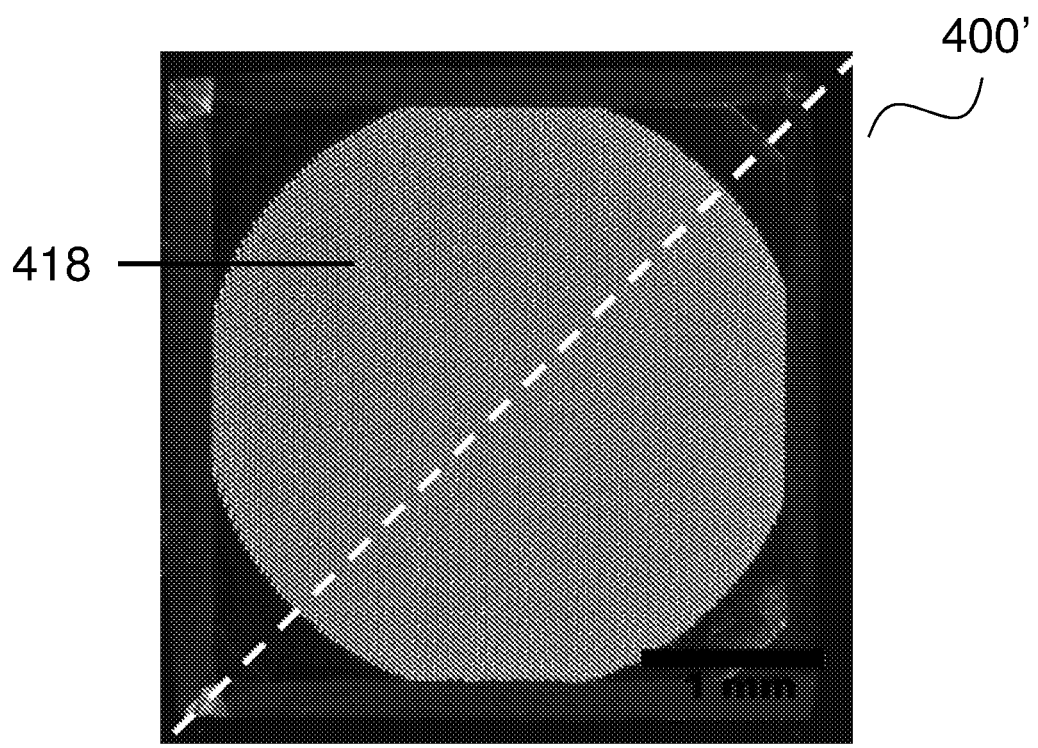
FIG. 4D is an optical image of the structure according to various embodiments.

FIG. 4A is a schematic showing the planar bottom view of structure 400 with a substrate 402 covered by a dielectric layer 412 such as silicon nitride ($Si_3N_4$) before etching using potassium hydroxide (KOH) etching according to various embodiments. As shown in FIG. 4A, the substrate has a deep reactive ion etch (DRIE) cavity 404 not covered by the dielectric layer 412. FIG. 4B is a schematic showing the side view of the structure 400 shown in FIG. 4A according to various embodiments. The substrate 402 may have a plurality of trenches and may have an electrolyte layer 406 the top surface. FIG. 4C is a schematic showing the side view of the structure 400 after etching using potassium hydroxide (KOH) etching according to various embodiments. The cavity 404 has increased in size to form enlarged cavity 404'. FIGS. 4A-C show a method of forming an energy conversion device according to various embodiments. FIG. 4D is an optical image 400' of the structure 400 according to various embodiments. 418 corresponds to the boxed region shown in FIG. 4C.

As shown in FIG. 3C, anisotropic KOH etching without DRIE trench may induce over-etched corners due to the uneven etching rate according to silicon crystallinity. The over-etching may introduce a feeble anchor 318 at each corner which is highly vulnerable to mechanical and thermal impact. Furthermore, the center part of array 306 may still blocked by silicon residues and further etching to fully release the electrolyte membrane 306 from the substrate 302 may make the edge of silicon membrane 306 more unstable and subsequently induces membrane failure from the corners. On the other hand, introducing DRIE circular trench 404 inside the KOH etching window may generate a new plane after KOH etching process and may form a tapered edge reinforcement 416. The surface created by DRIE trench may be orthogonal to silicon <100> orientation, and the etching rate at this surface may be faster than of <100> plane. The newly created structure on the corners of array may be a tapered and rounded silicon support 416, which may reinforce the silicon supporting membrane 406 and with silicon residues underneath the array 406 was fully removed.

Figure 5A:
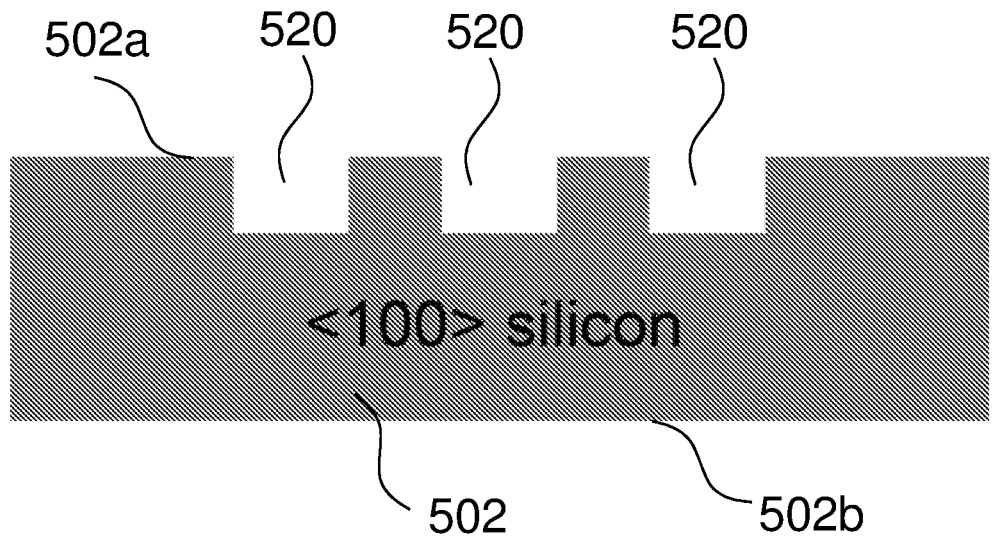
FIG. 5A is a schematic illustrating side view of a silicon wafer being etched according to various embodiments.
Figure 5B:
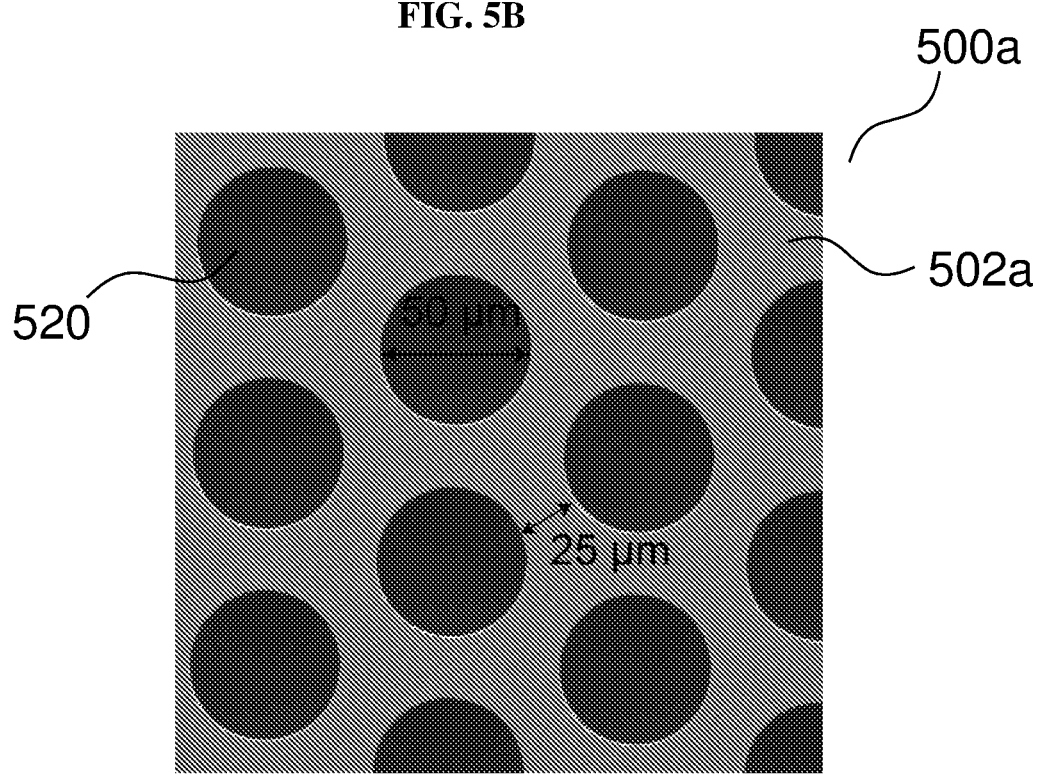
FIG. 5B is an image showing the top view of a surface of the wafer according to various embodiments.

FIGS. 5A-H illustrate a method of forming a micro solid oxide fuel cell (μSOFC) 500 according to various embodiments. FIG. 5A is a schematic illustrating side view of a silicon wafer 502 being etched according to various embodiments. FIG. 5B is an image showing the top view of a surface 502a of wafer 502 according to various embodiments. A four-inch <100> double-side polished silicon wafer 502 with thickness of about 400 μm is utilized as a supporting substrate of the μ-SOFCs array 500. Circular trenches 520 are generated on a top surface 502a of the wafer 502 using photolithography and deep-reactive ion etching (DRIE). The diameter of the circular trenches 520 may be about 50 μm as shown in FIG. 5B, and the depth may be about 30 μm.

Figure 5C:
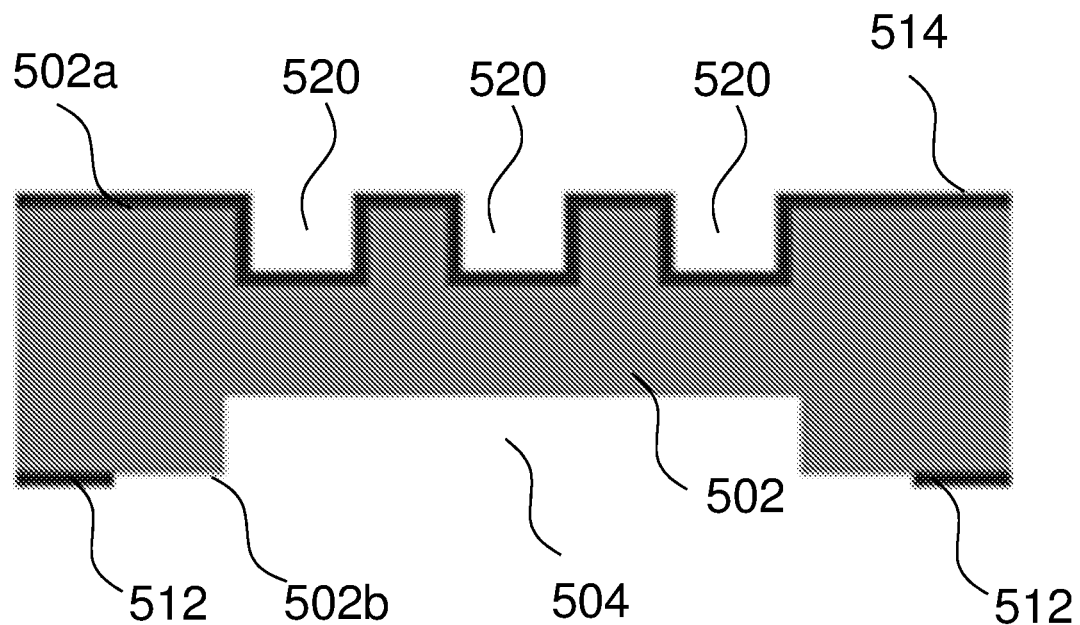
FIG. 5C is a schematic illustrating side view of the wafer with dielectric layers being formed on the wafer according to various embodiments.

FIG. 5C is a schematic illustrating side view of the wafer 502 with dielectric layers 512, 514 being formed on the wafer 502 according to various embodiments. Low stress silicon nitride 512, 514, which are 200 nm in thickness, may be deposited by low pressure chemical vapor deposition (LPCVD) to form dielectric layer 512 on the bottom surface 502b and dielectric layer 514 on the top surface 502a. The backside nitride layer 512 may be then patterned with square open windows and etched by reactive ion etching. Afterward, to generate a reinforced edge support, a DRIE trench 504 with a depth of 30 μm may be patterned inside the open window.

Figure 5D:
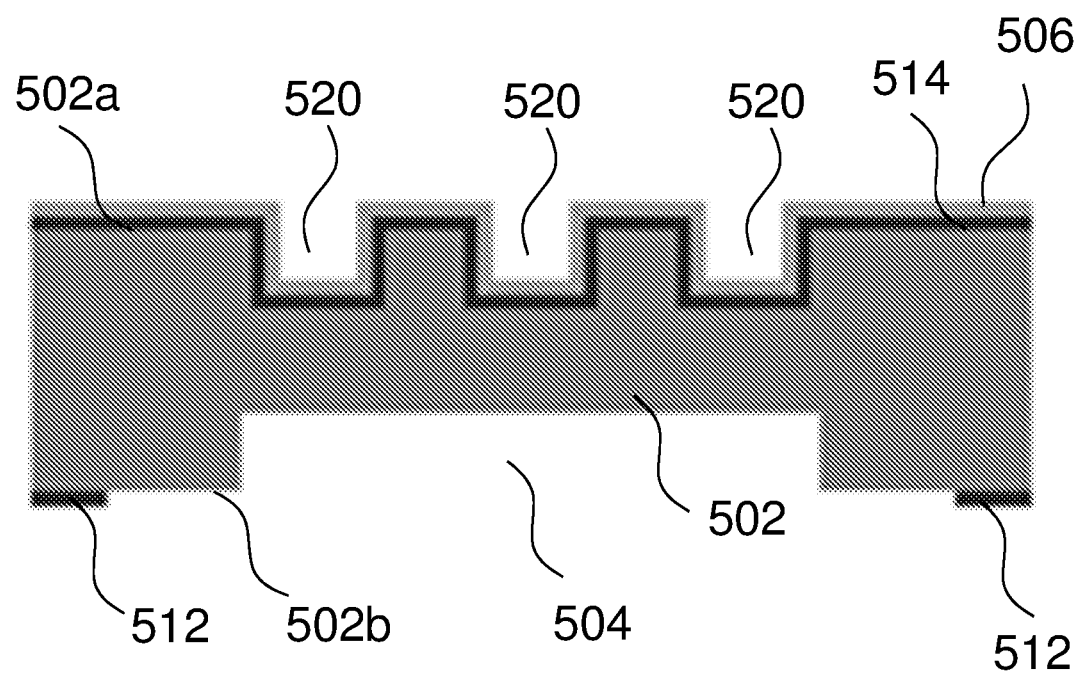
FIG. 5D is a schematic illustrating side view of the wafer with an electrolyte layer being formed over the top surface of the silicon wafer according to various embodiments.

FIG. 5D is a schematic illustrating side view of the wafer 502 with an electrolyte layer 506 being formed over the top surface 502a of the silicon wafer 502 according to various embodiments. Thin film YSZ electrolyte with thickness of 80 nm may be deposited onto dielectric layer 514 by atomic layer deposition (ALD) with the condition similar to previously reported works (P. C. Su, C. C. Chao, J. H. Shim, R. Fasching and F. B. Prinz, *Nano Lett,* 2008, 8, 2289-2292; P. C. Su and F. B. Prinz, *Electrochemistry Communications,* 2012, 16, 77-79; P. C. Su and F. B. Prinz, *Microelectronic Engineering,* 2011, 88, 2405-2407) to form electrolyte layer 506 on nitride layer 512. The deposited YSZ thin film 506 may replicate or follow the surface contour of pre-patterned circular trenches 520 on the top side and may form a three-dimensional thin film.

Figure 5E:
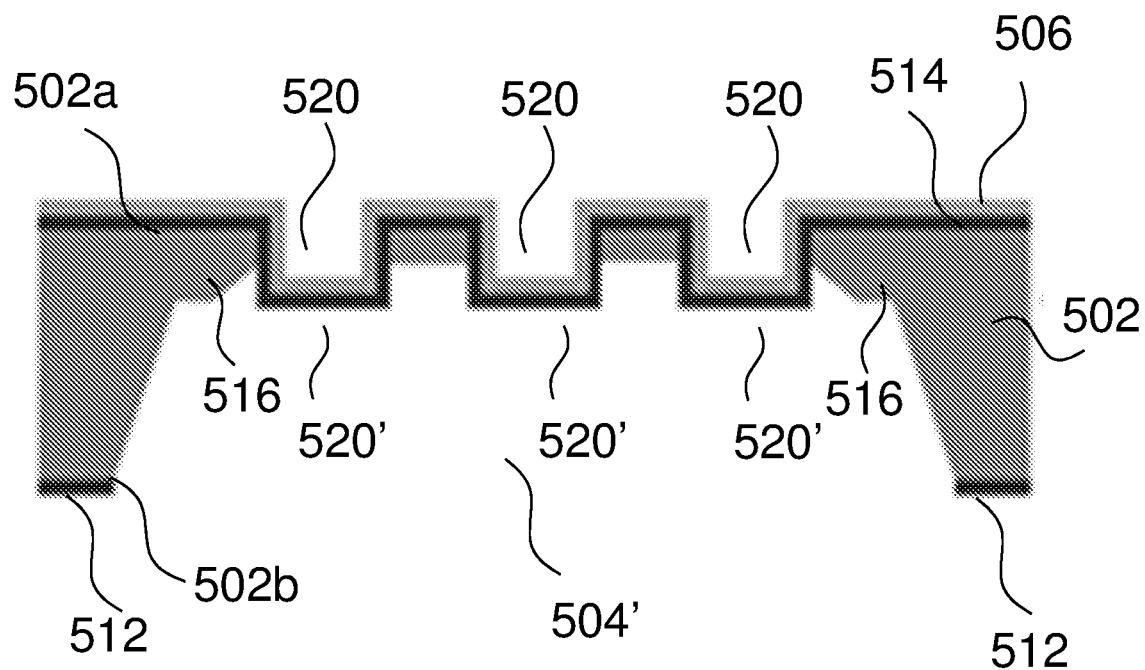
FIG. 5E is a schematic illustrating side view of the wafer in which the cavity is enlarged according to various embodiments.
Figure 5F:
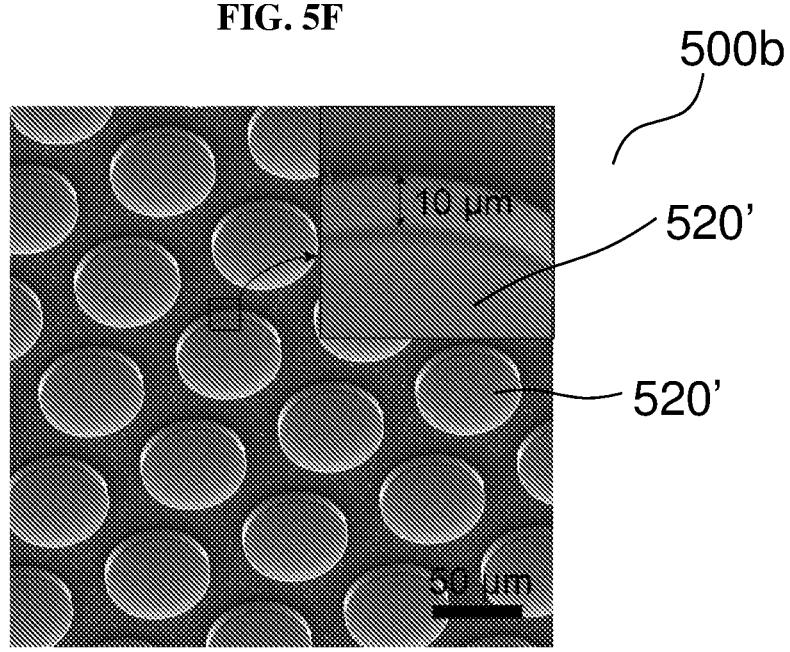
FIG. 5F is an image showing circular arrayed cells viewed from bottom after wet etching according to various embodiments.

FIG. 5E is a schematic illustrating side view of the wafer 502 in which the cavity 504 is enlarged according to various embodiments. The silicon substrate 502 may be then etched by through-wafer etching in 30 weight percent (wt %) KOH solution at 85° C. (i.e. wet etching) to remove silicon until 20 μm of silicon remained, and an edge-reinforced silicon membrane 516 for supporting μ-SOFC array may be fabricated. An enlarged cavity 504' may be formed from the cavity 504. FIG. 5F is an image 500b showing circular arrayed cells 520' viewed from bottom after wet etching according to various embodiments.

Figure 5G:
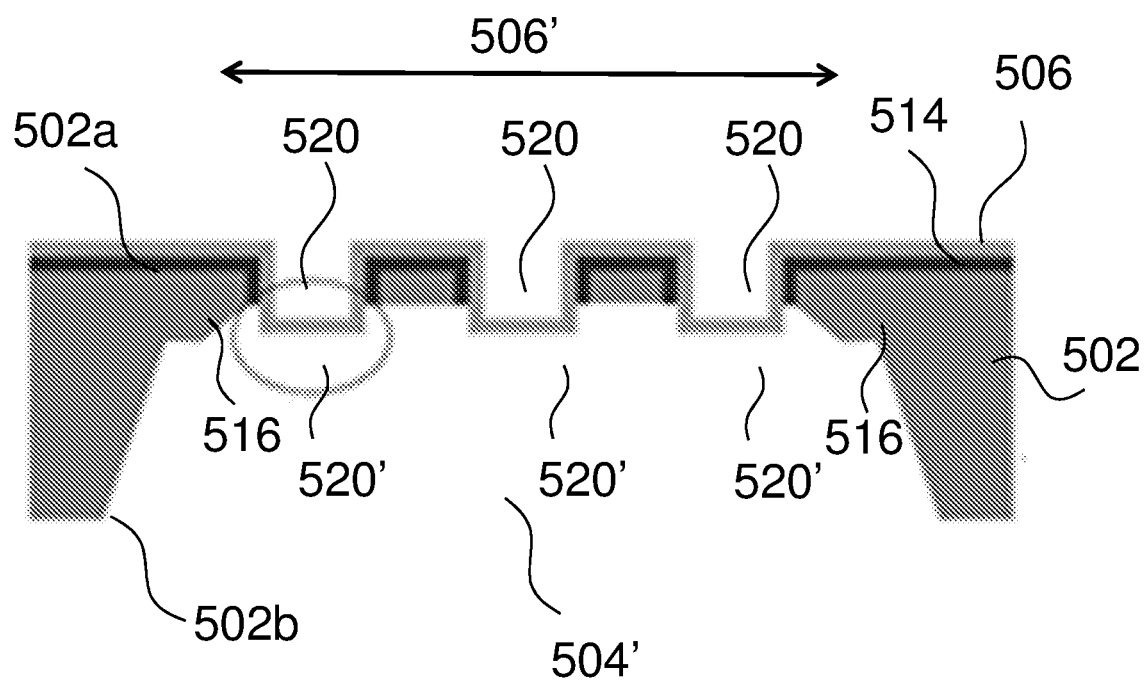
FIG. 5G is a schematic illustrating side view of the wafer in which the dielectric layer exposed by the enlarged cavity is also etched according to various embodiments.
Figure 5H:
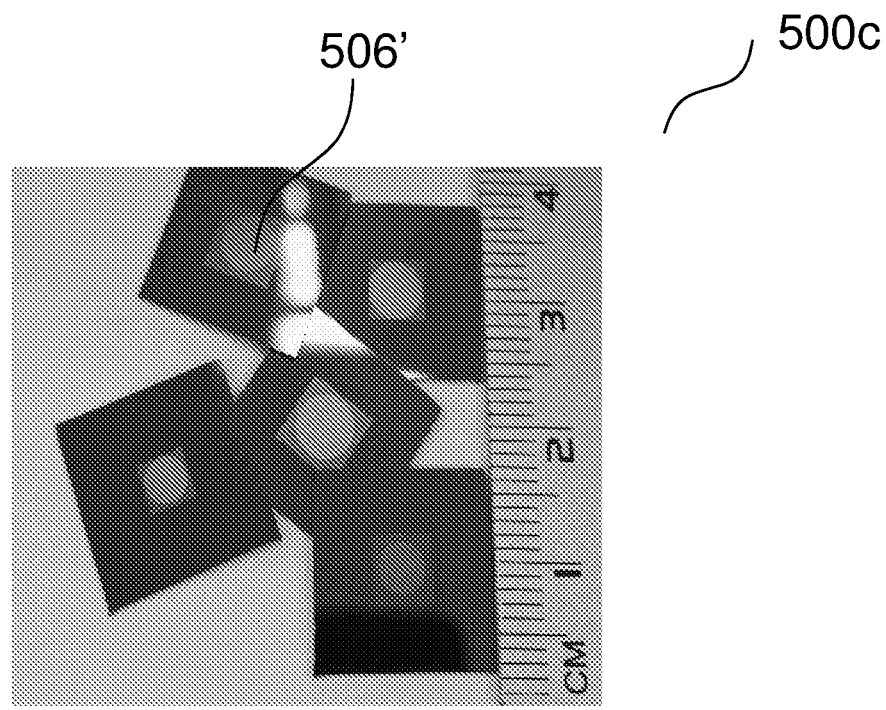
FIG. 5H is an image showing circular arrays on 1.5 mm×1.5 mm silicon chips according to various embodiments.

FIG. 5G is a schematic illustrating side view of the wafer 502 in which the dielectric layer 514 exposed by the enlarged cavity 504' is also etched according to various embodiments. The process as illustrated in FIGS. 5A, C, D, E and G may result in the electrolyte layer 506 being corrugated. The layer 506 may have an array 506' of cup-shaped folds 520'. FIG. 5H is an image 500c showing circular arrays 506' on 15 mm×15 mm silicon chips 520 according to various embodiments. The dielectric layer 512 may also be completely removed.

FIG. 5I is a schematic illustrating side view of the wafer 502 with electrodes 508, 510 formed according to various embodiments. Both cathode 508 and anode 510 of the μ-SOFCs array may be deposited by radio-frequency (RF) sputtering or direct current (DC) sputtering with a nanoporous platinum. It may also be envisioned that the top electrode 508 is the anode and the bottom electrode 510 is the cathode. The deposition may be done at a suitable pressure and power, e.g. 30 mTorr Ar pressure and 100 W RF power without a substrate heating. The thickness of platinum electrodes 508, 510 in one embodiment may be about 100 nm, and after deposition of platinum electrodes 508, 510, each YSZ cell 520' may become an individual fuel cell, and all individual fuel cells 520' in the array 506' may be connected in parallel. The electrolyte layer 506/array 506' may be supported by a silicon membrane 502', which is formed from the substrate 502 by the KOH etch. In FIGS. 5A-H, only three cells 520' have been drawn to illustrate the fabrication process. In the actual arrays fabricated, a total number of approximately 2,600 individual cells have been embedded in a single circular window 506' with a diameter of 4 mm. Circular arrays 506' formed on circular templates with various diameters are shown in FIG. 5G.

FIG. 5I shows that the enlarged cavity 504' may be defined by a first lateral cavity surface 504a, a second lateral cavity surface 504b, a third lateral cavity surface 504c, as well as a base surface including electrode layer 510 on electrolyte layer 506 as well as the silicon membrane 502'. The first lateral cavity surface 504a may adjoin surface 502b of the substrate 502, the second lateral cavity surface 504b may adjoin first lateral cavity surface 504a, the third lateral cavity surface 504c may adjoin the second lateral cavity surface 504b, and the base surface may adjoin the third lateral cavity surface 504c. The first lateral cavity surface 504a, the second lateral cavity surface 504b and the third lateral cavity surface 504c, and the base surface may lie along different planes of the semiconductor substrate 502. The first lateral cavity surface 504a, the second lateral cavity surface 504b and the third lateral cavity surface 504c may be lateral to the cavity 504 and the base surface. The second lateral cavity surface 504b may be substantially parallel to surface 502a and/or surface 502b of substrate 502. The second lateral cavity surface 504b may lie along the (100) plane of the semiconductor substrate 502. The first lateral cavity surface 504a may be substantially along the (111) plane of the semiconductor substrate 502.

For fuel cell measurement, an μ-SOFCs array on circular template with a diameter of 3.6 mm has been prepared with a total of 2100 individual thin film μ-SOFCs connected in parallel. The array is characterized by potentiostat (Solartron 1470E, Solartron Analytical) at 350 and 400° C. to obtain current-voltage (I-V) behavior. Dry $H_2$ is been supplied at the flow rate of 5 sccm on anode side, and cathode side is opened to ambient air as the oxidant. To investigate thermal stability of a circular array structure, thermal cycling test is performed between 150° C. and 400° C. inside a custom-made furnace. Cooling and heating rates were set up as 10° C./min. To apply a harsher thermal condition on the membrane, heating and cooling rates were increased to both 25° C./min. The furnace is surrounded by a ceramic wall to maintain a stable convection from the outside. Field emission secondary electron microscope (FESEM, JEOL JSM-7600F) and an optical microscope are used for morphological and dimensional characterization of the cells.

The addition of DRIE circular trench generated a new etched profile around the membrane. Cross-section of silicon supporting structure with a FESEM image is illustrated in FIGS. 6A-C.

Figure 6A:
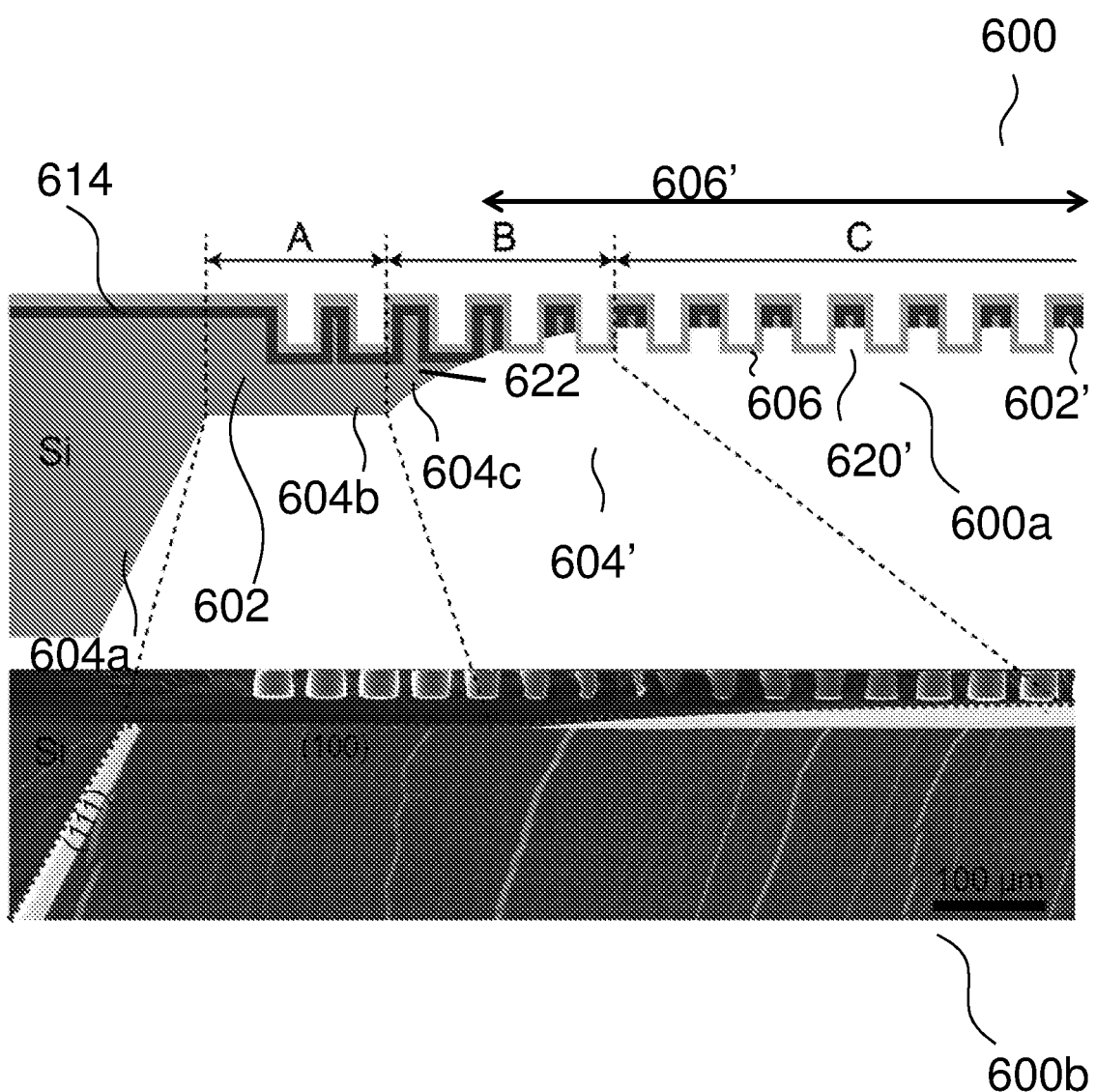
FIG. 6A shows the schematic and image of a micro solid oxide fuel cell (µSOFC) according to various embodiments.

FIG. 6A shows the schematic 600a and image 600b of a micro solid oxide fuel cell (μSOFC) 600 according to various embodiments. FIG. 6A may result from the process illustrated in FIGS. 5A-I. The fuel cell 600 may correspond to fuel cell 500 shown in FIG. SI. The fuel cell 600 may include a silicon substrate 602 with lateral cavity side surfaces 604a, 604b, 604c defining enlarged cavity 604. The fuel cell 600 may include a dielectric layer 614 on the silicon substrate 602, and a corrugated electrolyte layer 606 with one portion suspended over enlarged cavity 604a and another portion over the substrate 602.

The silicon support for the array may consist of three different portions: A—(100) plane 604b by anisotropic etching; B—tapered plane 604c between (100) and (111) planes; and C—silicon membrane 602' for supporting 80 nm thick YSZ membrane array 606' to form array 606' of cells 620'. In addition, the enlarged cavity 604' may be bound by (111) plane 604a. The tapered plane 604c may have an angle of 4° to silicon (100) plane, and may be evolved from the boundary of DRIE trench formed. The tapered edges 622 may play a role in fortifying the silicon supporting membrane structure 602' as an anchor, which may reduce the chances of failure. The tapered edges 622 may be bound by surface 604c. The process may result in an enlarged cavity 604' having a circular cross sectional plane parallel to surface of the substrate 602. The process may also result in the portion of the membrane 606 being suspended over the enlarged cavity 604' be of circular shape. In other words, the enlarged cavity 604' may be at least partially defined by the electrolyte layer 606 and may form a circular interface with the electrolyte layer 606. Compared to square μ-SOFC membranes (in which membranes are suspended over cavities with square cross-sectional areas along a plane parallel to the plane of the substrate), membranes suspended over circular shaped cavities may evenly distribute the stress on the membrane and may have significantly reduced chances of breaking.

Figure 6B:
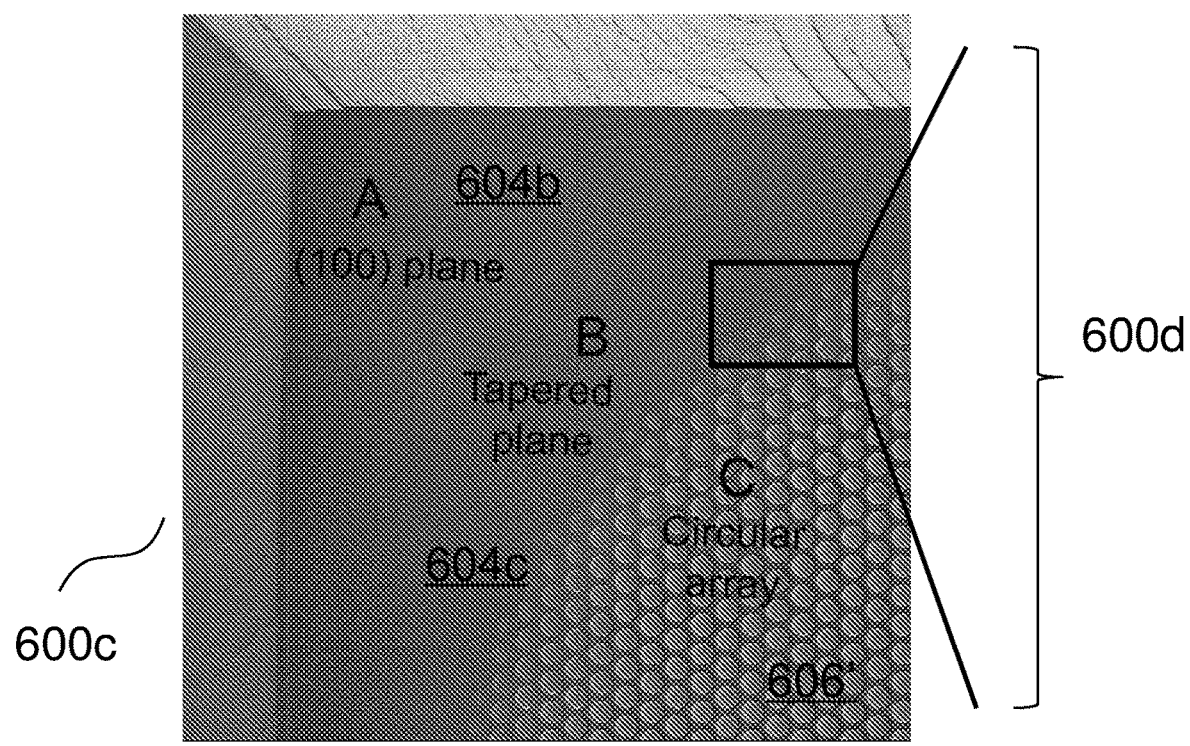
FIG. 6B shows an image taken from the bottom showing different planes and the array of cells according to various embodiments.
Figure 6C:
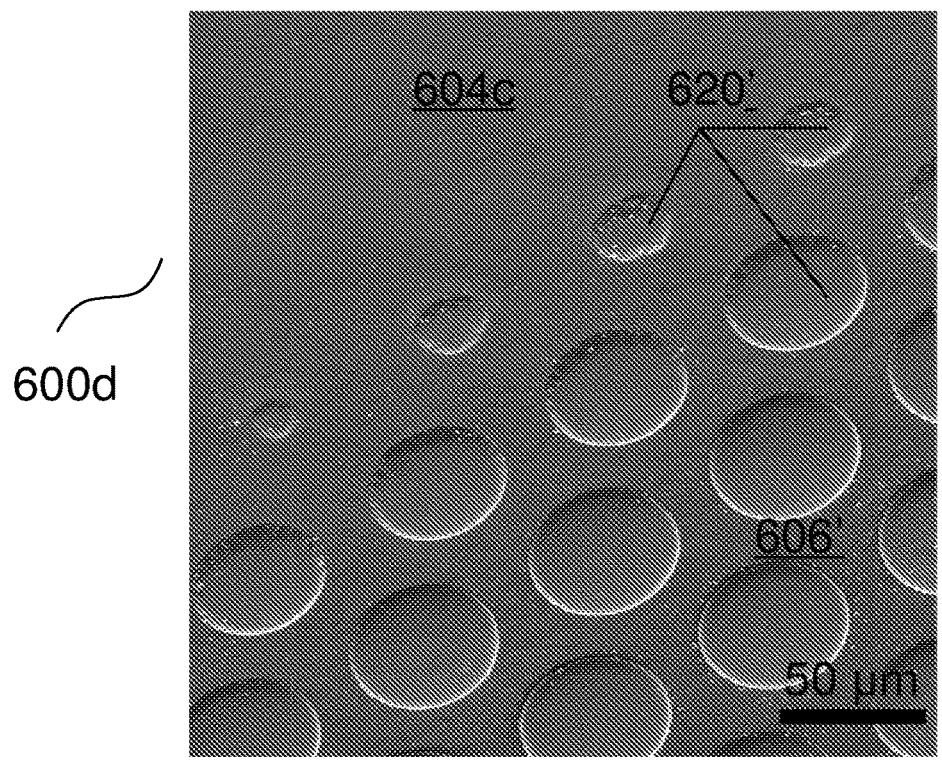
FIG. 6C is an image showing the transition between (100) plane and the array of cells according to various embodiments.

FIG. 6B shows an image 600c taken from the bottom showing planes 604b, 604c and array 606' of cells 620' according to various embodiments. FIG. 6C is an image 600d showing the transition between (100) plane 604c and the array 606' of cells 620' according to various embodiments.

The dimension of supporting structures 622 may be controlled by various parameters of KOH etching window and DRIE. The depth of DRIE trench is 30 μm in one experiment. From the images 600b, 600c, three-stage supports may clearly be observed and image 600d shows the transition region between tapered plane 604b and array support plane 606'. The entire array 606' may be sustained by stress-free single crystal silicon. The distance between centres of neighbouring individual cells in array 606' may be about 1 μm and above. Complex stress conditions observed in freestanding square thin films may be reduced. Various embodiments may provide better mechanical stability.

Figure 7A:
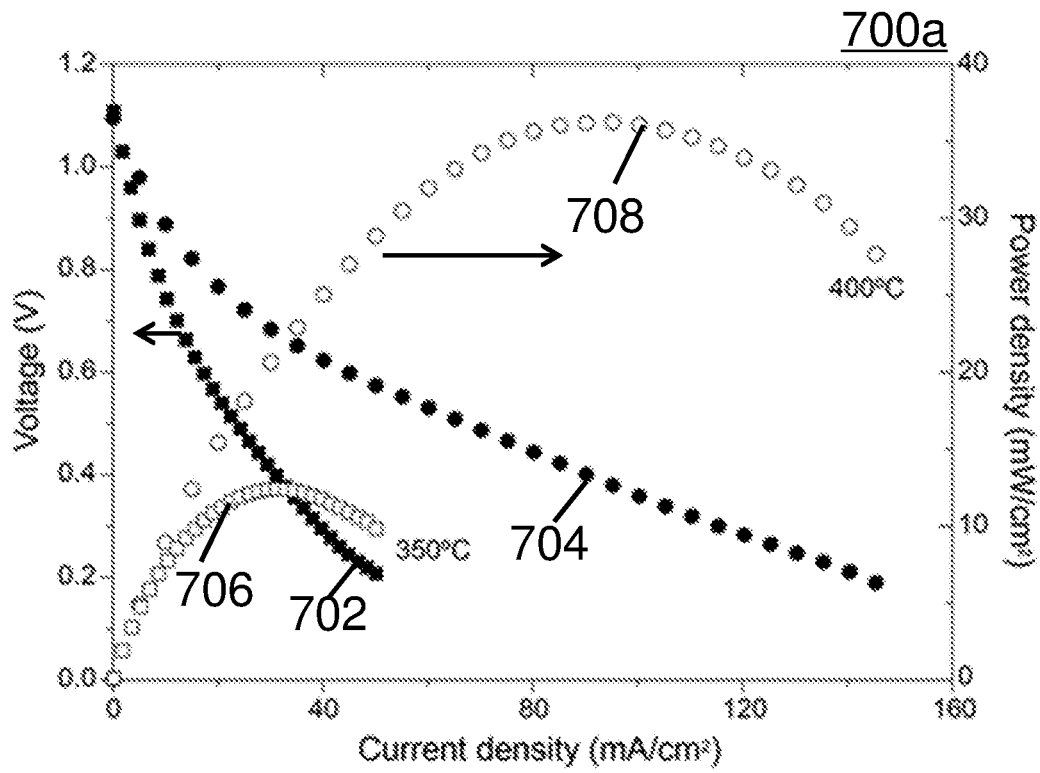
FIG. 7A is a plot of voltage (V)/power density (mW/cm$^2$) against current density (mA/cm$^2$) of a circular micro solid oxide fuel cell (µSOFC) according to various embodiments.
Figure 7B:
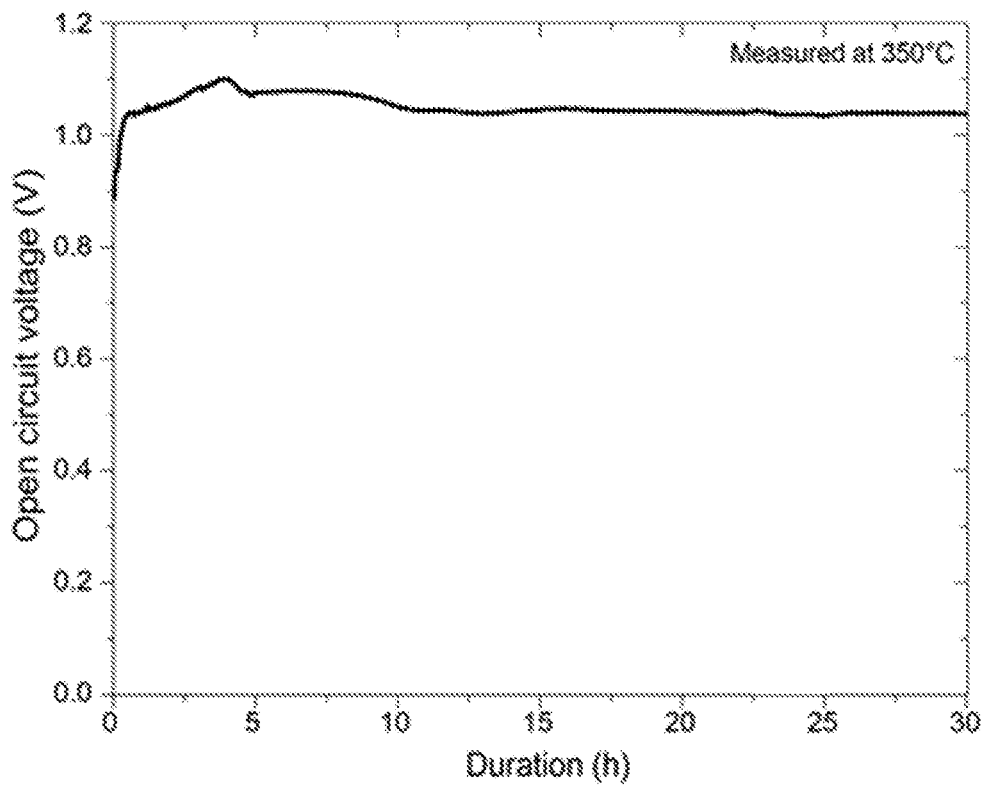
FIG. 7B is a plot of open circuit voltage (V) against duration (hours or h) showing the open circuit voltage stability of the micro solid oxide fuel cell (µSOFC) according to various embodiments.

FIG. 7A is a plot 700a of voltage (V)/power density ($mW/cm^2$) against current density ($mA/cm^2$) of a circular micro solid oxide fuel cell (μSOFC) according to various embodiments. To verify the functional stability of array μ-SOFCs, long-term open circuit voltage (OCV) tests were carried out. Line 702 show the voltage measured as a function of current density at 350° C.; line 704 show the voltage measured as a function of current density at 400° C.; line 706 show the power density as a function of current density at 350° C.; and line 708 show the power density as a function of current density at 400° C. FIG. 7B is a plot 700b of open circuit voltage (V) against duration (hours or h) showing the open circuit voltage stability of the micro solid oxide fuel cell (μSOFC) according to various embodiments.

FIG. 7B is a plot 700b showing the long-term OCV result measured over 30 h at 350° C. It is noteworthy fact that OCV has slightly increased to 1.1 V during initial 5 h and stabilized at 1.03 V without OCV degradation and failure. This result may indicate that the membrane array is a defect-free and gas-impermeable structure.

Figure 7C:
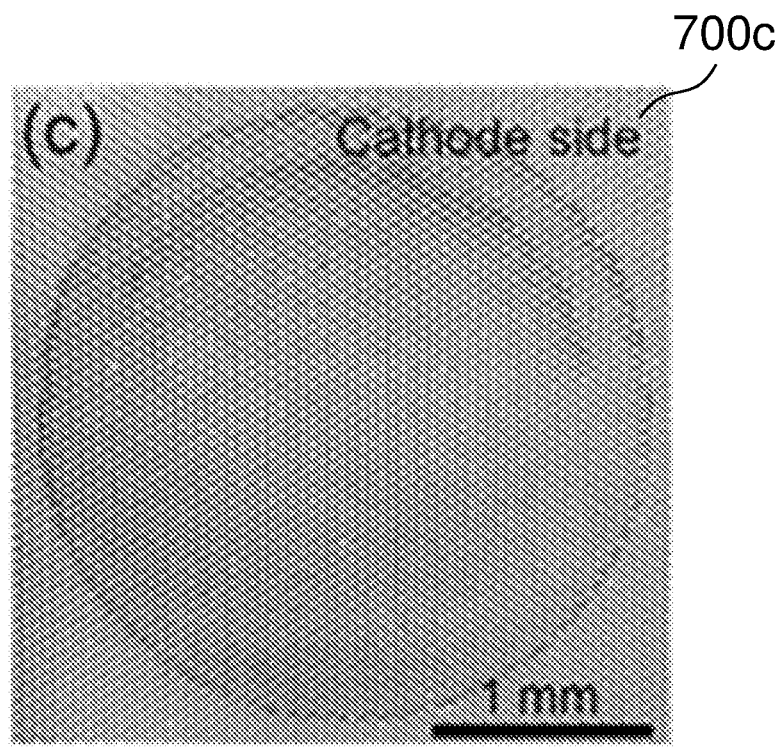
FIG. 7C is an image showing the cathode side of cell according to various embodiments after the open circuit voltage (OCV) test.
Figure 7D:
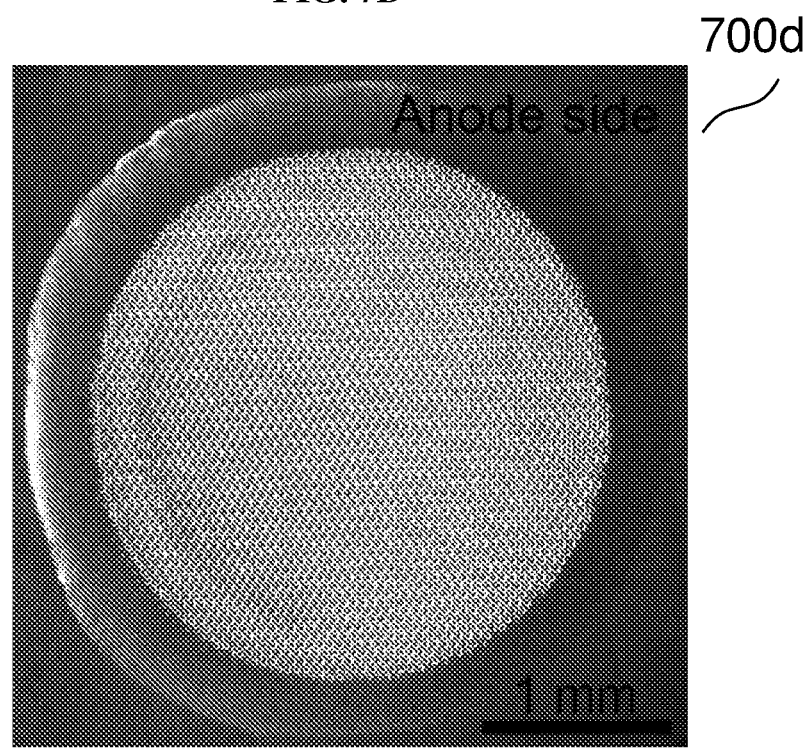
FIG. 7D is an image showing the anode side of the cell according to various embodiments after the open circuit voltage (OCV) test.

FIG. 7C is an image 700c showing the cathode side of cell according to various embodiments after the open circuit voltage (OCV) test. FIG. 7D is an image 700d showing the anode side of the cell according to various embodiments after the open circuit voltage (OCV) test. No visible failures and degradations of the membranes have been observed.

The polarization curves from the 3.6 mm μ-SOFC array measured at 350 and 400° C. are shown in FIG. 7A. High open circuit voltage (OCVs) of 1.1 V has been obtained and the peak power density is 36.2 $mW/cm^2$ at 400° C., which is lower than those previously reported. This may be due to the contamination issues during fabrication processes. However, the total power output from the 3.6 mm array was approximately 1.48 mW which is significantly greater than that delivered by the highest performance μ-SOFC reported to date (3.7 μW from a 43 μm×43 μm membrane with 1.3 $W/cm^2$ at 450° C., J. An, Y-B. Kim, J. Park, T. M. Gur and F. B. Prinz, *Nano Letters*, 2013, 13, 4551-4555.).

The thermal stability of μ-SOFCs array may be verified by repeated thermal cycles. Total 7 thermal cycling tests were performed and the μ-SOFCs array is cooled down to 150° C. to avoid vapor condensation and heated up to 400° C. repetitively. From simple calculation with mechanical properties of YSZ electrolyte, a high thermal stress of 700 MPa is applied in the membrane during thermal cycling tests.

Figure 8A:
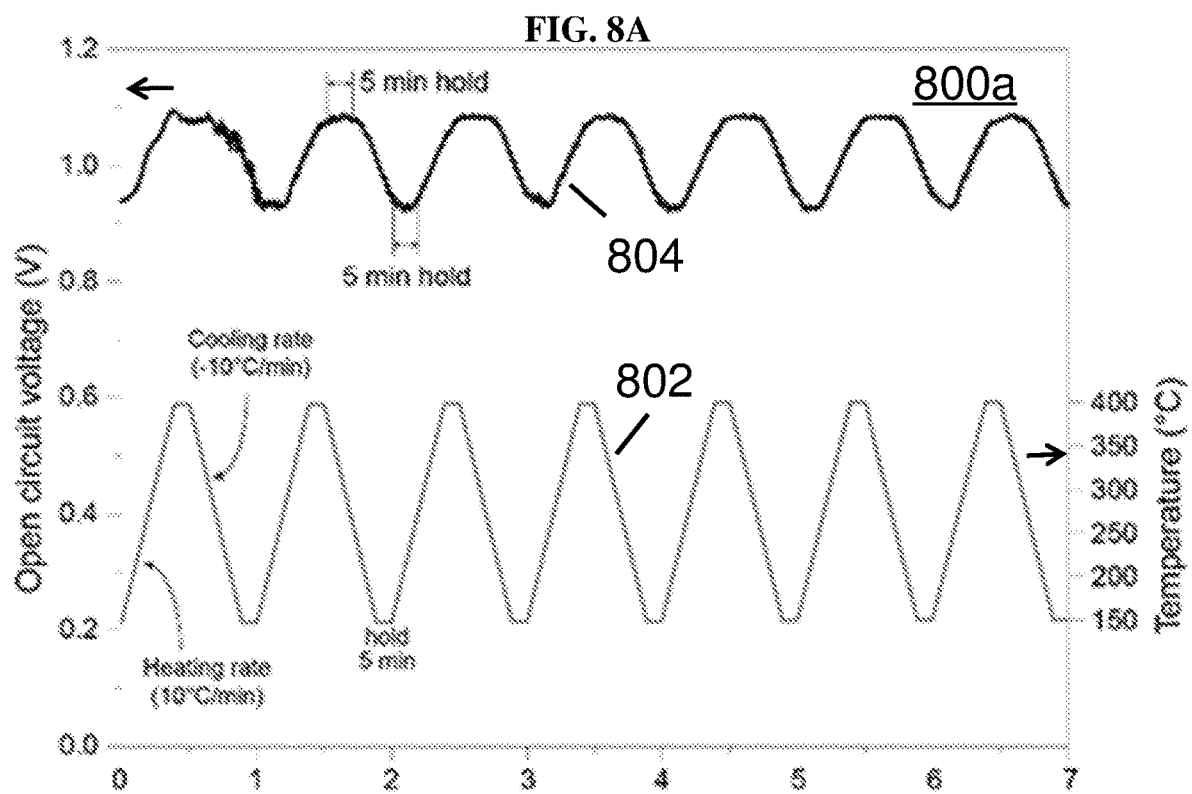
FIG. 8A is a plot of open circuit voltage (V)/temperature (° C.) against number of thermal cycles showing open circuit voltage changes of the device according to various embodiments with moderate thermal cycles (10° C./min) during thermal cycling tests.

FIG. 8A is a plot 800a of open circuit voltage (volts or V)/temperature (° C.) against number of thermal cycles showing open circuit voltage changes of the device according to various embodiments with moderate thermal cycles (10° C./min) during thermal cycling tests. Line 802 indicates the thermal temperatures in which the membrane is subjected to, while line 804 indicates the open circuit voltage (OCV) measured.

Figure 8B:
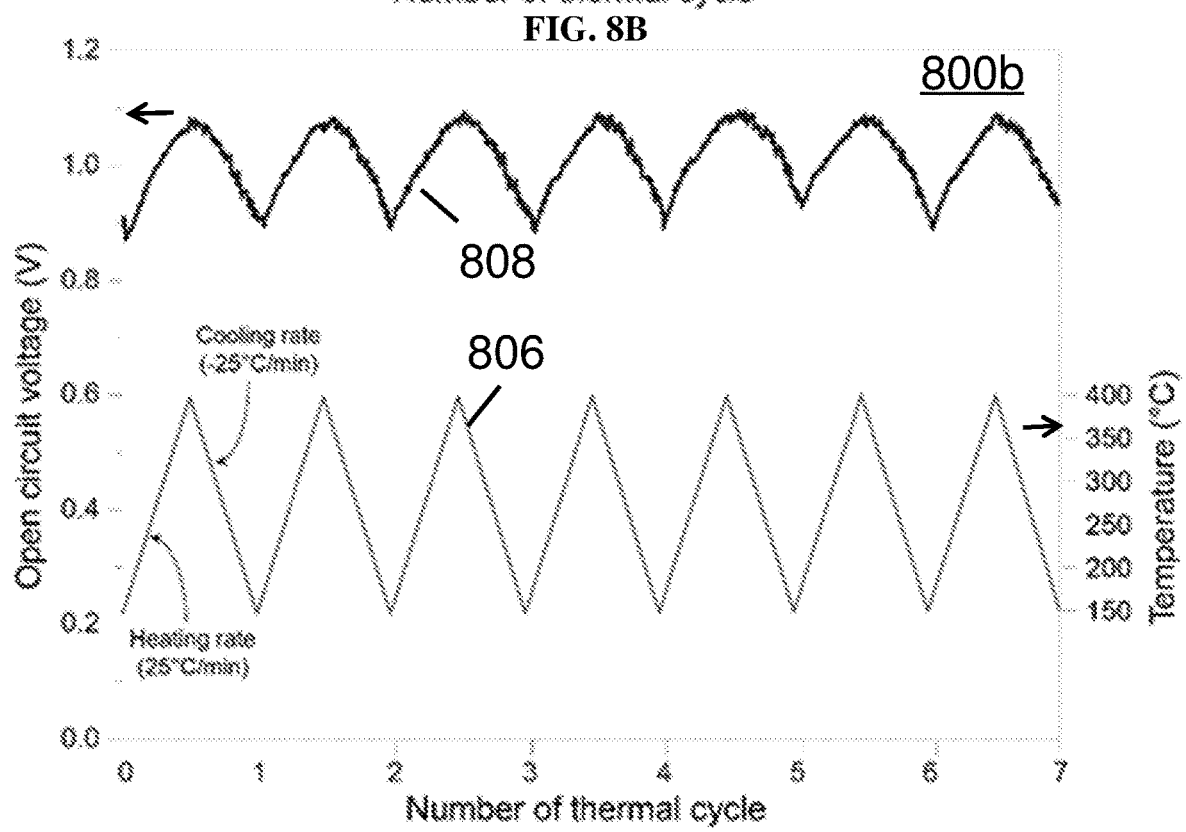
FIG. 8B is a plot of open circuit voltage (V)/temperature (° C.) against number of thermal cycles showing open circuit voltage changes of the device according to various embodiments with steep thermal cycles (25° C./min) during thermal cycling tests.

FIG. 8B is a plot 800b of open circuit voltage (volts or V)/temperature (° C.) against number of thermal cycles showing open circuit voltage changes of the device according to various embodiments with steep thermal cycles (25° C./min) during thermal cycling tests. Line 806 indicates the thermal temperatures in which the membrane is subjected to, while line 808 indicates the open circuit voltage (OCV) measured.

However, reproducible OCV values have been obtained without any short circuit caused by damage of membranes as shown in FIG. 8A. Heating rate and cooling rate are both 10° C./min and isothermal periods of 5 min are imposed after heating or cooling to stabilize OCV. The OCV is found to oscillate between 0.95 V and 1.08 V, exactly following the thermal cycles, which indicates good OCV response according to temperature changes. To introduce harsher thermal conditions on the cell, heating and cooling rate are increased to 25° C./min and thermal cycles without an isothermal period are carried out consecutively. In FIG. 8B, OCV is found to follow the thermal cycles, with the OCV locally fluctuating during cooling. However, no visible membrane deformation and cell degradation have been observed in the μ-SOFCs array during the harsh thermal cycling, which indicate excellent thermo-mechanical integrity of the array architecture.

A scalable, thin-film, μ-SOFC array with the edge-reinforced structure is demonstrated by utilizing silicon-based micromachining techniques according to various embodiments. Circular array μ-SOFCs with edge-reinforced platforms are generated by combining a dry anisotropic etching with a wet anisotropic etching of (100) silicon and successfully fabricated and tested with various diameters (1 mm~6 mm) to study functional and thermal stability With the presented design and fabrication method attaining good mechanical stability of nanothin film SOFCs, the μ-SOFC array is able to achieve high OCV of 1.1 V and to provide 1.38 mW of total power output at 400° C. with the array of 3.6 mm in lateral dimension.

Functional stability is verified with long-term OCV test and thermal cycling test with fast heating and cooling rates (25° C./min) are conducted to confirm the thermal stability. OCV at 350° C. is stably maintained with 1.04 V above 30 h without any membrane failures and no membrane failures from thermal impact due to severe temperature changes are observed. The reinforced silicon edge supports may be provide a better strength by a thicker supporting layer at the edge of the μ-SOFCs array and allow good scalability for higher power output. With the reinforced silicon support, a larger array size of beyond 6 mm may be expected. A higher total power output may be achieved at low temperature through further design and process optimization.

Experiment 2

Micro solid oxide fuel cells (μ-SOFCs) using nanoscale thin-film electrolytes is an emerging area for low-temperature SOFCs operating at 300-500° C. A dense and gas-impermeable electrolyte with sub-micrometer-scale thickness has been demonstrated using thin-film deposition techniques, including atomic layer deposition (ALD), pulsed laser deposition (PLD), and sputtering. Such thin-film electrolytes are typically grown on silicon wafers or porous substrates, such as anodic aluminum oxide (AAO) as supporting substrates. However, as obtaining dense and gas-tight electrolytes with minimized nanoscale thickness is technically challenging, micro-machined silicon substrate remains to be more practical architecture for μ-SOFCs.

Figure 9A:
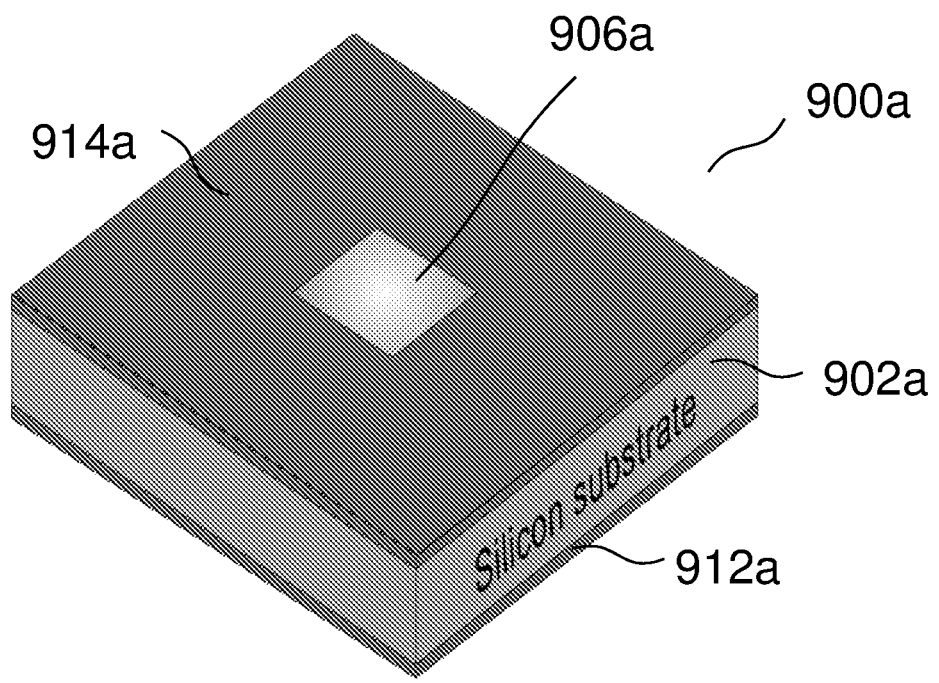
FIG. 9A is a schematic showing a perspective view of wet etching on a structure.
Figure 9B:
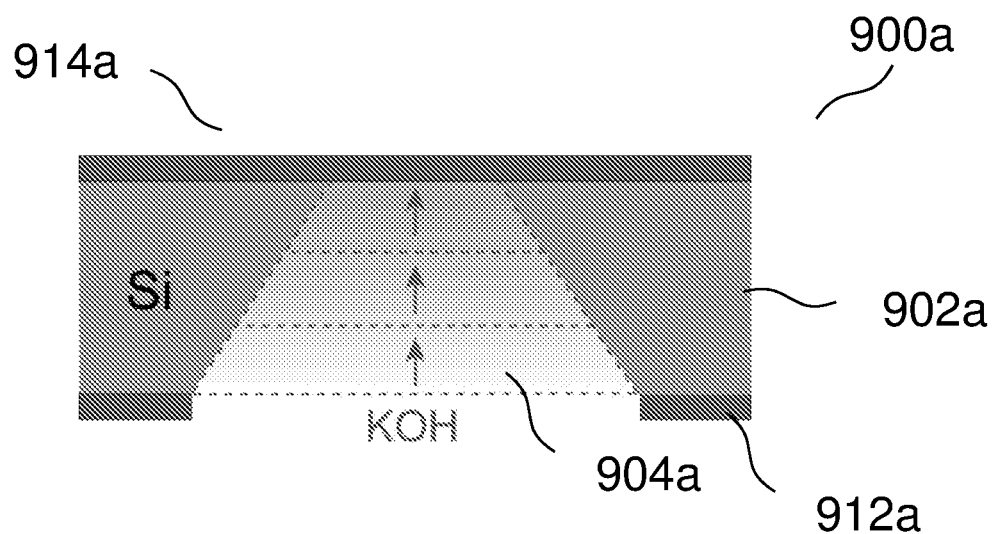
FIG. 9B is a schematic showing the cross-sectional side view of the structure shown in FIG. 9A with an electrolyte layer.

The fabrication of such free-standing electrolyte membranes has typically been done by through-wafer etching in potassium hydroxide (KOH) solution to release the membrane from the substrate. FIG. 9A is a schematic showing a perspective view of wet etching on a structure 900a. FIG. 9B is a schematic showing the cross-sectional side view of the structure 900a shown in FIG. 9A with an electrolyte layer 906a. A substrate 902a is covered by dielectric layers 912a, 914a. A portion of the dielectric layer 912a is then removed, exposing the underlying silicon. A wet etch using potassium hydroxide (KOH) solution is then carried out to etch away the underlying silicon, thereby forming a cavity 904a with side walls along the (111) plane. An electrolyte layer 906a is then formed on dielectric 914a.

The resulting membrane geometry is either square or rectangular due to the crystallinity of the (100) silicon substrate. Such architecture for thin-film SOFCs has been a common platform in literature studying various materials operating at below 500° C. However, as the electrolyte is usually deposited at an elevated temperature (about 250- about 800° C., depending on the deposition method), a compressive residual stress within the membrane is often observed. For example, highly compressive residual stress of 1,100±150 MPa has been reported in a 300 nm-thick yttria-stabilized zirconia (YSZ) thin film deposited by PLD at 700° C., and severe membrane buckling has also been observed. For sputtered YSZ deposited at room temperature, the residual stress has been reported to vary from −1.4 GPa (compressive) to 100 MPa (tensile), depending on deposition parameters. Such high residual stress within the extremely thin electrolyte makes its mechanical stability very poor. Based on a Weibull analysis for brittle materials, the failure probability of a flat film increases exponentially with the geometric factor, $L^2h$ for a square membrane, where L and h represent the lateral length and thickness of the membrane, respectively. In this sense, it is virtually impossible to further expand the lateral dimensions of the membrane for higher total power output without causing membrane fracture. A typical lateral dimension for a 100 nm-thick, free-standing square membrane to be mechanically stable is limited to 100 μm or less.

Fracturing of a membrane occurs when the maximum principal stress at any point within the membrane exceeds the tensile strength of the material (the Rankine criterion). For a membrane with higher compressive stress than the critical buckling stress, buckling may occur to relieve the compressive stress, and as a result, the fracture of a membrane may be avoided. Unfortunately, for a square electrolyte membrane, although buckling may reduce the magnitude of the stress, the asymmetric buckling pattern may cause irregular membrane wrinkles, which induces high stress concentration points at the clamped edge. The buckling phenomena of square free-standing YSZ and yttria-doped barium zirconate (BYZ) electrolytes were both observed and reported in the literature. Kerman et al. (K. Kerman, T. Tallinen, S. Ramanathan and L. Mahadevan, *Journal of Power Sources,* 2013, 222, 359-366.) has calculated the stress behavior of a square electrolyte membrane and concluded that the compressive stress within the membrane is indeed relaxed by buckling, but buckling-induced wrinkles, causing high stress concentration points at the clamped edges, also leads to membrane fracture.

A circular membrane may have both a more uniform stress distribution under a static loading, as well as a higher buckling resistance compared with a square membrane.

Figure 9C:
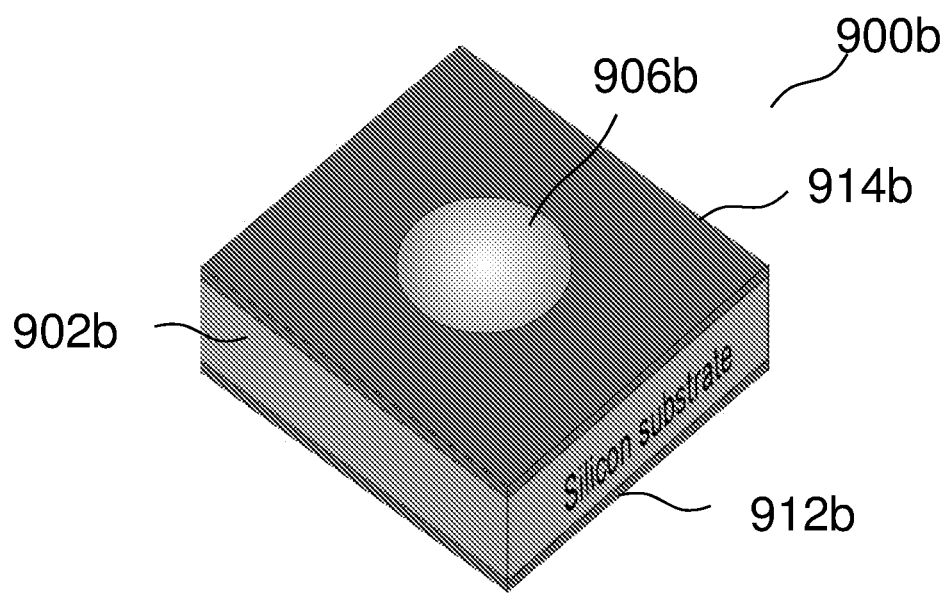
FIG. 9C is a schematic showing a perspective view of dry reactive ion etching (DRIE) on a structure.
Figure 9D:
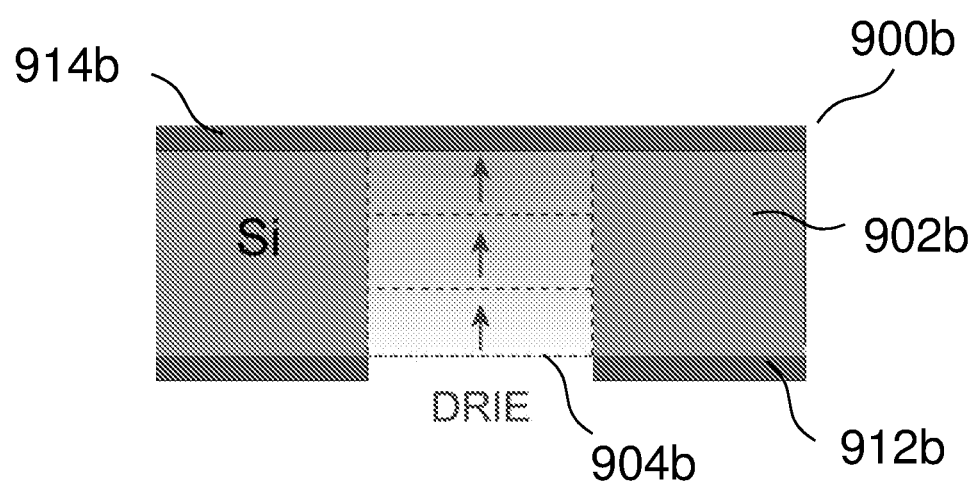
FIG. 9D is a schematic showing the cross-sectional side view of the structure shown in FIG. 9C with an electrolyte layer formed.

Circular membranes have no geometrical discontinuities, such as sharp corners in square membranes, to introduce high stress points by the buckling and wrinkles. To date, only a few research groups have reported the fabrication of circular membrane electrolyte μ-SOFCs, but either the fabrication process is too complex, or the membrane stability is poor with inferior fuel cell performance, due to electronic or gas leakages. FIG. 9C is a schematic showing a perspective view of dry reactive ion etching (DRIE) on a structure 900$b$. FIG. 9D is a schematic showing the cross-sectional side view of the structure 900$b$ shown in FIG. 9C with an electrolyte layer 906$b$ formed. A substrate 902$b$ may be covered by dielectric layers 912$b$, 914$b$. A portion of the dielectric layer 912$b$ may then be removed, exposing the underlying silicon. A wet etch using potassium hydroxide (KOH) solution may then be carried out to etch away the underlying silicon, thereby forming a cavity 904$b$ with substantially vertical side walls. As seen from FIG. 9C, the membrane over cavity 904$b$ may be circular. An electrolyte layer 906$b$ may then be formed on dielectric layer 914$b$. A significant scaling up of a nano thin-film circular electrolyte membrane with good mechanical stability has not been reported previously.

A free-standing membrane on a silicon substrate may be fabricated by performing through-wafer etching with either wet chemicals to obtain a square membrane (FIGS. 9A, 9B) or dry deep reactive ion etching (DRIE) (FIGS. 9C, 9D) to obtain an arbitrary shape of interest. The latter requires sophisticated DRIE equipment with about 4 to about 5 h of etching time to process each wafer, and therefore is not practical for the batch production of thin-film SOFCs.

Figure 9E:
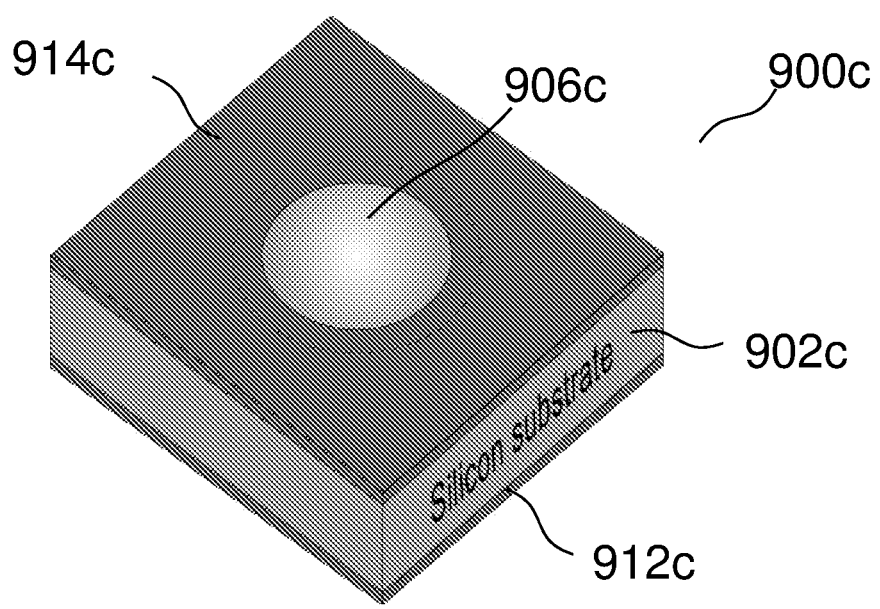
FIG. 9E is a schematic showing a perspective view of dry reactive ion etching (DRIE), followed by wet etching on a structure according to various embodiments.
Figure 9F:
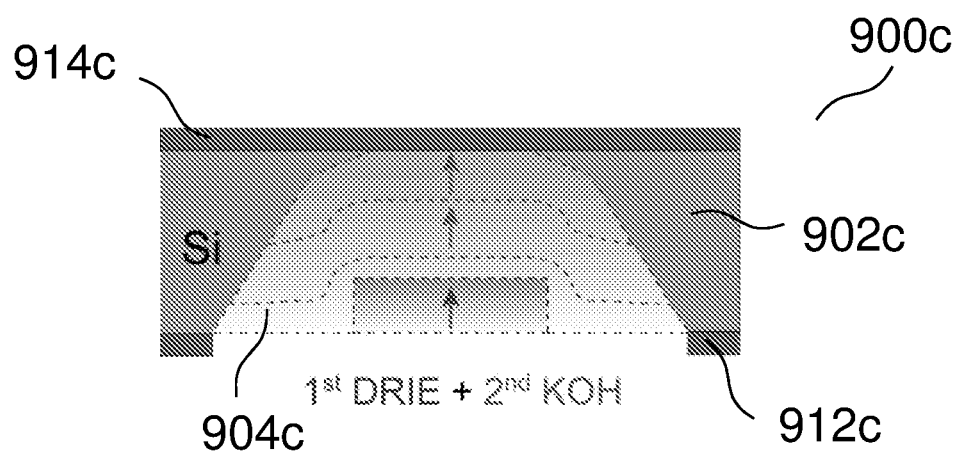
FIG. 9F is a schematic showing the cross-sectional side view of the structure shown in FIG. 9E with a membrane formed according to various embodiments.

Various embodiments may provide a fabrication process of our new architecture for a circular membrane combined both anisotropic wet etching and DRIE. FIG. 9E is a schematic showing a perspective view of dry reactive ion etching (DRIE), followed by wet etching on a structure 900$c$ according to various embodiments. FIG. 9F is a schematic showing the cross-sectional side view of the structure 900$c$ shown in FIG. 9E with a membrane 906$c$ formed according to various embodiments.

A substrate 902$c$ is covered by dielectric layers 912$c$, 914$c$. A portion of the dielectric layer 912$c$ is then removed, exposing the underlying silicon. A first DRIE short etching may be applied to predefine a circular shape, and the etching depth may be a few tens of microns out of the total 400 μm etching depth. A second KOH wet etching may then be applied to continue and complete the through-wafer etching and release the membrane 914$c$. An electrolyte layer 906$c$ is then formed on the membrane 914$c$. The shape of the resulting through-hole 904$c$ created by the combinatorial etching may be circular, with a thin tapered silicon ring at the edge of the membrane 914$c$.

Figure 10A:
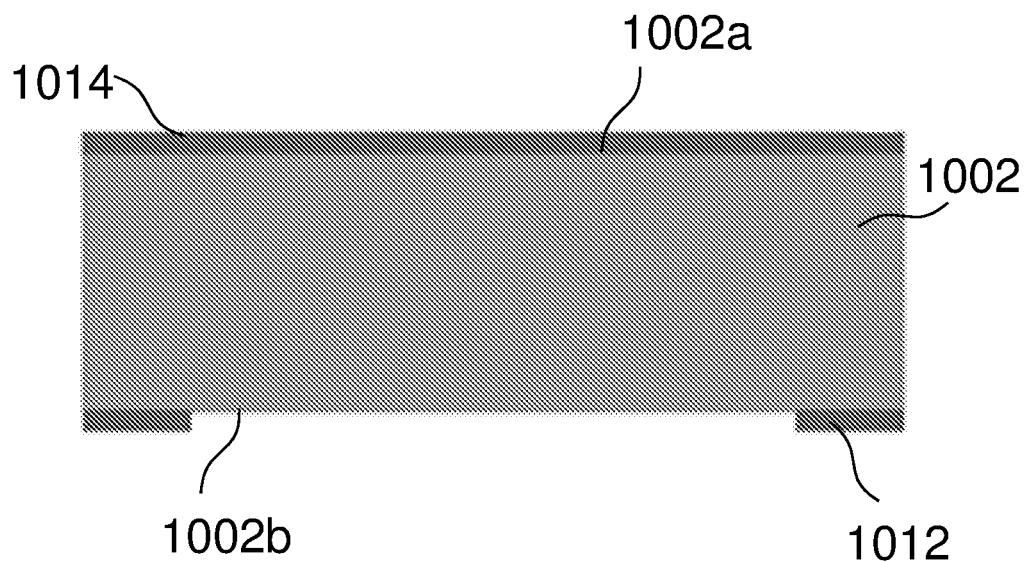
FIG. 10A is a schematic illustrating the cross-sectional side view of a semiconductor substrate deposited with dielectric layers according to various embodiments.

FIGS. 10A-F illustrate a method of forming an energy conversion device 1000 according to various embodiments. FIG. 10A is a schematic illustrating the cross-sectional side view of a semiconductor substrate 1004 deposited with dielectric layers 1012, 1014 according to various embodiments. For instance, low-stress $Si_3N_4$ with a thickness of about 200 nm may be deposited on both sides 1002$a$, 1002$b$ of the 400 μm-thick <100> silicon wafer 1004 by low-pressure chemical vapor deposition (LPCVD) to form layer 1012 on the second surface 1002$b$, and layer 1014 on the first surface 1002$a$. Next, square windows may be lithographically patterned (on layer 1012) to define a portion of the surface 1002$b$ for KOH etching and a portion of the dielectric layer 1012 over the portion of the surface 1002$b$ may be removed by reactive ion etching (RIE) with $CF_4$ and $O_2$.

Figure 10B:
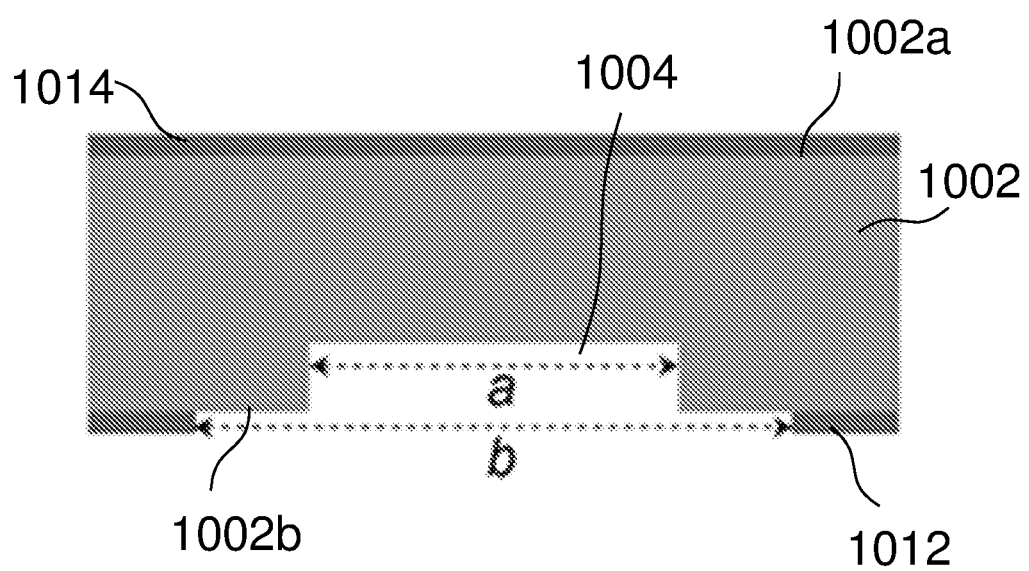
FIG. 10B is a schematic illustrating forming a cavity using deep reactive ion etching (DRIE) according to various embodiments.

The window sizes (b) as indicated in FIG. 10B may vary from about 1 mm to about 4 mm. FIG. 10B is a schematic illustrating forming a cavity 1004 using deep reactive ion etching (DRIE) according to various embodiments. The bottom side of a silicon substrate 1004 may be lithographically patterned for additional etching by deep reactive ion etching (DRIE) process (ICP-RIE, Surface Technology Systems). DRIE may be performed with coil power of 800 W for 10 s etching cycles by $SF_6$ and coil power of 800 W for 6 s passivation cycles by $C_4F_8$. The cavity 1004 formed may extend only partially through the substrate 1002. The cavity 1004 may have an etching depth of 30 μm. The diameters of the etched cavity 1004 (i.e. (a)) may vary from about 0.5 mm to about 3 mm. The silicon etching using DRIE may effectively remove silicon, and may also predefine circles in advance. The circular shape may still be retained even after KOH etching to release a free-standing membrane due to etching rate differences according to silicon crystallinity.

Figure 10C:
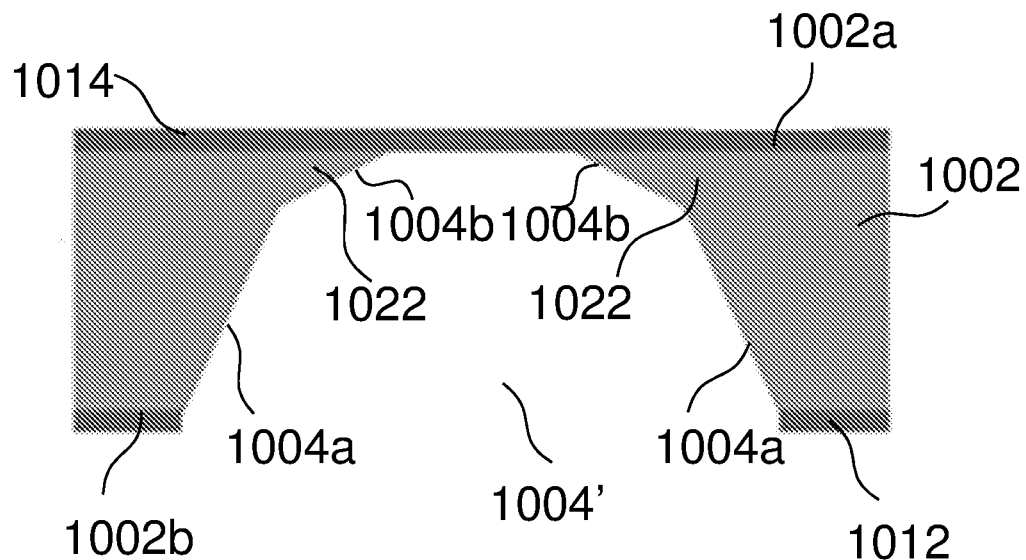
FIG. 10C is a schematic illustrating the enlargement of the cavity via wet etching to form enlarged cavity according to various embodiments.

FIG. 10C is a schematic illustrating the enlargement of the cavity 1004 via wet etching to form enlarged cavity 1004' according to various embodiments. The wet etch may be carried outing using a chemical solution such as aqueous potassium hydroxide (KOH). The opened silicon windows may be chemically etched by 30 weight percent (wt %) KOH solution at about 80° C. The dielectric layer 1014 may act as an etch stop for wet etching. The combination of dry reactive ion etching with wet etching may result in the formation of enlarged cavity 1004 with tapered edges 1022. The enlarged cavity 1004' may have a first face 1004$a$ extending in a first direction and a second face 1004$b$ extending in a second direction. In other words, the side wall of the enlarged cavity 1004' may not slope in the same angle with increasing depth. The portion of the side wall adjoining the surface 1002$a$ (i.e. portion of the side wall which is the exposed surface of the tapered edges 1022) may make a smaller angle with a surface 1002$a$ of the substrate 1002 while the portion of the side wall further from the surface 1002$a$ may form a bigger angle with the surface 1002$a$ of the substrate 1002. The dimension of the tapered edge support 1022 may be controllable according to KOH etching time (450 μm in width and 30 μm in thickness in this study). An angle between the first lateral cavity surface 1004$a$ and the second lateral cavity surface may be more than 90 degree but may be less than 180 degree.

Figure 10D:
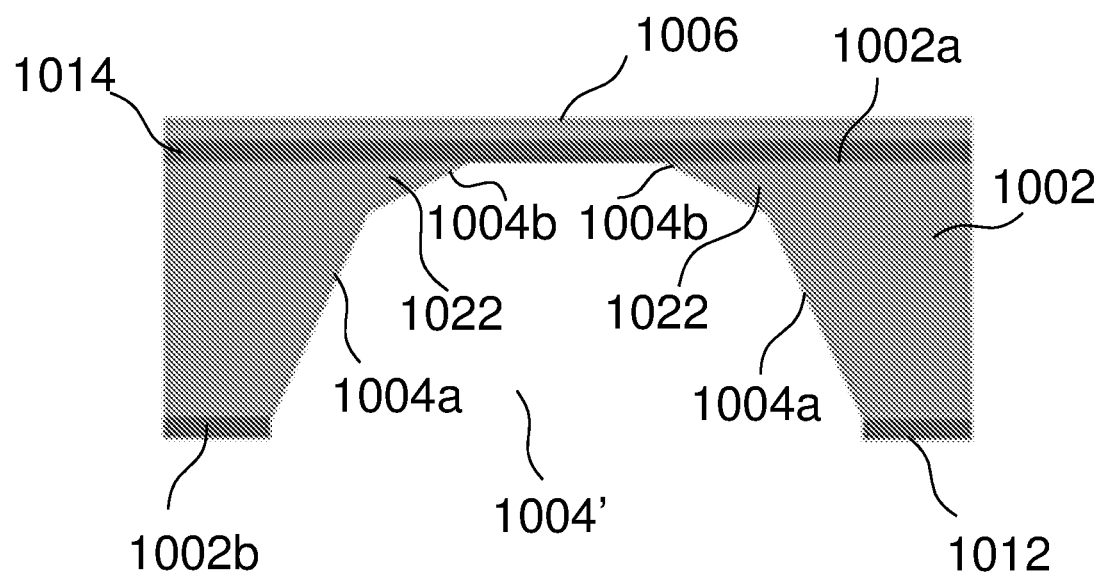
FIG. 10D is a schematic illustrating the forming of an electrolyte layer on the dielectric layer according to various embodiments.

FIG. 10D is a schematic illustrating the forming of an electrolyte layer 1006 on the dielectric layer 1014 according to various embodiments. The wafer 1002 may be diced into 10 mm×10 mm silicon chips before forming of the electrolyte layer 1006 onto the dielectric layer 1014. The electrolyte layer 1006 may be formed via pulsed laser deposition (PLD) or atomic laser deposition (ALD). The electrolyte layer 1006 may include YSZ or BYZ. The electrolyte layer maybe about 100 nm.

In this experiment, the electrolyte thin films are prepared by two deposition methods, ALD and PLD, for two different electrolyte materials, YSZ and BYZ, respectively, to obtain different residual stresses for the stability test of our cell structure. 100 nm-thick YSZ have been deposited by ALD at 250° C. of substrate temperatures. 100 nm-thick BYZ have also been deposited by PLD (Coherent 248 nm KrF excimer laser, 2.5 J/cm$^2$, 3 Hz, 1 Pa O2) at a substrate temperature of 700° C.

Figure 10E:
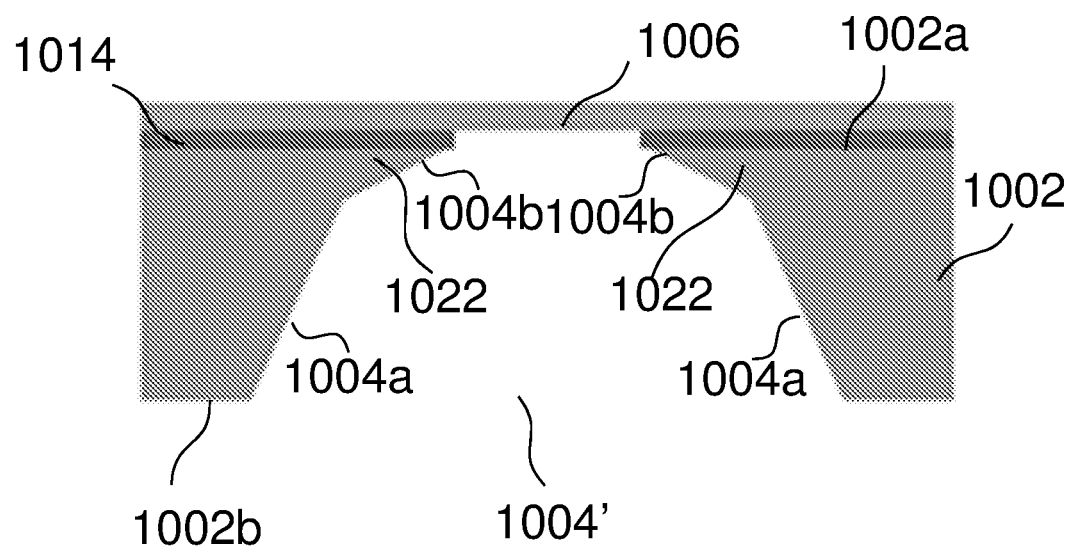
FIG. 10E is a schematic illustrating etching of a portion of the dielectric layer according to various embodiments.

FIG. 10E is a schematic illustrating etching of a portion of the dielectric layer 1014 according to various embodiments. The etching of the dielectric layer 1014 under the electrolyte layer 1006 for releasing the electrolyte layer 1006 may be via reactive ion etching (RIE). The dielectric layer 1012 may also be etched away to expose surface 1002b of the substrate 1002. Free-standing circular membranes with tapered edge support 1022 may thus be formed.

Figure 10F:
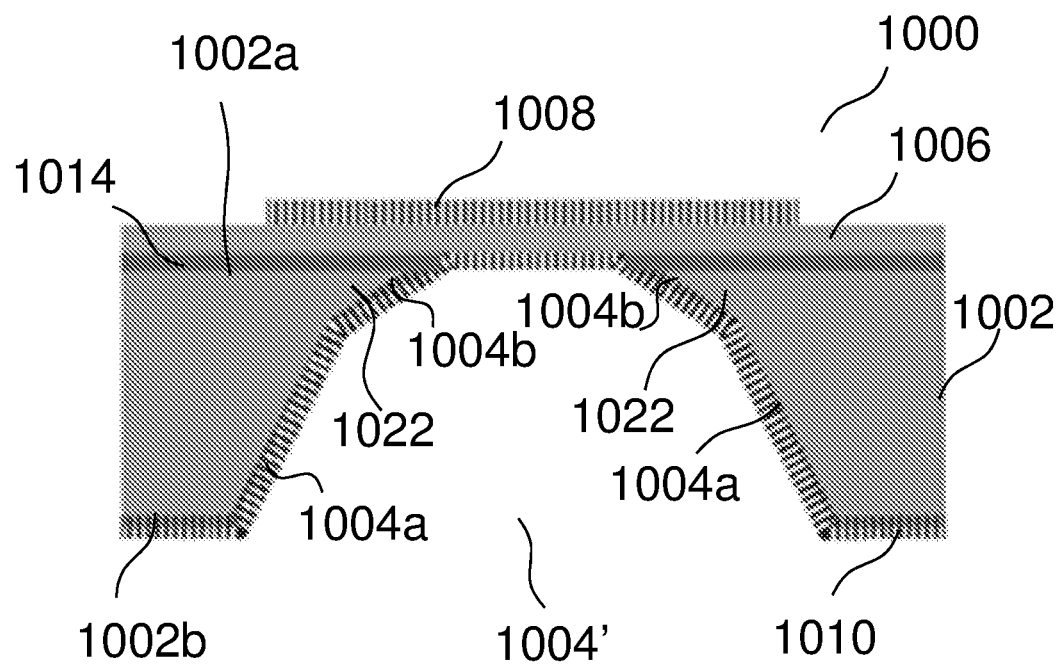
FIG. 10F is a schematic illustrating the forming of electrodes according to various embodiments.

FIG. 10F is a schematic illustrating the forming of electrodes 1008, 1010 according to various embodiments. The electrodes 1008, 1010 may be formed on opposing surfaces of the electrolyte layer 1006. The electrode 1010 may extend onto surfaces 1004a and 1004b of the enlarged cavity 1004'. The electrode 1010 may further extend onto surface 1002b of the substrate 1002.

For instance, 100 nm-thick porous Pt may be deposited on the both sides of the structure by radio-frequency (RF) sputtering under 30 mTorr Ar pressure and 100 W RF power without substrate heating to form electrodes 1008, 1010.

In various embodiments, an energy conversion device 1000 may be formed. In various embodiments, free-standing circular thin film μ-SOFCs with diameters between 0.5 mm and 3 mm may be obtained. The enlarged cavity 1004' may be defined by lateral cavity surfaces 1004a, 1004b as well as base surface of electrode 1010 on electrolyte layer 1006. The first lateral cavity surface 1004a may adjoin the second lateral cavity surface 1004b. The second lateral cavity surface 1004b may adjoin the base surface.

Figure 11A:
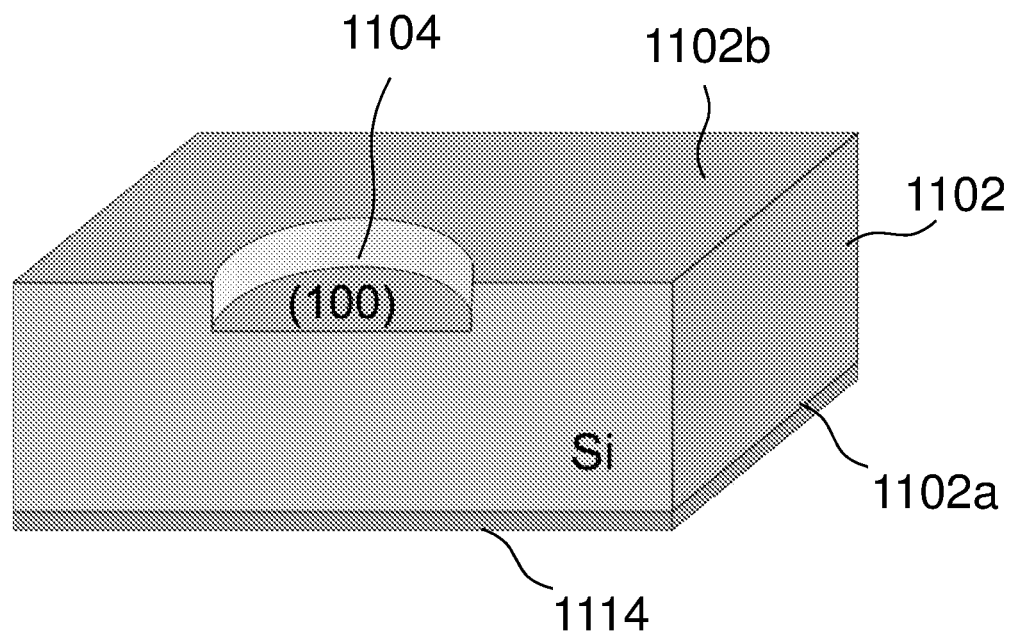
FIG. 11A is a schematic showing a perspective view of a (100) silicon substrate with a cavity etched using deep reactive ion etching according to various embodiments.
Figure 11B:
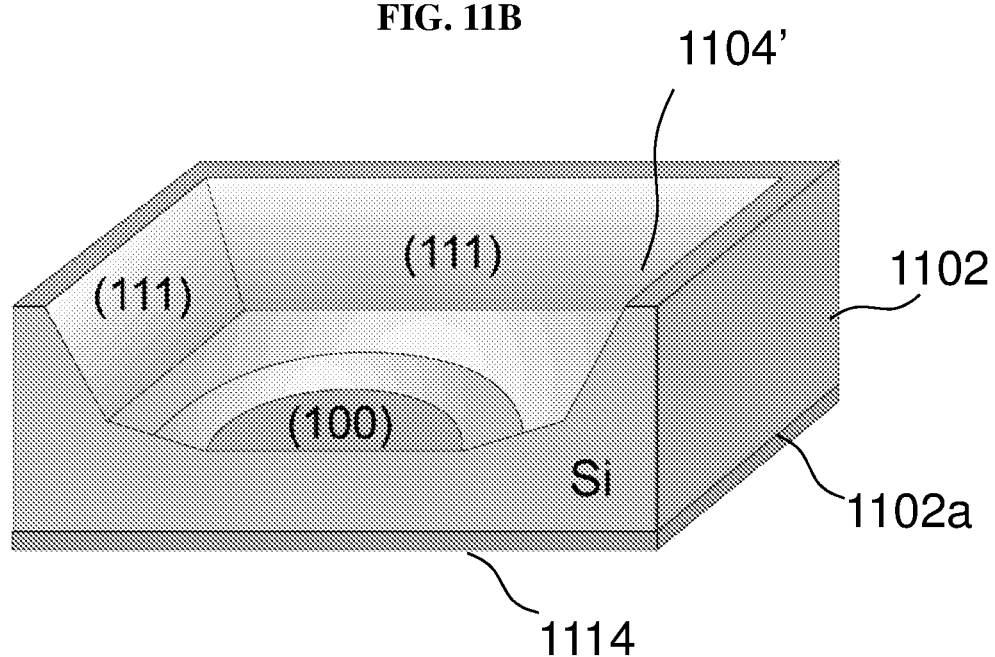
FIG. 11B is a schematic showing the perspective view of the silicon substrate shown in FIG. 11A during wet etching according to various embodiments.
Figure 11C:
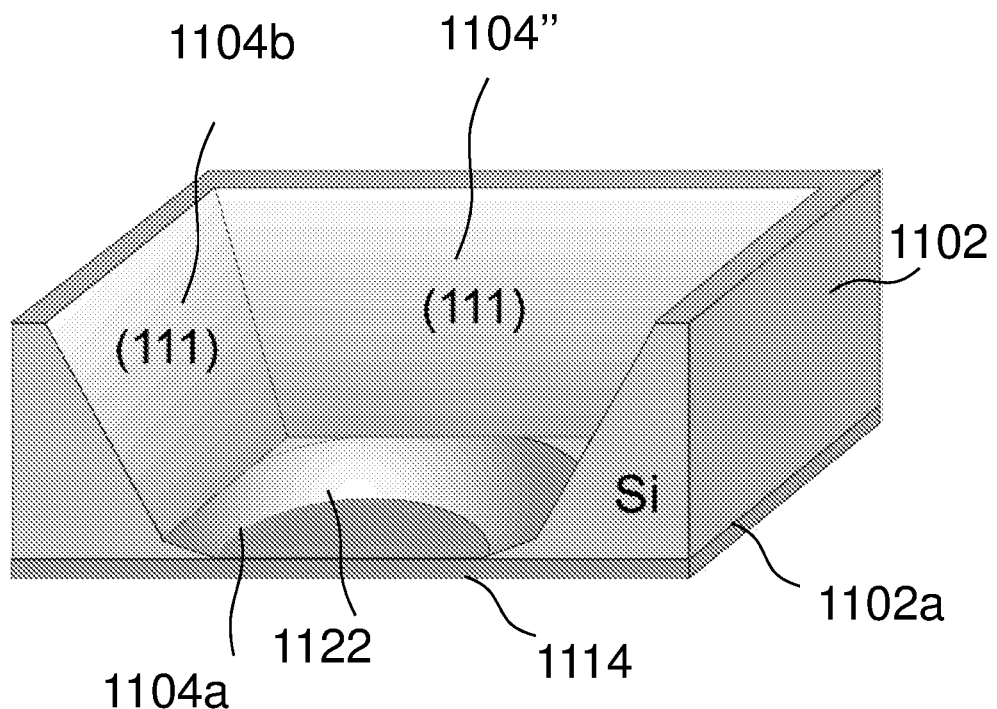
FIG. 11C is a schematic showing the perspective view of the silicon substrate shown in FIG. 11B after wet etching according to various embodiments.

FIGS. 11A-C are schematics showing the progression of the cavity during wet etching to form the enlarged cavity according to various embodiments. Wet etching may be carried out using KOH. FIG. 11A is a schematic showing a perspective view of a (100) silicon substrate 1102 with a cavity 1104 etched using deep reactive ion etching according to various embodiments. As shown in FIG. 11A, the cavity 1104 may be cylindrical with a circular cross-section, and may be only partially through the substrate 1102. Dielectric layer 1114 such as $Si_3N_4$ may be on a surface 1102a of the substrate 1102, while cavity 1104 may be formed on opposing surface 1102b of the substrate 1102.

FIG. 11B is a schematic showing the perspective view of the silicon substrate 1102 shown in FIG. 11A during wet etching according to various embodiments. The cavity 1104 in FIG. 11A may be enlarged to form cavity 1104' shown in FIG. 11B. FIG. 11C is a schematic showing the perspective view of the silicon substrate 1102 shown in FIG. 11B after wet etching according to various embodiments. The cavity 1104' in FIG. 11B may be enlarged further to cavity 1104" shown in FIG. 11C. Tapered edge is labelled as 1122. The second lateral cavity surface 1104b may be along the (111) plane, while the first lateral cavity surface 1104a may be between the (100) and the (111) plane.

Figure 11D:
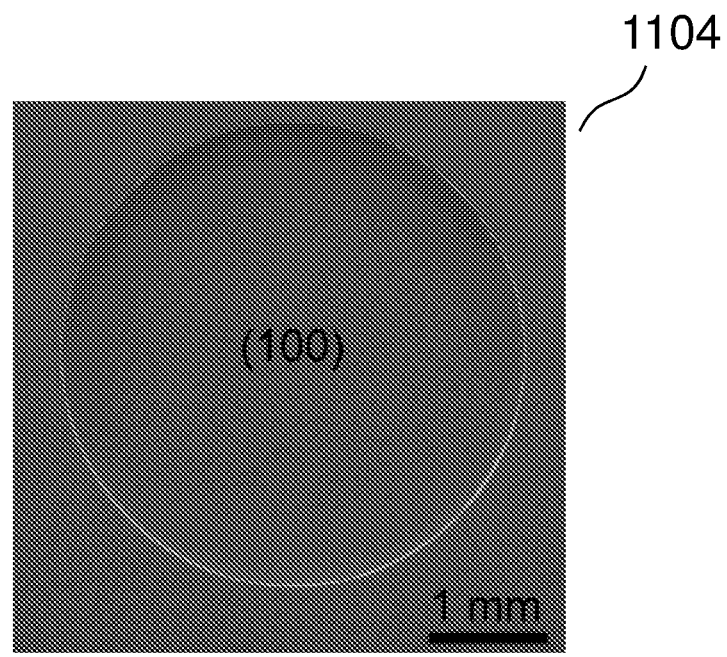
FIG. 11D shows an image showing a top view of the cavity illustrated in FIG. 11A according to various embodiments.
Figure 11E:
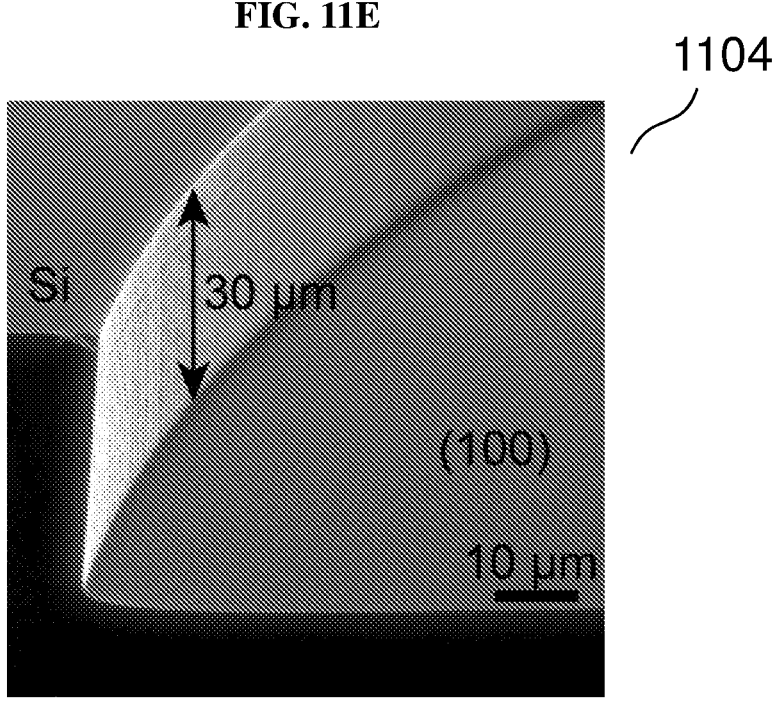
FIG. 11E is a magnified image of the cavity shown in FIG. 11D according to various embodiments.

FIG. 11D shows an image of the top view of cavity 1104 illustrated in FIG. 11A according to various embodiments. FIG. 11E is a magnified image of the cavity 1104 shown in FIG. 11D according to various embodiments.

Figure 11F:
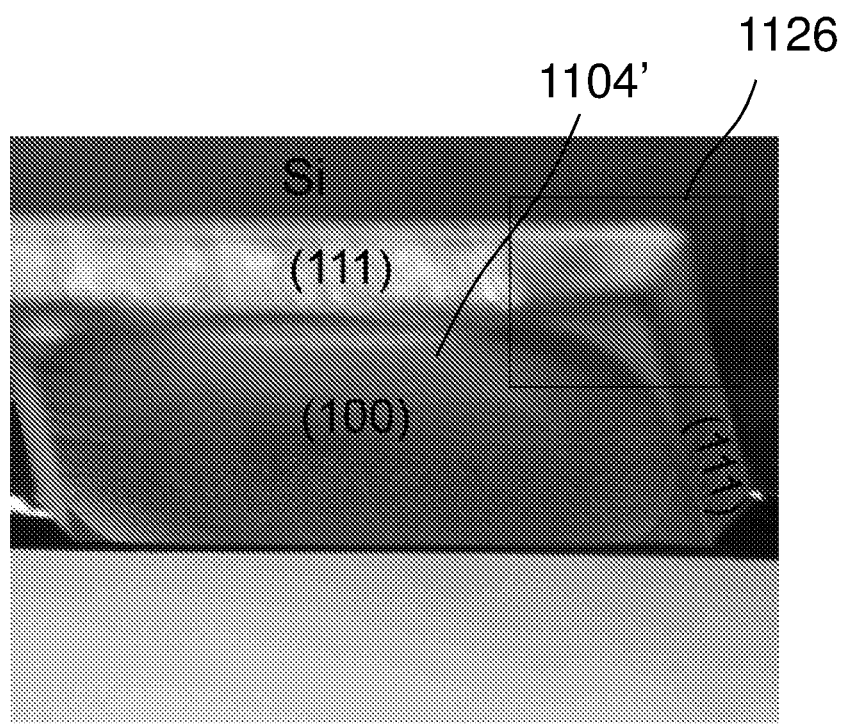
FIG. 11F is an image of the cavity illustrated in FIG. 11B according to various embodiments.
Figure 11G:
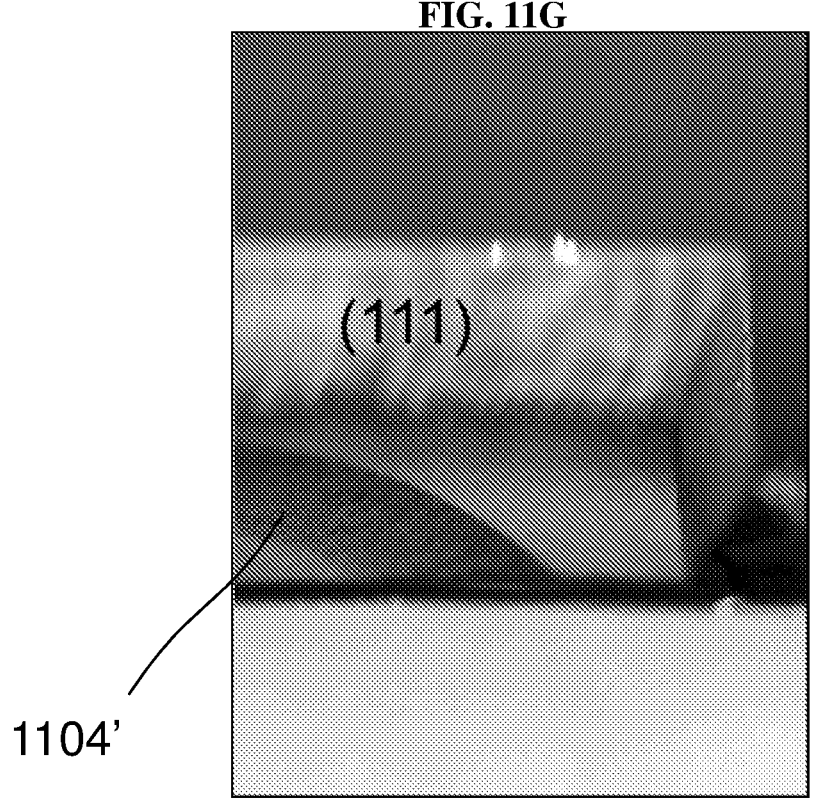
FIG. 11G is a magnified image of a portion shown in FIG. 11F according to various embodiments.

FIG. 11F is an image of the cavity 1104' illustrated in FIG. 11B according to various embodiments. FIG. 11G is a magnified image of a portion 1126 shown in FIG. 11F according to various embodiments.

Figure 11H:
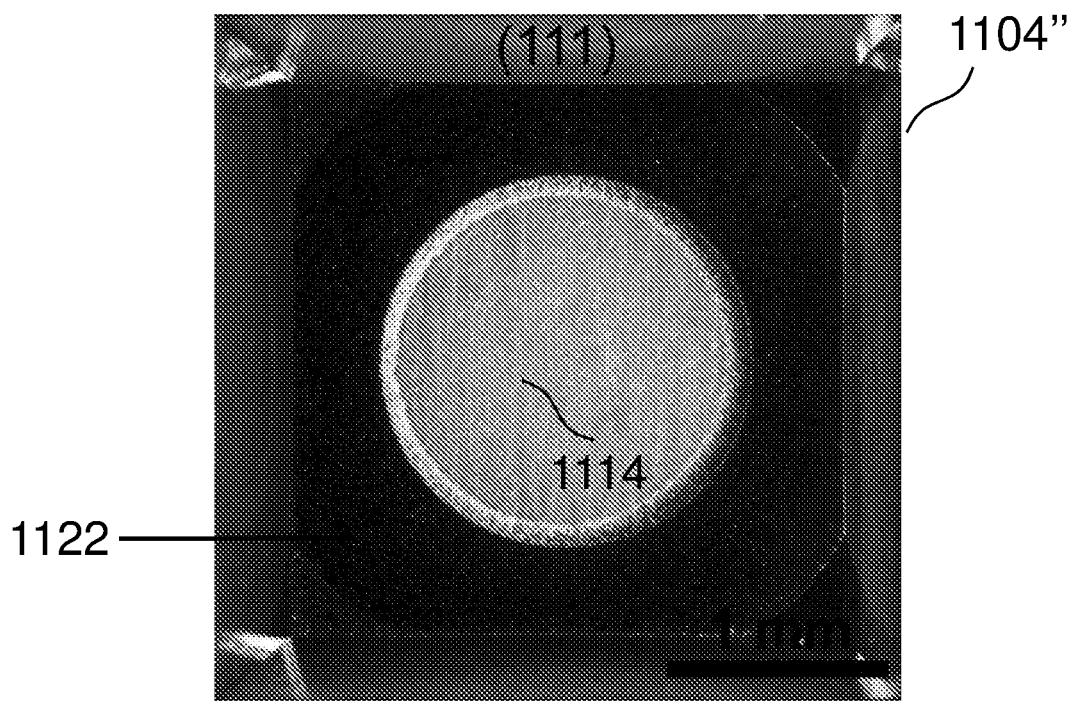
FIG. 11H is an image of the cavity illustrated in FIG. 11C according to various embodiments.
Figure 11I:
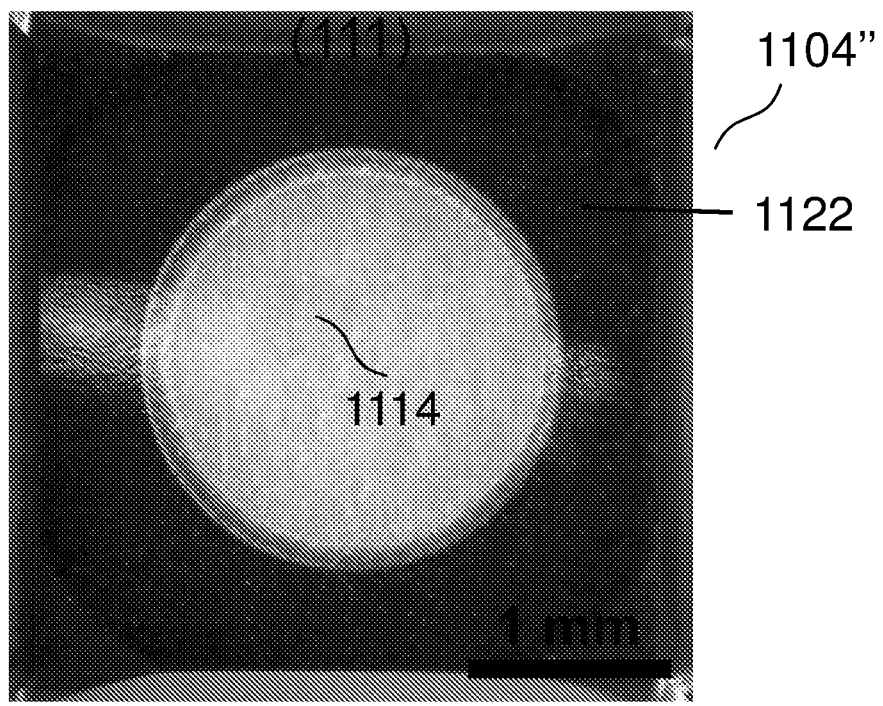
FIG. 11I is a magnified image of FIG. 11H according to various embodiments.

FIG. 11H is an image of the cavity 1104" illustrated in FIG. 11C according to various embodiments. FIG. 11I is a magnified image of FIG. 11H according to various embodiments.

The additional anisotropic DRIE shown in FIG. 11A before the KOH etching predefined the circle on a silicon substrate 1102. This circular trench 1104 with the etching depth of 30 μm may evolve to be the circular opening after KOH etching. As the KOH etching proceeds, the (100) planes exposed to KOH were etched at much higher rate and a tapered structure appears along the circular boundary. As the front (100) plane etched by DRIE reached the bottom of $Si_3N_4$ etch stop layer 1114, an annular-shaped and tapered edge support 1122 may be formed completely. The support 1122 may be evolved from the corner of the DRIE trench, and as it has a taper angle of about 3.4 degree to about 3.9 degree from the (100) plane. The support 1122 may be related to the (110) plane.

The principal stress distributions within the membrane are computed with a finite element method (FEM) simulation to confirm the stress distribution within the square and circular YSZ membranes. A commercial software package (COMSOL Inc.) is used to identify the highly stress-concentrated regions on the membranes under a clamped boundary condition. To simplify the modeling, the YSZ electrolyte may be modeled as a linear elastic and isotropic material. The three different membrane models shown in FIGS. 9A-F are constructed to investigate the effect of membrane shape and tapered edge support on the mechanical stability, namely: (1) a 2 mm×2 mm square membrane clamped at the edge; (2) a circular membrane with a diameter of 2 mm clamped at the edge; and (3) a circular membrane with a diameter of 2 mm and a tapered edge support of 450 μm in width.

To simulate the fuel cell operating condition, 5 psi of static pressure difference on the bottom side and 400° C. of operating temperature are applied in the calculation. The material properties of YSZ and silicon substrates for the numerical simulation are obtained from the literature (V. T. Srikar, K. T. Turner, T. Y. Andrew Ie and S. M. Spearing, *Journal of Power Sources*, 2004, 125, 62-69), which is incorporated herein for reference. Maximum principal stresses in the films are assessed with non-linear large-deflection theory because the deflections are expected to be non-trivial with respect to the membrane thickness. A compressive in-plane strain is applied to simulate the residual stress in the initial configuration as $\sigma_0(1-v)/E$, where $\sigma_0$, $v$, and $E$ represent residual stress of a thin film, Poisson's ratio, and Young's modulus, respectively, and a compressive stress of 500 MPa was preloaded. In this calculation, the stress distribution without letting buckling occur is examined.

μ-SOFCs with circular electrolytes are prepared by depositing 100 nm-thick nanoporous Pt electrodes on both sides of the circular electrolyte. The μ-SOFC is clamped on a custom-built cell chamber placed inside a tube furnace for measurements. Pure dry hydrogen at a flow rate of 10 sccm is fed at the anode side while the cathode side is opened to ambient air for the oxygen source. A gold-coated titanium probe attached in a micro-manipulator is in contact with the cathode side for current collection, and the anode is electrically connected to the chamber via the Pt electrode. The test chips were heated at $5° C.·min^{-1}$ to the desired operating temperature. A multichannel potentiostat (Solartron Analytical, 1260/1287) is used to obtain current-voltage (I-V) characteristics. The film thickness, morphologies, and membrane deflections are examined with a field emission secondary electron microscope (FESEM, Jeol JSM-7600F, operating voltage 15 kV) and an optical microscope (OM).

Figure 12A:
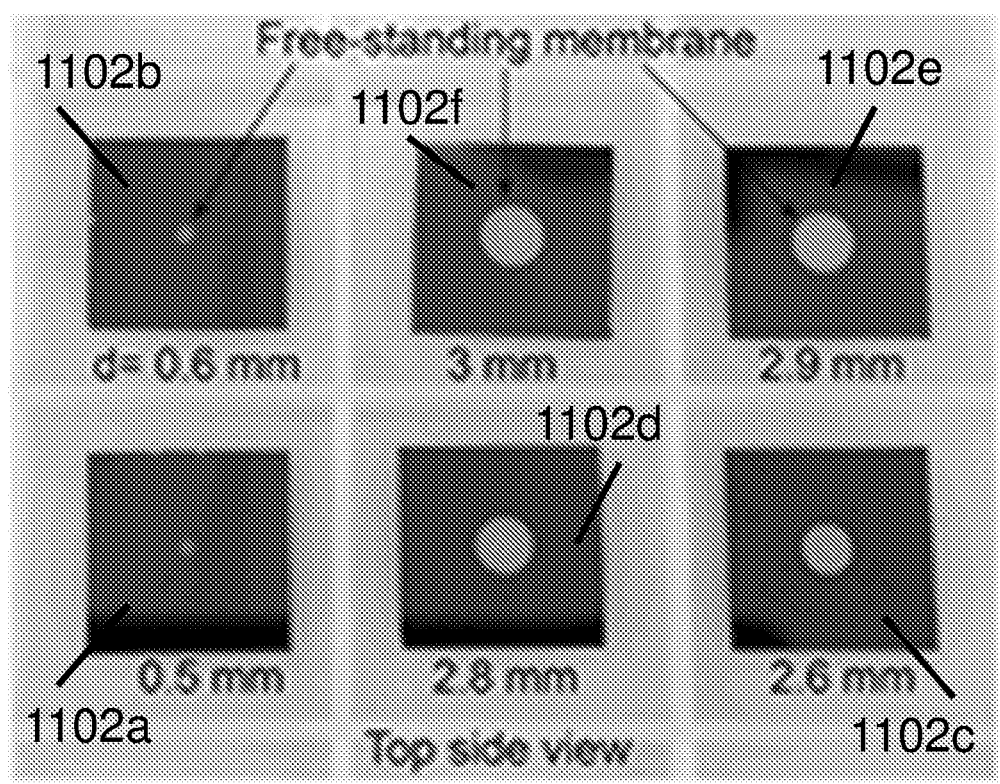
FIG. 12A show the image of 100 nm-thick free-standing electrolyte membranes with diameters from 500 µm to 3 mm according to various embodiments.
Figure 12B:
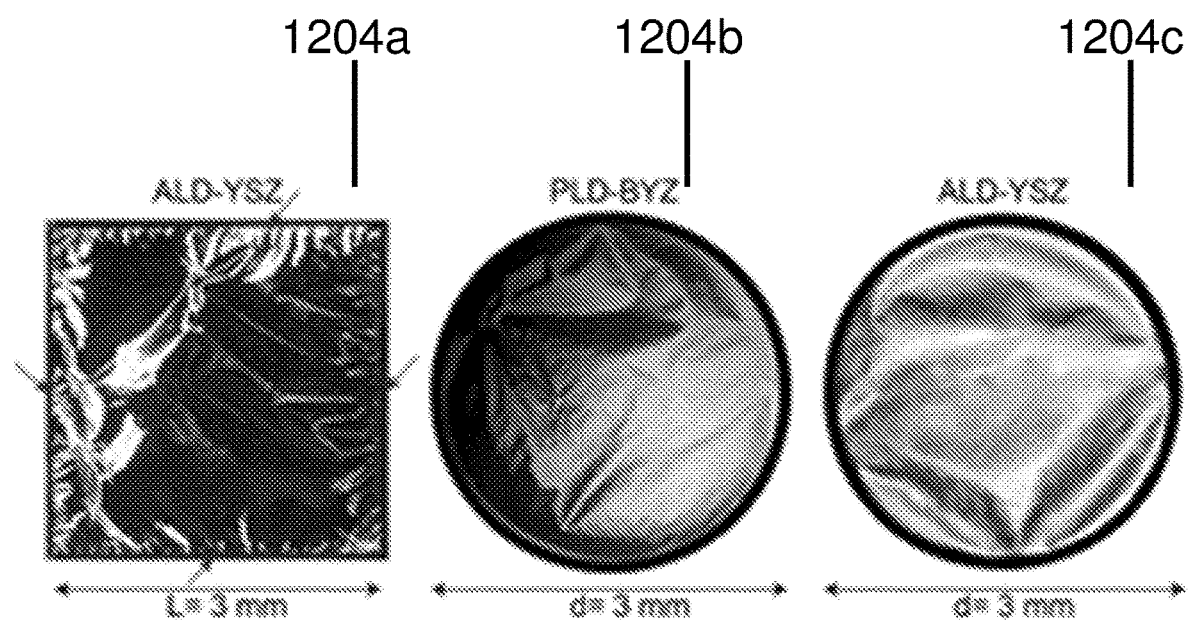
FIG. 12B show the image of membranes fabricated using different methods and of different shapes and materials according to various embodiments.
Figure 12C:
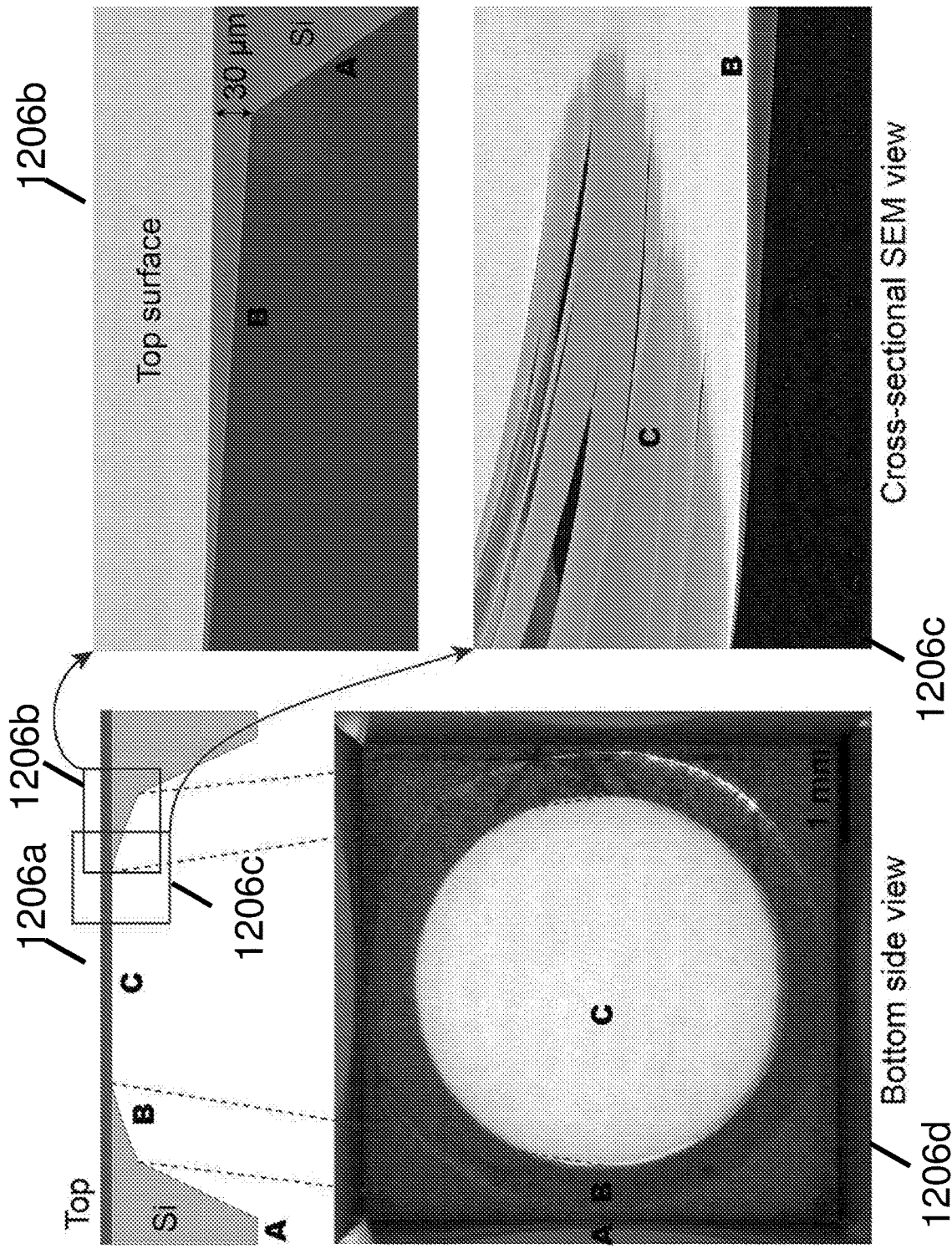
FIG. 12C shows the cross-sectional schematic as well as optical images of different portions of a circular template with tapered edge support according to various embodiments.

The OM images of the fabricated circular electrolyte membranes architecture are shown in FIGS. 12A-C. FIG. 12A show the image of 100 nm-thick free-standing electrolyte membranes with diameters from 500 μm to 3 mm according to various embodiments. 1202a denotes a 500 μm diameter membrane; 1202b denotes a 600 μm diameter membrane; 1202c denotes a 2.6 mm diameter membrane; 1202d denotes a 2.8 mm diameter membrane; 1202e denotes a 2.9 mm diameter membrane; and 1202f denotes a 3 mm diameter membrane. Circular membranes with diameters up to 6 mm is also fabricated, but the survival rate to date is fairly low, around only 15%, and thus the 3 mm diameter membrane, which had a more than 50% survival rate, is taken as the largest mechanically stable dimension with this architecture.

FIG. 12B show the image of membranes fabricated using different methods and of different shapes and materials according to various embodiments. 1204a is a square-shaped atomic layer deposited—yttria-stabilized zirconia (ALD-YSZ) membrane, 1204b is a circular-shaped pulsed laser deposition—yttrium-doped BaZrO₃ (PLD-BYZ) membrane, and 1204c is a circular-shaped atomic layer deposited—yttria-stabilized zirconia (ALD-YSZ) membrane.

FIG. 12C shows the cross-sectional schematic as well as optical images of different portions of a circular template with tapered edge support according to various embodiments. 1206a is the schematic of the circular membrane; 1206b is an image showing a side view of the tapered edge; 1206c is a scanning electron microscope image of the membrane edge; and 1206d is an image of the circular membrane viewed from the bottom. The locations of images 1206b and 1206c are indicated in 1206a. Further, labels "A" and "B" denote the two stage supporting structures while "C" denotes the membrane.

As shown in FIG. 12B, buckling deformation, caused by compressive stress, has also been observed in the circular membranes for both ALD-YSZ and PLD-BYZ but is much less severe than with the square ALD-YSZ membrane. In terms of the buckling-induced wrinkles at the clamped edge(s), many wrinkles are present in the square membrane while no apparent wrinkle has been observed in the circular ones. From Kerman's calculation (K. Kerman, T. Tallinen, S. Ramanathan and L. Mahadevan, *Journal of Power Sources*, 2013, 222, 359-366.), such buckling-induced wrinkles at the clamped edges may be stress concentration points where fracture of membranes usually occurs. Here, by changing the membrane from square to circular, the buckling-induced wrinkles may be minimized or reduced and the chances of membrane fracture may be expected to decrease significantly.

FIG. 12C shows that the membrane-supporting structure has an additional tapered support (portion B) between the major support (portion A) and the free-standing nano-thin electrolyte membrane (portion C). The tapered edge support may be a thin and annular single crystal silicon with approximately 450 µm in width and 30 µm in height, where the exact dimensions may vary depending on process and design parameters.

The addition of this thin taper-shaped support may be the key to the success of scaling up the nano thin-film electrolyte because this thin support may serve as a stress absorber to effectively reduce the high stress at the clamped edge.

Figure 13A:
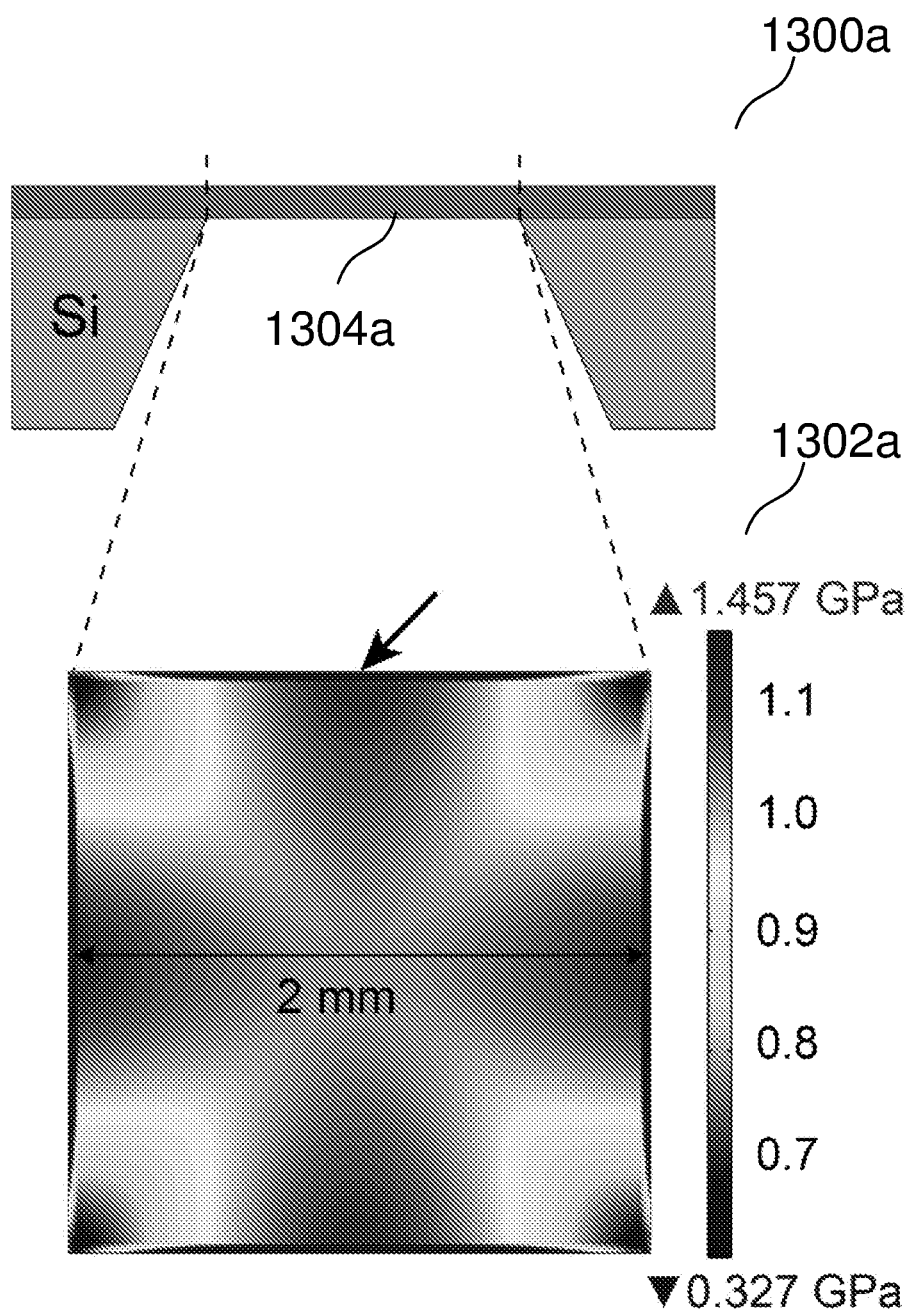
FIG. 13A shows schematic of a cross-sectional side view of a clamped square membrane as well as a planar image of the principal stress distribution of a portion of the membrane.

FIG. 13A shows schematic of a cross-sectional side view of a clamped square membrane 1300a as well as a planar image 1302a of the principal stress distribution of a portion of the membrane. The clamped square membrane is a YSZ membrane with a lateral length of 2 mm. 1304a indicates the portion of the membrane which stress distribution image 1302a pertains to.

Various embodiments provide the fabrication of a circular nano thin-film electrolyte for µ-SOFCs with successful enlargement in the lateral dimension from micrometer- to millimeter-scale. A simple two-step through wafer etching process may be provided, and the resulting cell architecture may feature a tapered edge support, which may act as an effective stress absorber at the clamped edge of the membrane. Principal stress analysis has been carried out using a finite element method (FEM) simulation to compare the mechanical stability of the square and circular membranes. The functionality and mechanical stability of the circular nano thin-film SOFCs have also been verified by OCV measurements and statistical results of membrane survival rates.

Figure 13B:
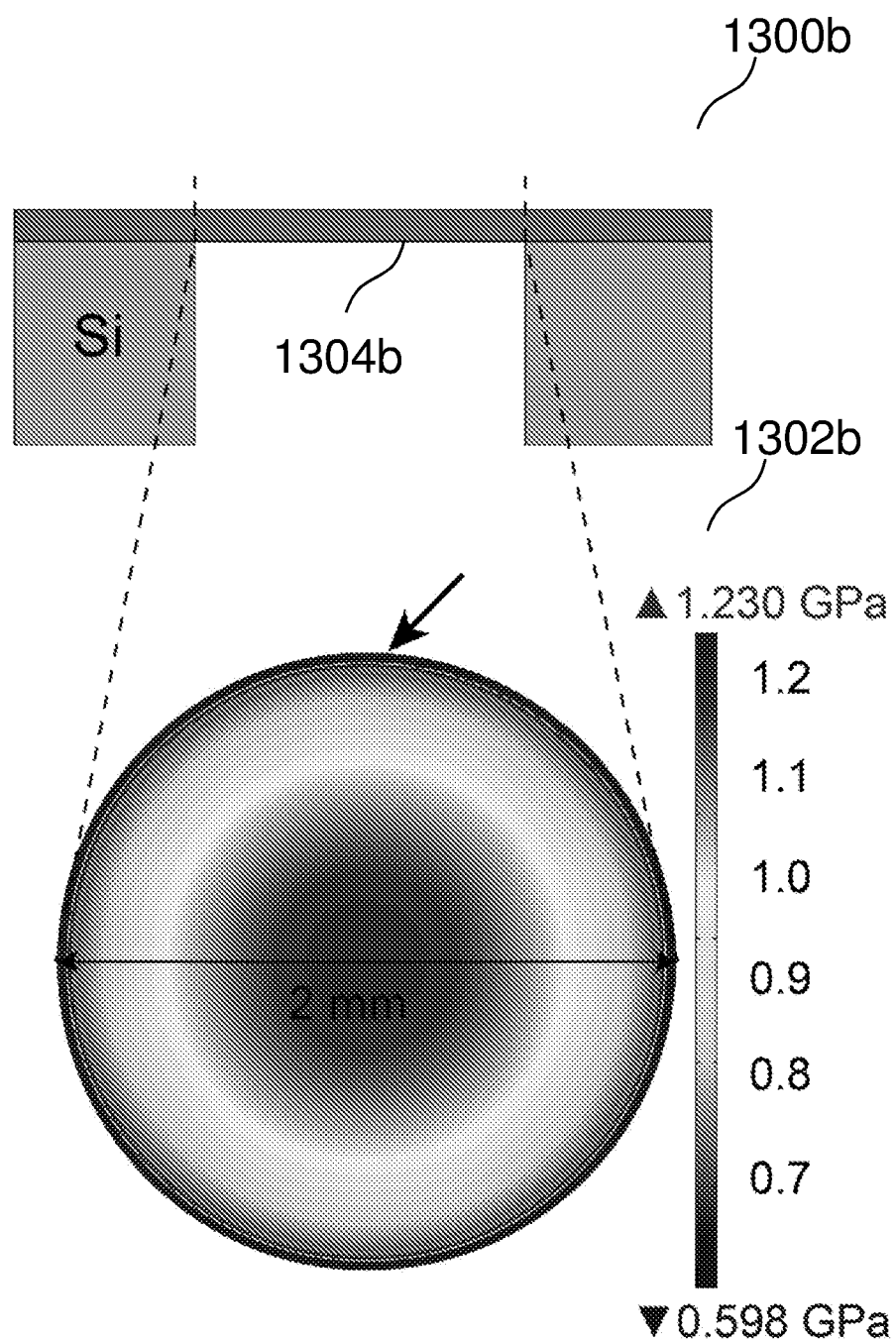
FIG. 13B shows schematic of a cross-sectional side view of a clamped circular membrane as well as a planar image of the principal stress distribution of a portion of the membrane.

FIG. 13B shows schematic of a cross-sectional side view of a clamped circular membrane 1300b as well as a planar image 1302b of the principal stress distribution of a portion of the membrane. The clamped circular membrane is a YSZ membrane with a diameter of 2 mm. 1304b indicates the portion of the membrane which stress distribution image 1302b pertains to.

Figure 13C:
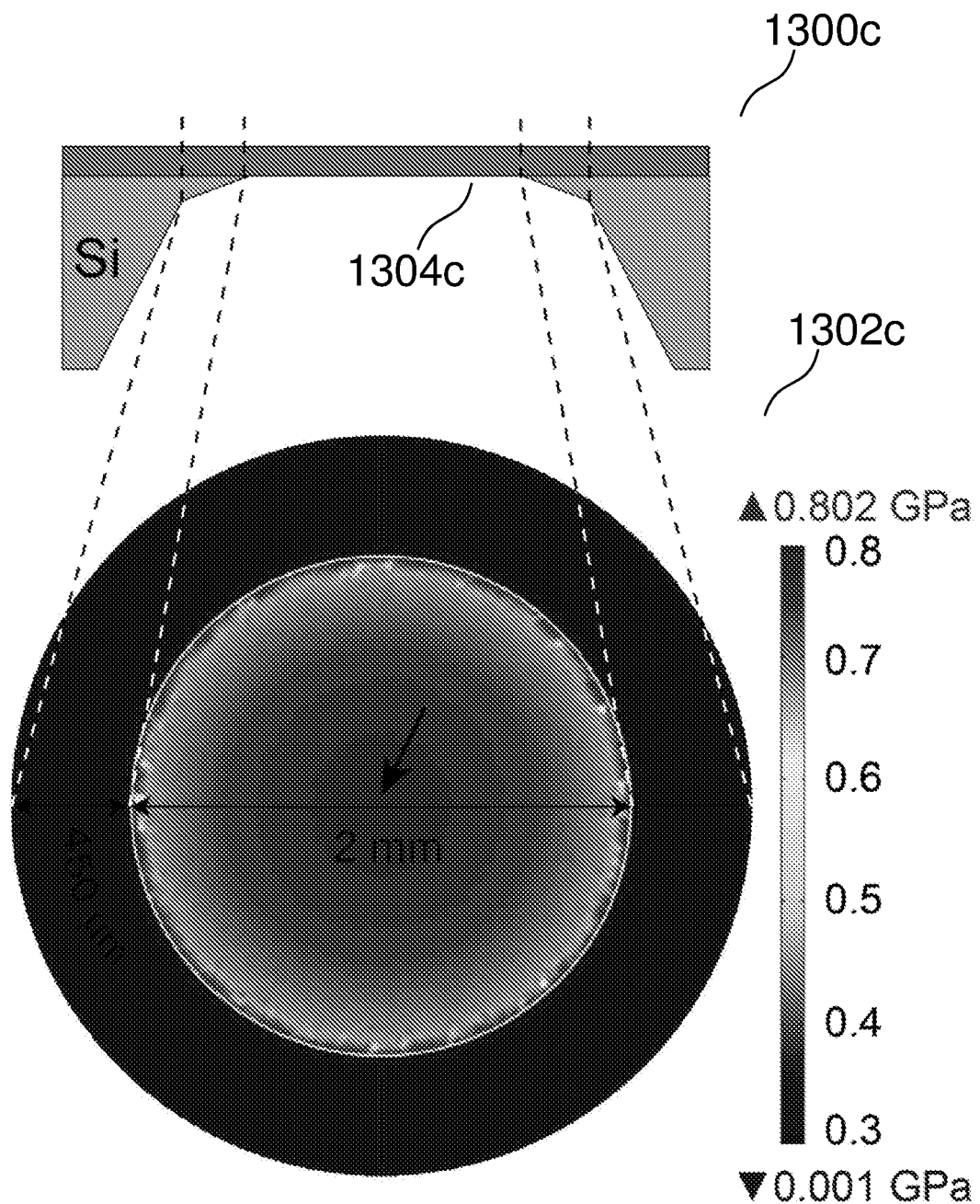
FIG. 13C shows schematic of a cross-sectional side view of a clamped circular membrane as well as a planar image of the principal stress distribution of a portion of the membrane according to various embodiments.

FIG. 13C shows schematic of a cross-sectional side view of a clamped circular membrane 1300c as well as a planar image 1302c of the principal stress distribution of a portion of the membrane according to various embodiments. The clamped circular membrane is a YSZ membrane with a diameter of 2 mm and tapered edge support of 450 µm. 1304c indicates the portion of the membrane which stress distribution image 1302c pertains to.

The thickness of the membranes as shown in FIGS. 13A-C is 300 nm. The arrows point to the highest stress distribution of the membranes.

Figure 13D:
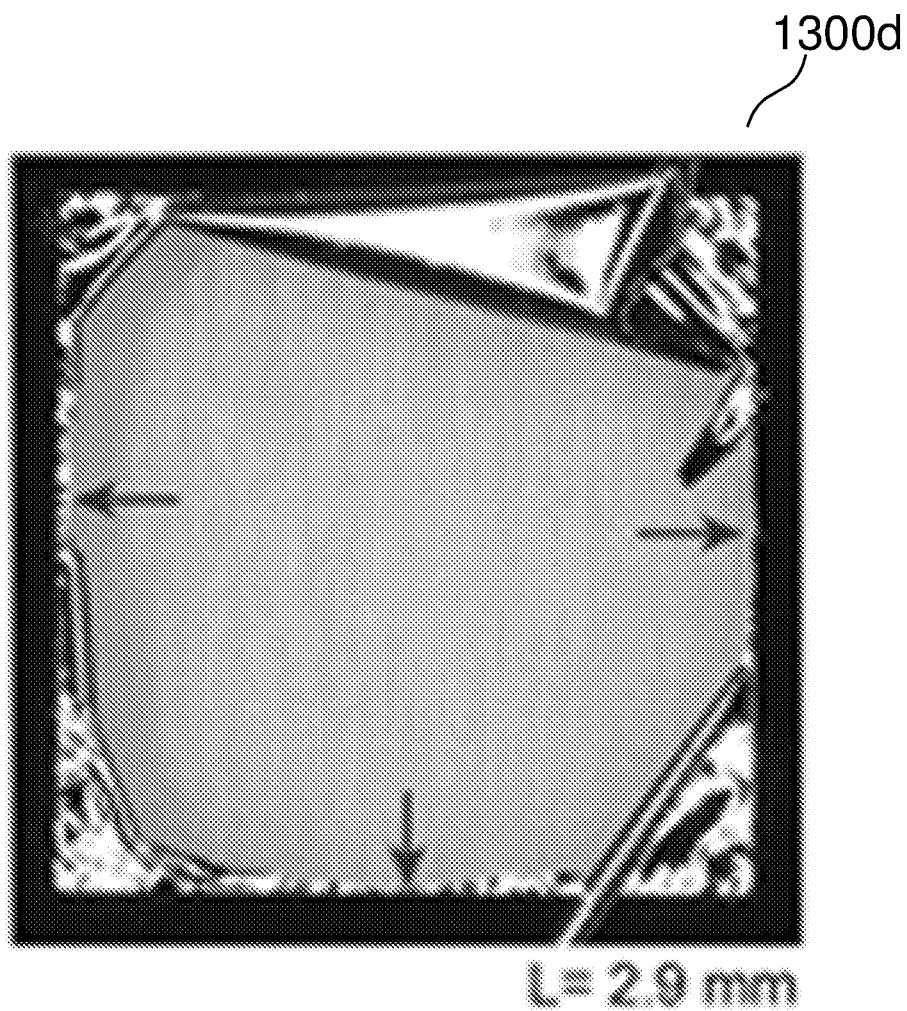
FIG. 13D shows a planar image of a clamped square membrane with width of 2.9 mm that is broken during fuel cell test.
Figure 13E:
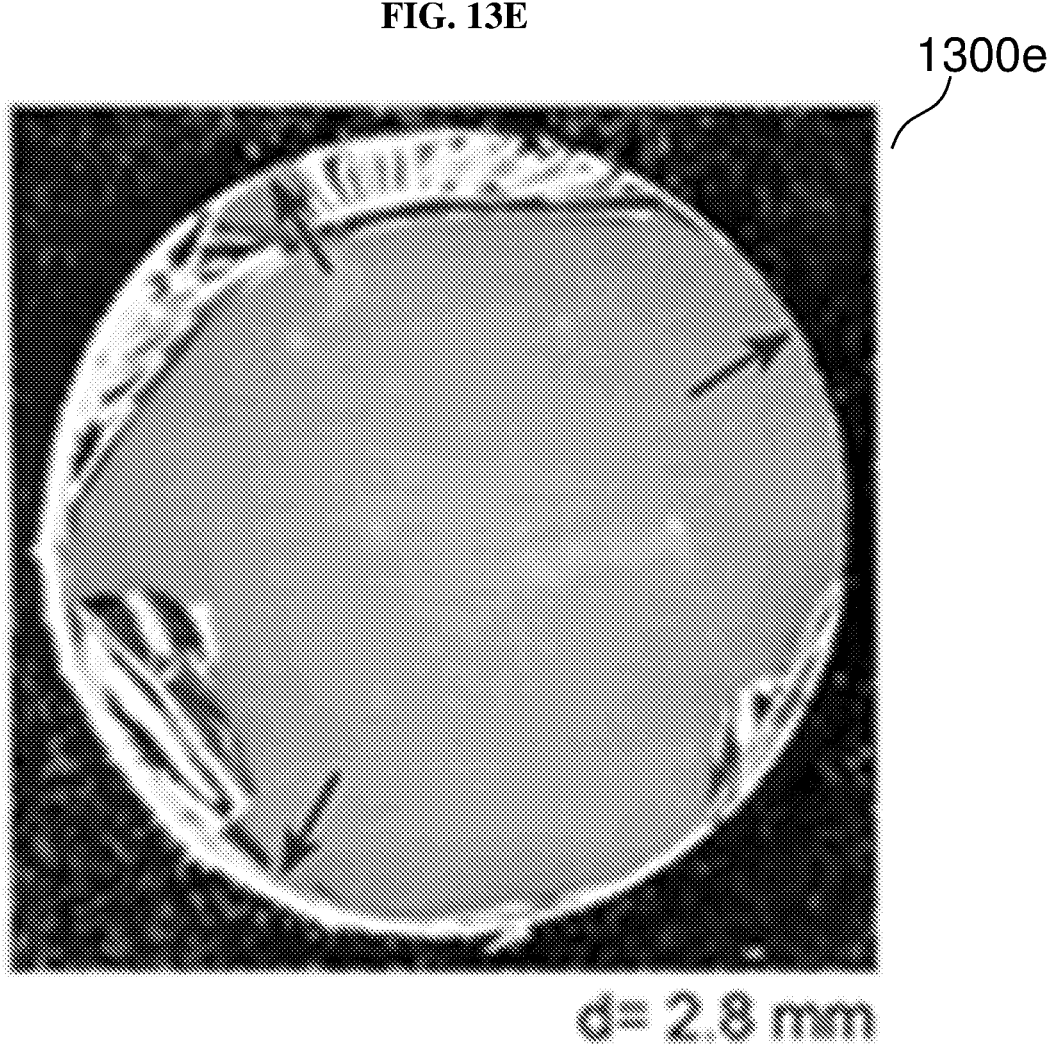
FIG. 13E shows a planar image of a clamped circular membrane with width of 2.8 mm that is broken during fuel cell test.
Figure 13F:
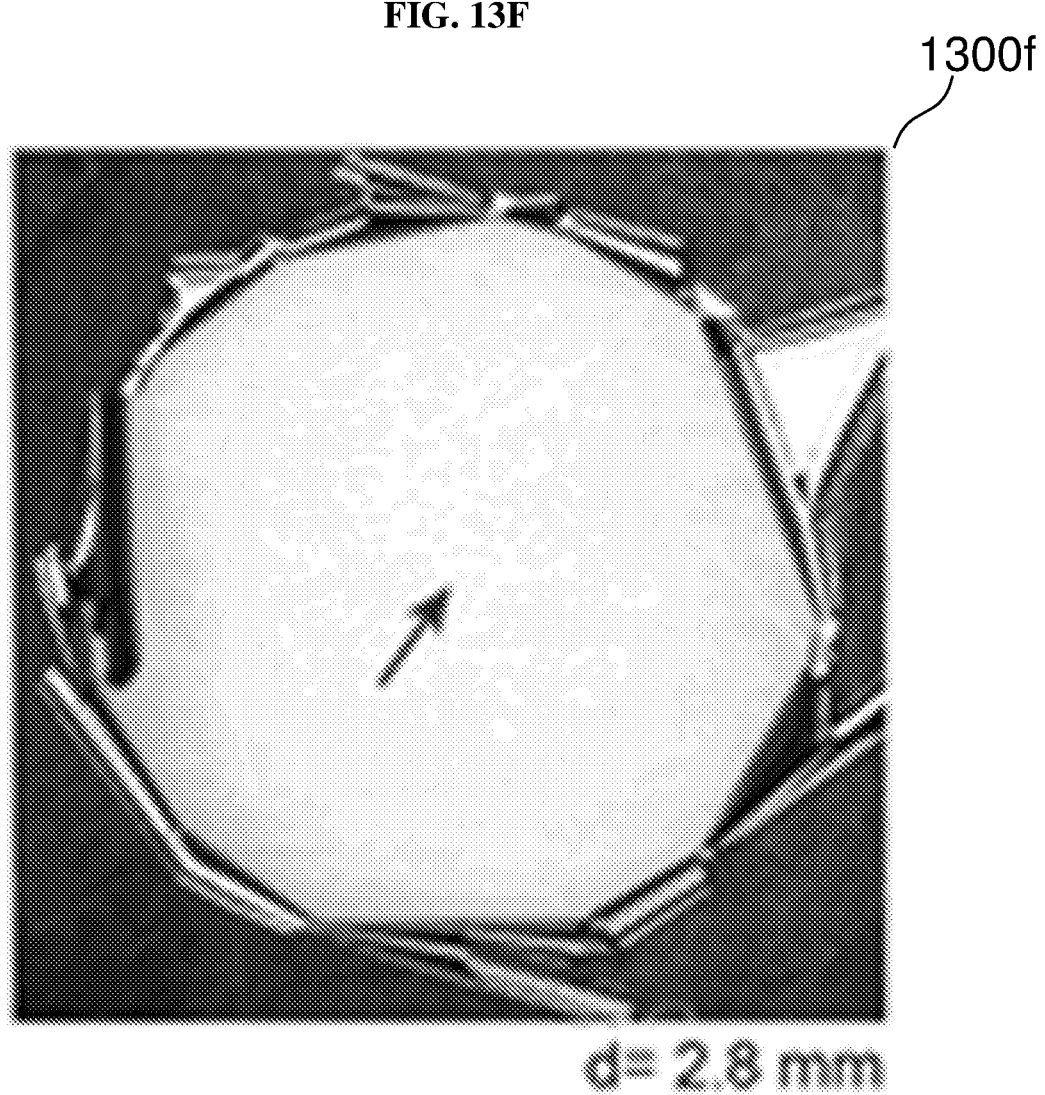
FIG. 13F shows a planar image of a clamped circular membrane with tapered edged support and having width of 2.8 mm according to various embodiments.

FIG. 13D shows a planar image 1300d of a clamped square membrane with width of 2.9 mm that is broken during fuel cell test. FIG. 13E shows a planar image 1300e of a clamped circular membrane with width of 2.8 mm that is broken during fuel cell test. FIG. 13F shows a planar image 1300f of a clamped circular membrane with tapered edged support and having width of 2.8 mm according to various embodiments. The clamped circular membrane in FIG. 13F is also broken during fuel cell test. The arrows in FIGS. 13D-F point to the approximate regions of initiating failures.

The stress distributions within the nano thin-film electrolyte have been calculated by finite element modeling (FEM) to evaluate the effectiveness of the tapered edge support in relieving stress in the membranes. The calculation results of principal stress distribution (FIGS. 13A-C) demonstrate a much more uniform stress distribution across the circular membrane with a tapered edge support (FIG. 13C than either the square membrane (FIG. 13A) or the circular membrane without a tapered edge support (FIG. 13B). The maximum principal stress is 1.4 GPa in a clamped square membrane, 1.2 GPa in a clamped circular membrane, and 0.8 GPa in a clamped circular membrane with a tapered edge support. Compared with the clamped square and circular membranes, the circular membrane with a support showed about 30 to about 40% reduction in the maximum principal stress. The maximum principal stress of the circular membrane, located at the clamped edge(s), may be reduced significantly by changing the membrane shape from square to circle, and may be reduced further by introducing the tapered edge support.

FIGS. 13D-F show the corresponding fractured thin-film µSOFCs with structures in FIGS. A-C respectively after fuel cell tests, which provide a good indication of where the fractures in the membrane initiated. For the square membrane (FIG. 13D) and the circular membrane without tapered support (FIG. 13E), the fracture is initiated at the clamped edge, where the stress is the highest, as confirmed by our simulation results. On the other hand, for the circular membrane with a tapered edge support (FIG. 13F), the fracture is initiated at the membrane center because the fragments of the fractured membrane are still clamped along the circular boundaries. This is also in agreement with the FEM calculation results that the highest stress is at the center of the membrane for the membrane with tapered support. This shows that the tapered edge support may effectively restrain the edge-fractures typically observed in square membranes and accordingly, mechanical stability may be improved during fuel cell operation.

Figure 14:
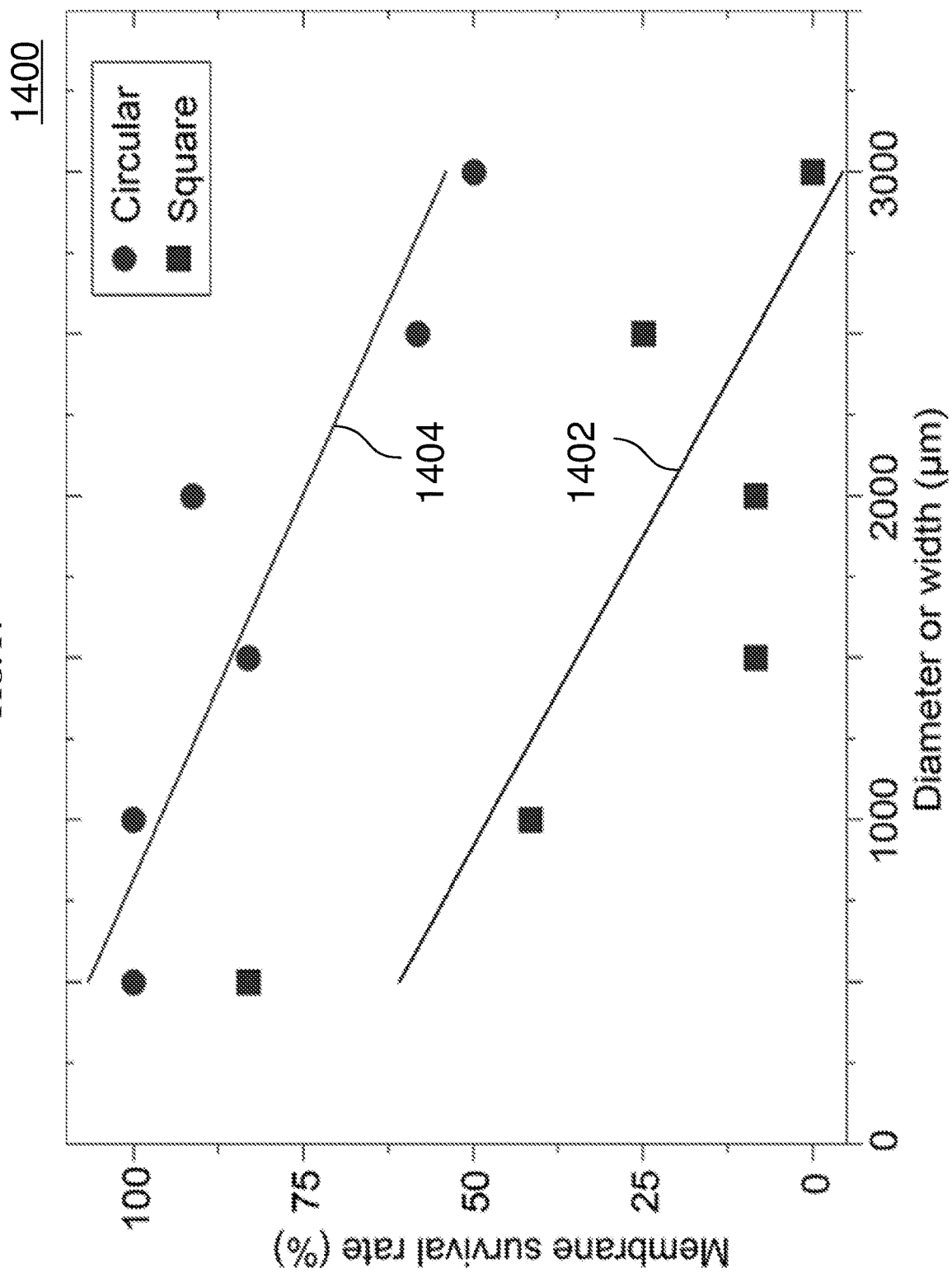
FIG. 14 is a plot of membrane survival rate (percent or %) as a function of diameter or width (millimeter or mm) according to various embodiments.

The enhanced mechanical stability of the tapered edge-supported circular membranes may be further quantified with the membrane survival rate (percentage of membranes surviving after the fabrication process), as shown in FIG. 14. FIG. 14 is a plot 1400 of membrane survival rate (percent or %) as a function of diameter or width (millimeter or mm) according to various embodiments. 1402 pertains to the square membranes while 1404 pertains to the circular membranes.

The survival rates for different membrane lateral dimensions between square and circular membranes have been compared by counting a total of 144 cells with 12 cells for each size. The survival rate decreases as the membrane size increases for both membranes. More importantly, the circular membranes showed higher survival rates than the square membranes over all membrane sizes. For YSZ membranes with 3 mm of lateral dimension, none of the square membranes survives, while 50% of the circular membranes remain intact. These results provide statistical evidence of the enhanced mechanical stability of the new cell architecture over the widely reported square structure.

Figure 15A:
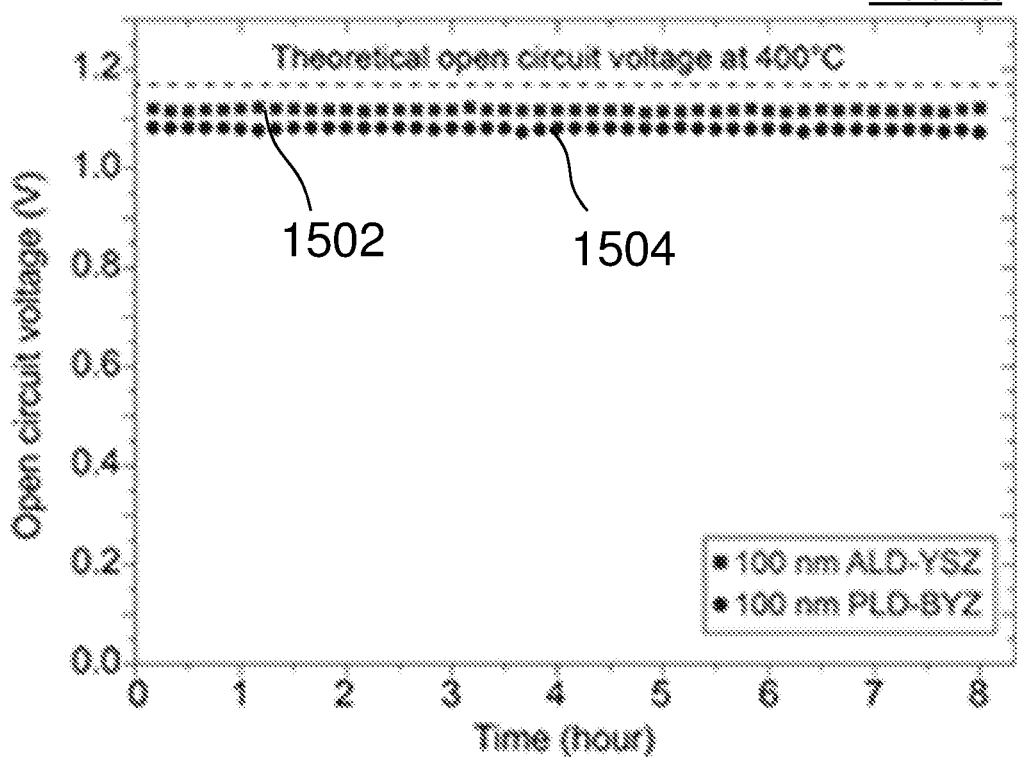
FIG. 15A is a plot of open circuit voltage (volts or V) as a function of time (hours) showing the variation of the open circuit voltages of atomic layer deposited—yttria-stabilized zirconia (ALD-YSZ) membrane and pulsed laser deposition—yttrium-doped $BaZrO_3$ (PLD-BYZ) membrane according to various embodiments over time.

The mechanical stability of the new cell architecture may be further explored by open circuit voltage (OCV) measurements. FIG. 15A is a plot 1500a of open circuit voltage (volts or V) as a function of time (hours) showing the variation of the open circuit voltages of atomic layer deposited—yttria-stabilized zirconia (ALD-YSZ) membrane and pulsed laser deposition—yttrium-doped $BaZrO_3$ (PLD-BYZ) membrane according to various embodiments over time. 1502 relates to ALD-YSZ membrane while 1504 relates to PLD-BYZ membrane. As shown in FIG. 15A, the OCVs for YSZ and BYZ fuel cells are able to achieve high values of 1.07 V and 1.12 V, which are close to the theoretical OCVs of 1.17 V at 400° C. with pure hydrogen ($H_2$) fuel and air as the oxidant, and OCVs are stable for over 8 h, with less than 10 mV decay in both fuel cells. The high and stable OCVs over time provide direct evidence that the circular template developed according to various embodiments has better mechanical stability and functionality of μ-SOFCs using nanoscale thin-film electrolytes.

Figure 15B:
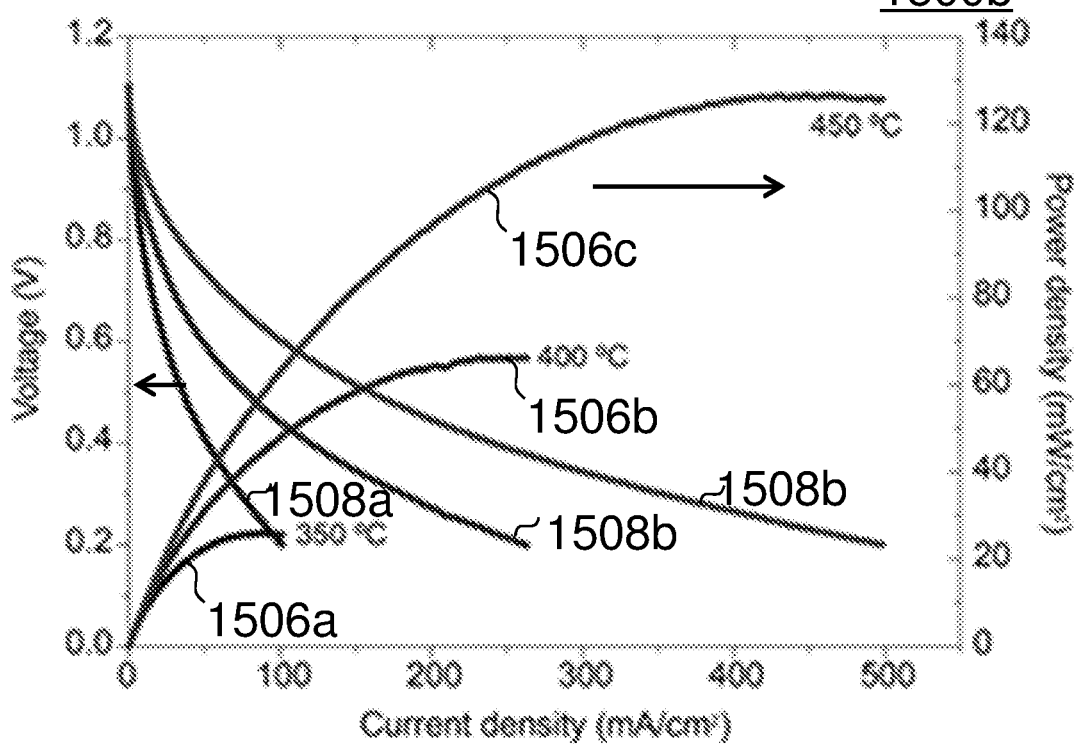
FIG. 15B is a plot of voltage (volts or V)/power density (milliwatts/square centimetres or $mW/cm^2$) as a function of current density (milliamperes/square centimetres or $mA/cm^2$) showing the polarization curves of a platinum (Pt)/yttria-stabilized zirconia (YSZ)/platinum (Pt) micro-solid oxide fuel cell (μ-SOFC) according to various embodiments at various temperatures.

Fuel cell performance measurements with the 1.4 mm diameter circular μ-SOFC are conducted at 350° C., 400° C. and 450° C. FIG. 15B is a plot 1500b of voltage (volts or V)/power density (milliwatts/square centimetres or $mW/cm^2$) as a function of current density (milliamperes/square centimetres or $mA/cm^2$) showing the polarization curves of a platinum (Pt)/yttria-stabilized zirconia (YSZ)/platinum (Pt) micro-solid oxide fuel cell (μ-SOFC) according to various embodiments at various temperatures. Curve 1506a represents the OCV variation as a function of current density at 350° C.; curve 1506b represents the OCV variation as a function of current density at 400° C.; and curve 1506c represents the OCV variation as a function of current density at 450° C. Curve 1508a represents the power density variation as a function of current density at 350° C.; curve 1508b represents the power density variation as a function of current density at 400° C.; and curve 1508c represents the power density variation as a function of current density at 450° C. As shown in FIG. 15B, high open circuit voltage (OCVs) of 1.09 V and peak power density of 127 $mW/cm^2$ at 450° C. have obtained. The total power output from the circular μ-SOFC is about 1.95 mW, which may be the highest total power output at 450° C. for thin film μ-SOFCs featuring a free-standing flat membrane configuration reported to date to the best of our knowledge.

Various embodiments relate to circular nano thin-film μ-SOFCs with a tapered edge support as well as methods of forming the same to effectively enhance the mechanical stability of the fuel cell. The center-symmetric geometry of the circular thin-film may help to distribute the stress of the membrane uniformly in the radial and circumferential directions, and the tapered edge support may serve as a stress absorber and may significantly suppress the high magnitude of stress at the clamped edges. The addition of the tapered edge support created along the circular boundary may reduce by 30-40% of the maximum principal stress at the clamped edge of the membrane, and accordingly may reduce the risk of membrane fracture. The membrane survival rates may provide statistical evidence for enhanced mechanical stability of the membrane using the new fuel cell architecture, and subsequently may enable scale-up of μ-SOFC to millimeter size and significantly improve total power output. The stable OCVs over 8 h at 400° C. may also justify the better mechanical stability and functionality of circular thin film electrolytes to be dense and pinhole-free in this cell-supporting structure. Thus, the new cell architecture according to various embodiments may be a promising template for large-scale nano thin-film SOFCs to achieve higher total power output with mechanical and functional stability.

Various embodiments may provide a structure that defines an opening which is used to support a thin film membrane deposited over the opening.

Figure 16A:
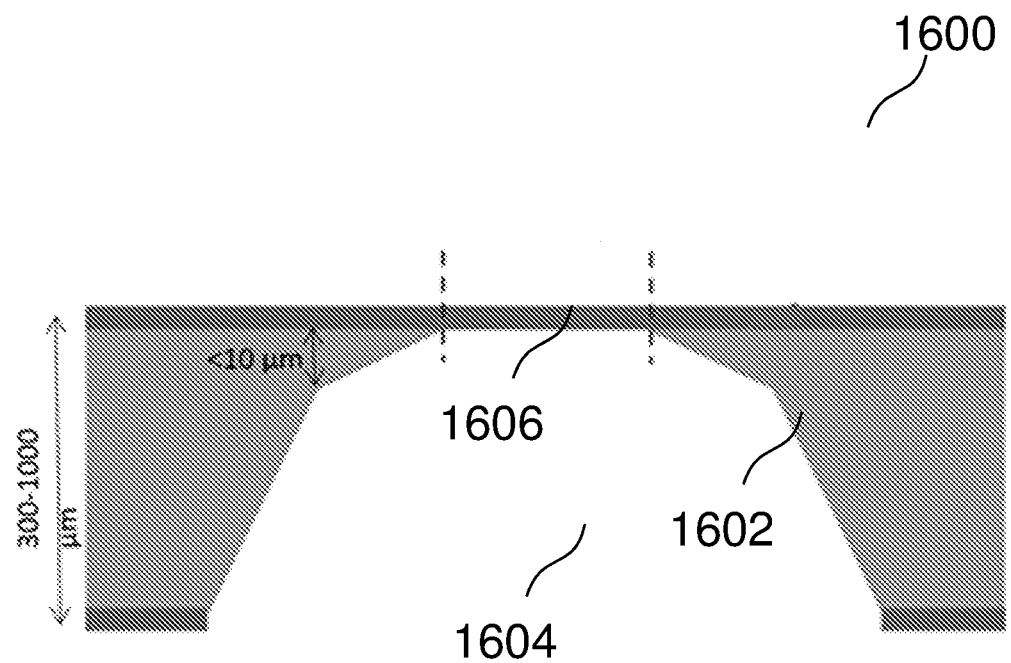
FIG. 16A is a schematic showing a cross-sectional side view of a device according to various embodiments.

The structure may include a thin edge support that extrudes from a mother supporting substrate which is a single crystalline silicon wafer. FIG. 16A is a schematic showing a cross-sectional side view of a device 1600 according to various embodiments. The device 1000 may include a semiconductor substrate 1602 and a cavity 1604 extending through the substrate 1602. The cavity 1604 may be formed by a combination of deep reactive ion etching and wet etching as described herein. The device 1000 may further include a membrane 1606 suspended over the cavity.

Figure 16B:
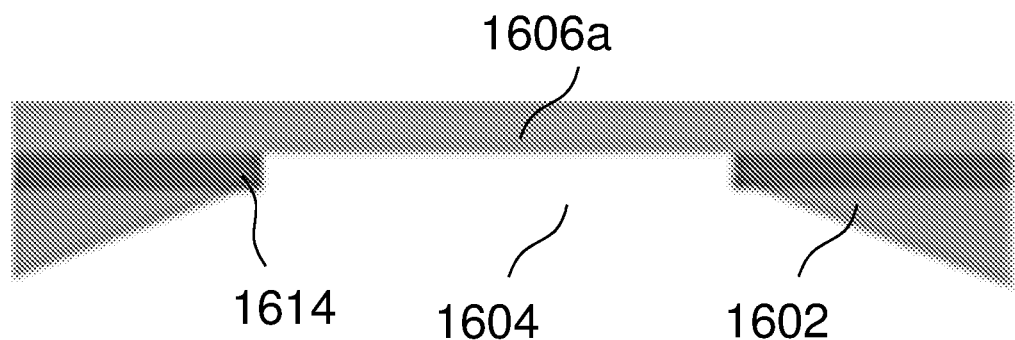
FIG. 16B shows a membrane according to various embodiments.
Figure 16C:
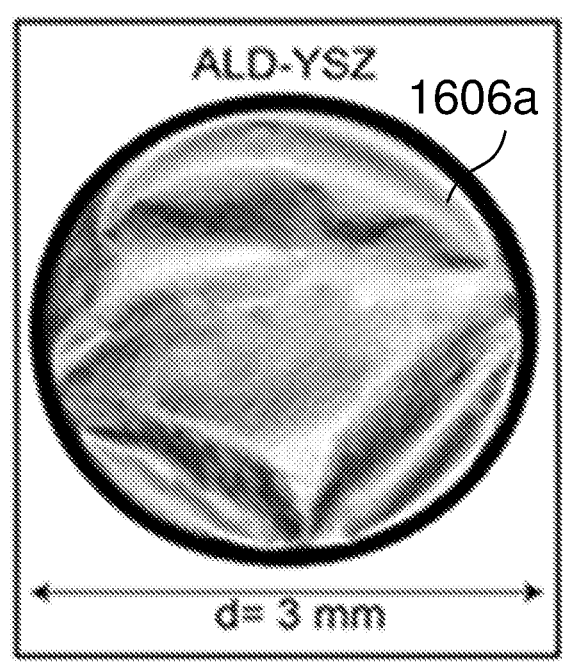
FIG. 16C is an optical image of the membrane according to various embodiments.

FIG. 16B shows a membrane 1606a according to various embodiments. The membrane 1606a may be the membrane 1606 shown in FIG. 16A. The membrane 1606a may include an electrolyte layer and electrodes on both sides of the electrolyte layer. There may be a dielectric layer 1614 between the membrane 1606a and the substrate 1602. FIG. 16C is an optical image of the membrane 1606a according to various embodiments.

Figure 16D:
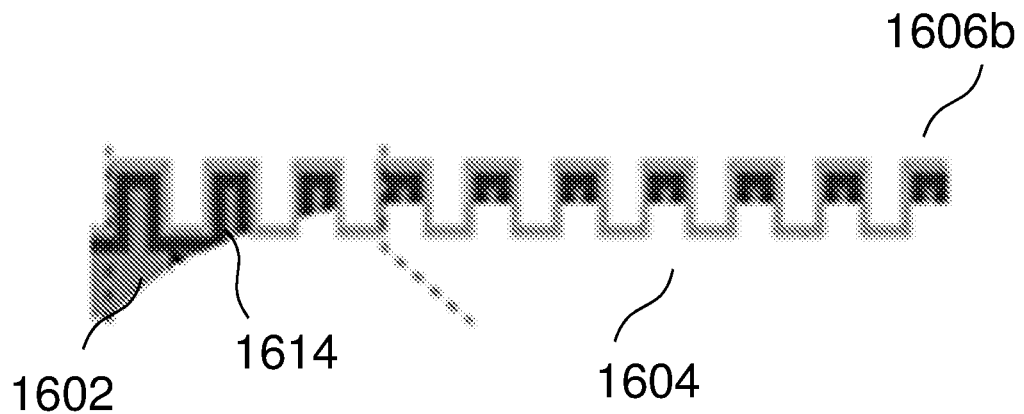
FIG. 16D shows a membrane according to various embodiments.
Figure 16E:
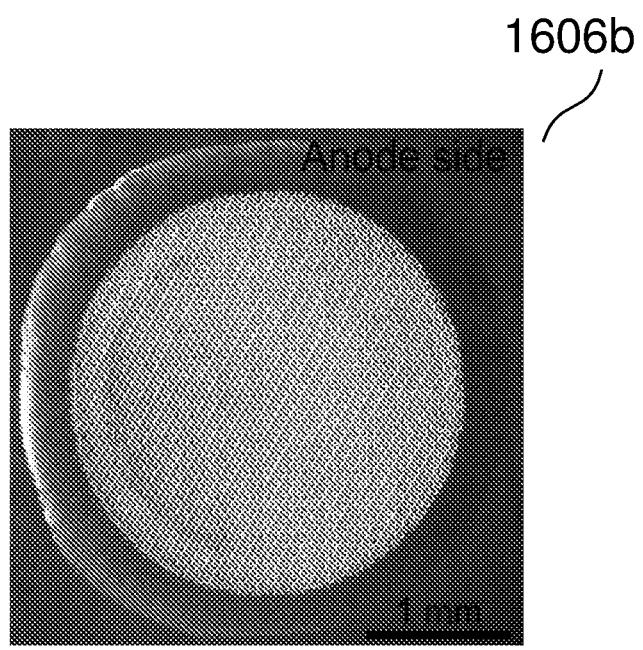
FIG. 16E is an optical image of the membrane according to various embodiments.

FIG. 16D shows a membrane 1606b according to various embodiments. The membrane 1606b may be the membrane 1606 shown in FIG. 16A. The membrane 1606b may be a membrane array. The membrane 1606b may include a plurality of cells. There may be a dielectric layer 1614 between the membrane 1606b and the substrate 1602. FIG. 16E is an optical image of the membrane 1606b according to various embodiments.

In various embodiments, the thin film membrane may include core fuel cell components including electrolyte and electrode layers, or may include a thin silicon layer with embedded array of electrolyte/electrode membranes. Various embodiments may be suitable for as energy conversion devices such as fuel cells utilizing solid state thin film electrolytes.

Various embodiments may provide a stress-free integrated two-stage support. Unlike existing technologies where such support is created by adding heterogeneous materials (such as nickel, poly-crystalline silicon, doped silicon, etc), the thin support according to various embodiments may be formed by directly etching the mother supporting substrate which is a single crystalline silicon wafer. Since single crystalline silicon have virtually no inherent residual stress, this may effectively avoid the additional unwanted stress from the foreign materials introduced to the thin film membrane. In other words, the tapered silicon support may be part of the silicon substrate, thus reducing stress as compared to methods which involves using a different material as a support, which may lead to residual stress. For instance, using a nickel grid anode grown by electroplating as a support may lead to residual stress.

The thin edge support may serve as a shock/stress absorber that may effectively accommodate environmental impacts and inherent residual stress from the thin film membrane. The shape of the support, the methodology to create such a support, and/or the critical dimensions may be important.

The two stage supporting substrate may be formed by a combination of through-wafer etching methods, namely wet KOH etching and deep reactive ionic etching (DRIE), which are both simple and cost effective with minimum requirements of process environment and processing apparatuses.

Various embodiments may be scalable with leeway for increasing lateral dimensions. With the addition of edge support, various embodiments may be applied in different configurations of fuel cells to reinforce the structural integrity as well as to scale up the cell dimension. Various embodiments may increase the lateral dimensions of a free-standing electrolyte membrane from hundreds of micrometer scale to millimetre scale. Various embodiments may successfully stabilize the corners of a silicon membrane that is usually thinner at the (100)/(111) corner and is subjected to fracture.

Figure 17:
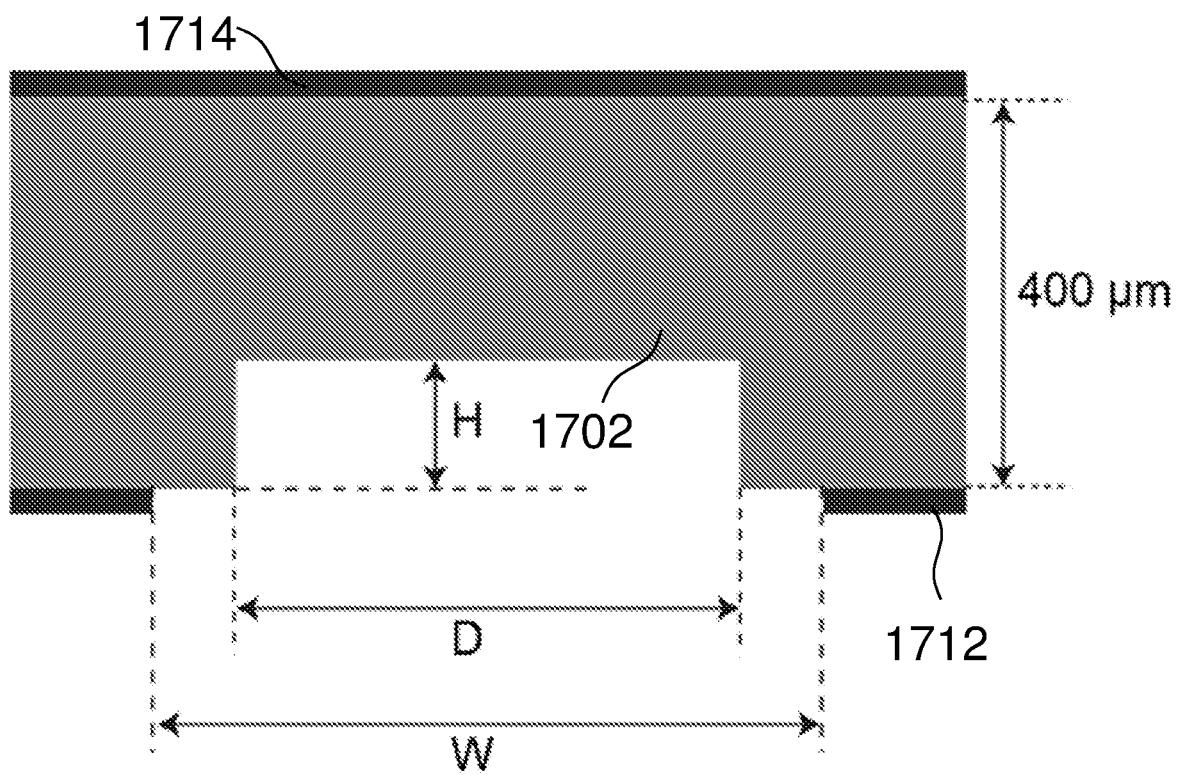
FIG. 17 is a schematic illustrating a cross-sectional side view of a silicon substrate to show the etching dimensions for deep reactive ion etching according to various embodiments.

FIG. 17 is a schematic illustrating a cross-sectional side view of a silicon substrate 1702 to show the etching dimensions for deep reactive ion etching according to various embodiments. The silicon substrate 1702 may be covered by low stress $Si_3N_4$ dielectric layers 1712, 1714. The etched diameter (D) may be about 500 μm to about 3000 μm. An etched window size (W) of D+about 1000 μm may be made on dielectric layer 1714. The edge depth may be about 30 μm.

Figure 18A:
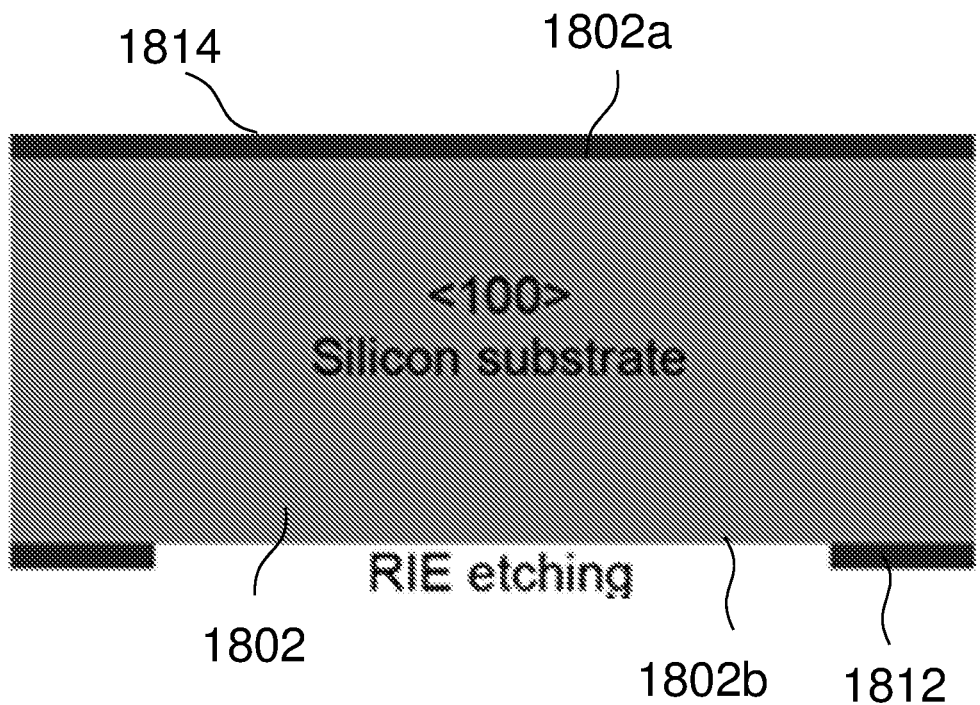
FIG. 18A is a cross-sectional schematic showing a side view of a silicon substrate coated with a dielectric layer on a first surface of the substrate and a dielectric layer on a second surface of the substrate opposite the first surface according to various embodiments.

FIG. 18A-D illustrate forming an enlarged cavity on a substrate 1802 according to various embodiments. FIG. 18A is a cross-sectional schematic showing a side view of a silicon substrate 1802 coated with a dielectric layer 1814 on a first surface 1802a of the substrate 1802 and a dielectric layer 1812 on a second surface 1802b of the substrate 1802 opposite the first surface 1802a according to various embodiments. A portion of the dielectric layer 1812 may be removed by reactive ion etching (RIE) using $CF_4$ of about 30 standard cubic centimetres per minute (sccm), power of about 150 W, and at an etching rate of about 45 to about 50 nm/min to expose the underlying surface 1802b.

Figure 18B:
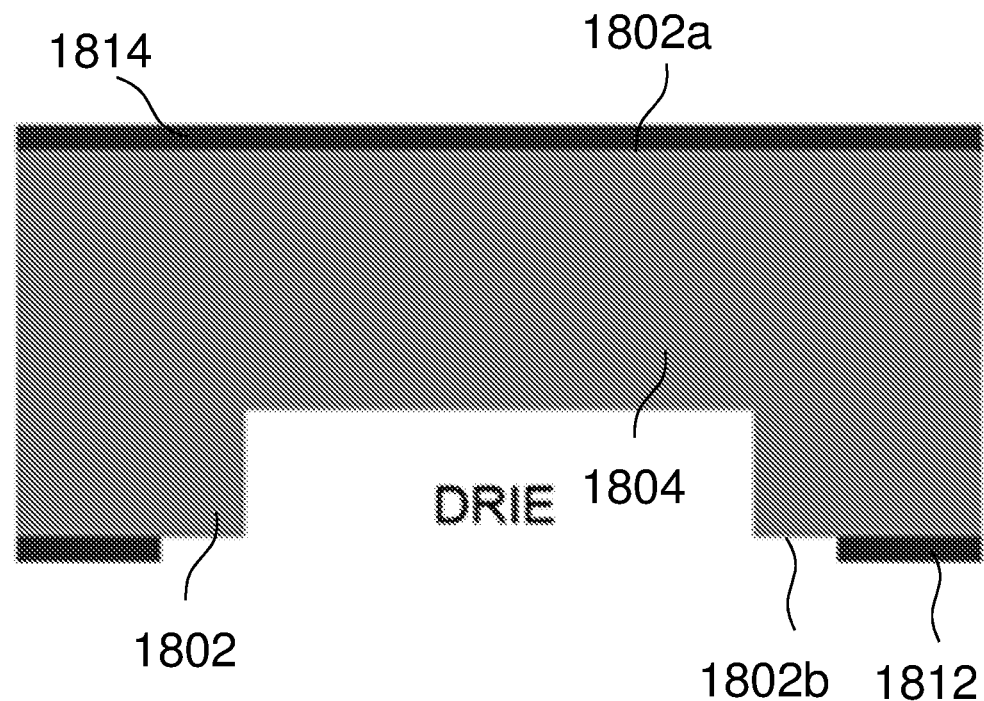
FIG. 18B is a cross-sectional schematic showing a side view of the silicon substrate subjected to deep reactive ion etching (DRIE) according to various embodiments.

FIG. 18B is a cross-sectional schematic showing a side view of the silicon substrate 1802 subjected to deep reactive ion etching (DRIE) according to various embodiments. The parameters may be about 130 sccm $SF_6$, about 100 sccm $C_4F_8$, about 800 W of radio frequency (RF) coil power, and an etching rate of about 3 to about 3.2 μm/min. The etching dimensions may be similar to that illustrated for FIG. 17. A cavity 1804 may be formed by DRIE.

Figure 18C:
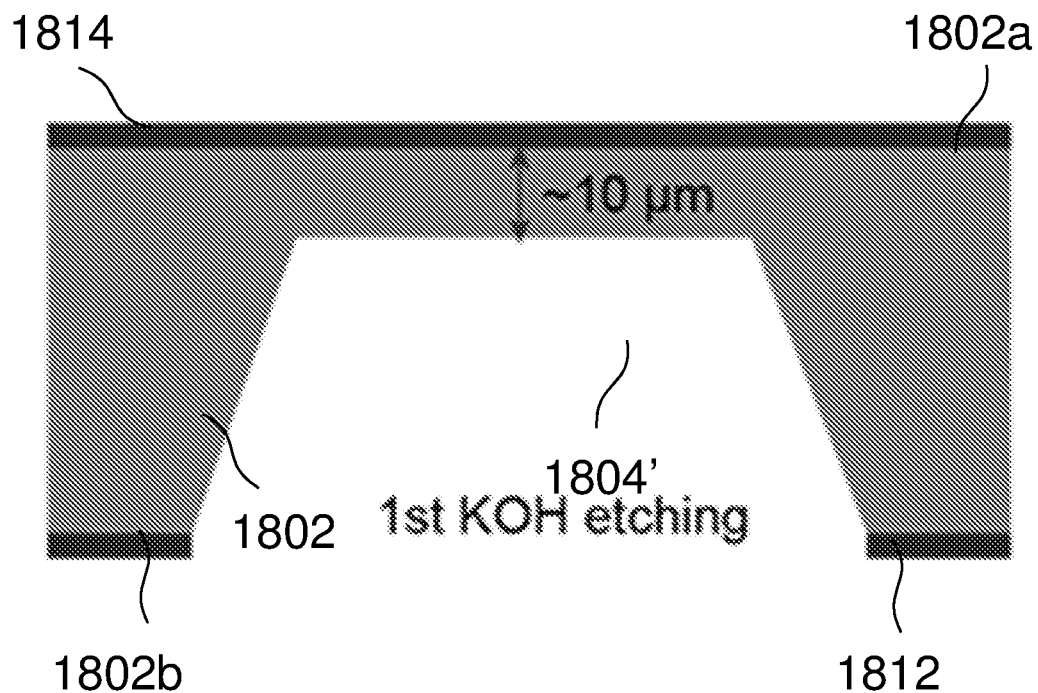
FIG. 18C is a cross-sectional schematic showing a side view of the silicon substrate subjected to a first wet etch according to various embodiments.

FIG. 18C is a cross-sectional schematic showing a side view of the silicon substrate 1802 subjected to a first wet etch according to various embodiments. The first wet etching may be used to enlarge the cavity 1804 to form cavity 1804'. The first wet etch may be carried out using KOH and may be carried out until a layer of about 10 μm remains from the cavity 1804' to the top surface 1802a. 30% weight percent (wt %) of KOH may be used. The etching temperature may be about 90° C. and the etching rate may be about 2.0 to about 2.2 μm/min.

Figure 18D:
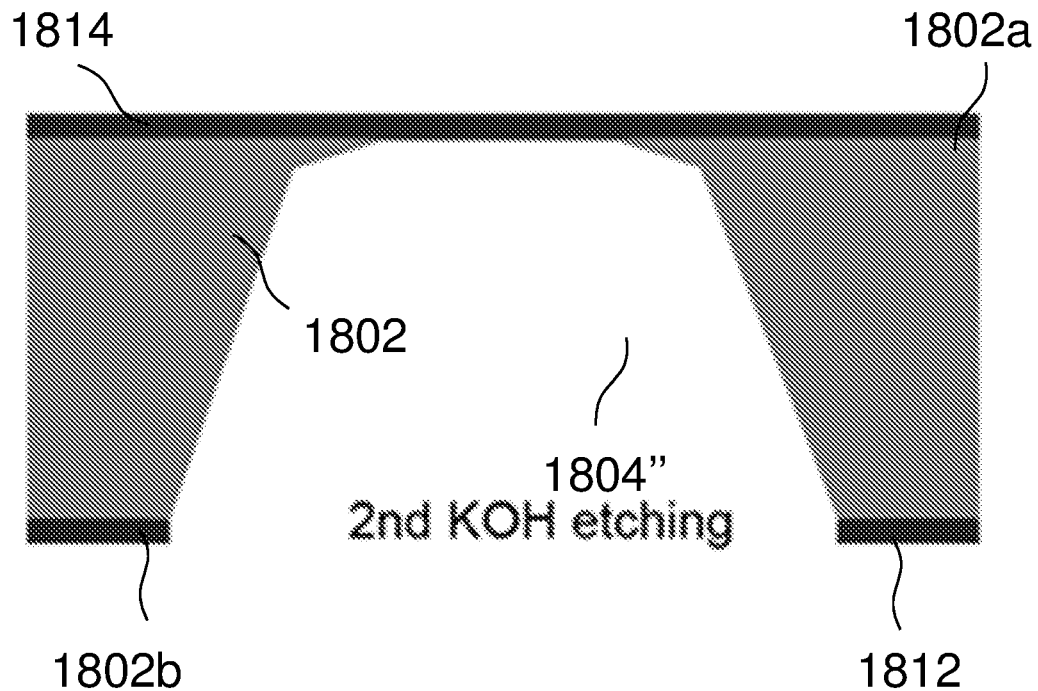
FIG. 18D is a cross-sectional schematic showing a side view of the silicon substrate subjected to a second wet etch according to various embodiments.

FIG. 18D is a cross-sectional schematic showing a side view of the silicon substrate 1802 subjected to a second wet etch according to various embodiments. The second wet etching may be used to further enlarge the cavity 1804' to form enlarged cavity 1804". The second wet etch may be carried out using 30 wt % KOH. The etching temperature may be about 70° C. and the etching rate may be about 0.6 to about 0.8 μm/min. Various embodiments may include enlarging a cavity using two wet etches at different temperatures.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A method of forming an energy conversion device, the method comprising:
    forming an electrolyte layer on a first surface of a semiconductor substrate that also includes a second surface opposite the first surface;
    forming a cavity at the second surface of the semiconductor substrate using a deep reactive ion etch;
    enlarging said cavity by carrying out one or more wet etches so that the enlarged cavity is at least partially defined by a vertical arrangement comprising a first lateral cavity surface of the semiconductor substrate extending substantially along a (111) plane of the semiconductor substrate, a second lateral cavity surface of the semiconductor substrate adjoining the first lateral cavity surface, the second lateral cavity surface extending substantially along a (100) plane of the semiconductor substrate parallel to the first surface of the semiconductor substrate, and a third lateral cavity surface of the semiconductor substrate adjoining the second lateral cavity surface so that the second lateral cavity surface is between the first lateral cavity surface and the third lateral cavity surface, wherein the third lateral cavity surface is a plane between the (100) plane and the (111) plane of the semiconductor substrate;
    forming a first electrode on a first surface of the electrolyte layer; and
    forming a second electrode on a second surface of the electrolyte layer.

2. The method according to claim 1, further comprising:
    forming a plurality of trenches on the first surface of the semiconductor substrate before forming the electrolyte layer.

3. The method according to claim 1, further comprising:
    forming a first dielectric layer on the first surface of the semiconductor substrate and a second dielectric layer on the second surface of the semiconductor substrate before forming the electrolyte layer.

4. The method according to claim 3, further comprising:
removing a portion of the second dielectric layer so that a portion of the second surface of the semiconductor substrate is exposed for forming the cavity.

5. The method according to claim 4, wherein the portion of the second dielectric layer is removed using reactive ion etching.

6. The method according to claim 1, wherein the one or more wet etches comprises a first wet etch carried out at a first temperature and a second wet etch carried out at a second temperature lower than the first temperature.

7. The method according to claim 1, wherein the one or more wet etches is carried out until the electrolyte layer is exposed.

8. The method according to claim 1, wherein the first lateral cavity surface forms a rounded junction with the second lateral cavity surface.

9. The method according to claim 1, wherein the enlarged cavity is at least partially defined by the electrolyte layer and forms a circular interface with the electrolyte layer.

10. The method according to claim 1, wherein the semiconductor substrate is a silicon substrate.

11. An energy conversion device formed by a method comprising:
forming an electrolyte layer on a first surface of a semiconductor substrate that also includes a second surface opposite the first surface;
forming a cavity at the second surface of the semiconductor substrate using a deep reactive ion etch;
enlarging said cavity by carrying out one or more wet etches so that the enlarged cavity is at least partially defined by a vertical arrangement comprising a first lateral cavity surface of the semiconductor substrate extending substantially along a (111) plane of the semiconductor substrate, a second lateral cavity surface of the semiconductor substrate adjoining the first lateral cavity surface, the second lateral cavity surface extending substantially along a (100) plane of the semiconductor substrate parallel to the first surface of the semiconductor substrate, and a third lateral cavity surface of the semiconductor substrate adjoining the second lateral cavity surface so that the second lateral cavity surface is between the first lateral cavity surface and the third lateral cavity surface, wherein the third lateral cavity surface is a plane between the (100) plane and the (111) plane of the semiconductor substrate;
forming a first electrode on a first surface of the electrolyte layer; and
forming a second electrode on a second surface of the electrolyte layer.

12. An energy conversion device comprising:
a semiconductor substrate having a first surface and a second surface opposite the first surface, the semiconductor substrate comprising an enlarged cavity at the second surface, wherein the enlarged cavity is at least partially defined by a vertical arrangement comprising a first lateral cavity surface extending substantially along a (111) plane of the semiconductor substrate, a second lateral cavity surface adjoining the first lateral cavity surface, the second lateral cavity surface extending substantially along a (100) plane of the semiconductor substrate parallel to the first surface of the semiconductor substrate, and a third lateral cavity surface of the semiconductor substrate adjoining the second lateral cavity surface so that the second lateral cavity surface is between the first lateral cavity surface and the third lateral cavity surface, wherein the third lateral cavity surface is a plane between the (100) plane and the (111) plane of the semiconductor substrate;
an electrolyte layer on the first surface of the semiconductor substrate;
a first electrode on a first surface of the electrolyte layer; and
a second electrode on a second surface of the electrolyte layer.

13. The energy conversion device according to claim 12, wherein the electrolyte layer is suspended over the enlarged cavity.

14. The energy conversion device according to claim 12, wherein the electrolyte layer is corrugated.

15. The energy conversion device according claim 12, where the second electrode extends from on the second surface of the electrolyte layer over the first lateral cavity surface, the second lateral cavity surface, and the third lateral cavity surface to on the second surface of the semiconductor substrate.

16. The energy conversion device according to claim 12, wherein the electrolyte layer comprises a solid state oxygen ion-conductor or a proton conductor.

17. The energy conversion device according to claim 12, wherein the electrolyte layer comprises yttria-stabilized zirconia (YSZ) or yttrium-doped $BaZrO_3$ (BYZ).

18. The energy conversion device according to claim 12, wherein the energy conversion device is a solid oxide fuel cell or a solid oxide fuel cell array.

* * * * *